US010565731B1

(12) United States Patent
Reddy et al.

(10) Patent No.: US 10,565,731 B1
(45) Date of Patent: Feb. 18, 2020

(54) POSE TRACKING SYSTEM WITH MULTI DEVICE SHARED SCENE MAP

(71) Applicant: Occipital, Inc., Boulder, CO (US)

(72) Inventors: Vikas M. Reddy, Boulder, CO (US); Jeffrey Roger Powers, San Francisco, CA (US); Paul Jakob Schroeder, Boulder, CO (US); Chris Slaughter, Boulder, CO (US); Ganesh Mallya, Boulder, CO (US)

(73) Assignee: Occipital, Inc., Boulder, CO (US)

( * ) Notice: Subject to any disclaimer, the term of this patent is extended or adjusted under 35 U.S.C. 154(b) by 0 days.

(21) Appl. No.: 16/255,084

(22) Filed: Jan. 23, 2019

Related U.S. Application Data

(63) Continuation of application No. 15/918,695, filed on Mar. 12, 2018.

(60) Provisional application No. 62/470,767, filed on Mar. 13, 2017, provisional application No. 62/620,586, filed on Jan. 23, 2018.

(51) Int. Cl.
*G06K 9/00* (2006.01)
*G06T 7/73* (2017.01)
*G06T 19/00* (2011.01)
*G06F 3/042* (2006.01)

(52) U.S. Cl.
CPC .............. *G06T 7/75* (2017.01); *G06F 3/0425* (2013.01); *G06T 19/006* (2013.01)

(58) Field of Classification Search
CPC combination set(s) only.
See application file for complete search history.

(56) References Cited

U.S. PATENT DOCUMENTS

| 6,417,836 | B1 | 7/2002 | Kumar et al. |
| 6,973,202 | B2 | 12/2005 | Mostafavi |
| 8,077,914 | B1 | 12/2011 | Kaplan |
| 9,479,697 | B2 | 10/2016 | Aguilar et al. |
| 9,934,587 | B2 * | 4/2018 | Senthamil ............. G06T 19/006 |
| 10,365,711 | B2 * | 7/2019 | Fuchs ..................... G06T 17/00 |
| 10,419,655 | B2 * | 9/2019 | Sivan ...................... H04W 4/80 |
| 2011/0071675 | A1 | 3/2011 | Wells et al. |
| 2013/0076617 | A1 | 3/2013 | Csaszar et al. |
| 2013/0222565 | A1 | 8/2013 | Guerin et al. |
| 2015/0138086 | A1 | 5/2015 | Underkoffler et al. |
| 2016/0171768 | A1 | 6/2016 | Park et al. |
| 2017/0011553 | A1 | 1/2017 | Chen et al. |
| 2017/0148168 | A1 * | 5/2017 | Lindner ................ G06T 7/0002 |
| 2017/0243324 | A1 * | 8/2017 | Mierle .................... G06F 3/012 |
| 2018/0011982 | A1 | 1/2018 | Hung et al. |

(Continued)

OTHER PUBLICATIONS

Non Final Office Action dated Sep. 9, 2019 for U.S. Appl. No. 15/918,695 "System for Determining a Pose of an Object" Reddy, 6 pages.

(Continued)

*Primary Examiner* — Jose L Couso
(74) *Attorney, Agent, or Firm* — Lee & Hayes, P.C.

(57) ABSTRACT

A virtual environment or mixed reality environment system including a headset device and controller. Both the headset device and the controller are configured to access and update a shared scene map. In some cases, the headset device may implement pose tracking with respect to the headset device and the controller and the controller may also implement pose tracking with respect to the headset device and the controller.

20 Claims, 44 Drawing Sheets

(56) References Cited

U.S. PATENT DOCUMENTS

| | | | |
|---|---|---|---|
| 2018/0095635 A1* | 4/2018 | Valdivia | G02B 27/0093 |
| 2018/0255290 A1 | 9/2018 | Holzer et al. | |
| 2018/0295289 A1 | 10/2018 | Taya | |
| 2019/0011981 A1 | 1/2019 | Noguchi | |
| 2019/0025905 A1* | 1/2019 | Godina | G06F 3/011 |
| 2019/0033988 A1 | 1/2019 | Hesch et al. | |
| 2019/0033989 A1* | 1/2019 | Wang | G06F 3/0346 |
| 2019/0043259 A1* | 2/2019 | Wang | G06F 3/04815 |
| 2019/0114830 A1* | 4/2019 | Bouazizi | G06F 3/011 |
| 2019/0130622 A1* | 5/2019 | Hoover | G06T 11/60 |
| 2019/0138114 A1* | 5/2019 | Huang | G06F 3/0304 |
| 2019/0188895 A1* | 6/2019 | Miller, IV | G06F 3/011 |
| 2019/0197785 A1* | 6/2019 | Tate-Gans | G06T 19/006 |
| 2019/0224572 A1 | 7/2019 | Leeper et al. | |
| 2019/0228558 A1 | 7/2019 | Kobayashi | |

OTHER PUBLICATIONS

Non Final Office Action dated Oct. 3, 2019 for U.S. Appl. No. 16/255,089 "Pose Tracking System With Physical Tracking Enhancement Tags" Reddy, 9 pages.

* cited by examiner

2500

```
RECEIVE AN IMAGE, THE IMAGE INCLUDING PIXELS CORRESPONDING TO AT LEAST A FIRST
IMAGE POINT AND A SECOND IMAGE POINT
2502
           ↓
SEGMENT THE IMAGE INTO A PLURALITY OF PATCHES
2504
           ↓
IDENTIFY USING A LOW RESOLUTION SEARCH A FIRST PATCH CONTAINING THE FIRST
IMAGE POINT AND A SECOND PATCH CONTAINING THE SECOND IMAGE POINT
2506
           ↓
IDENTIFY THE LOCATION OF THE FIRST IMAGE POINT WITHIN THE FIRST PATCH BY
APPLYING A WEIGHTED AVERAGE LOCATION USING A SLIDING WINDOW OVER THE FIRST
PATCH AT A HIGH RESOLUTION
2508
           ↓
IDENTIFY THE LOCATION OF THE SECOND IMAGE POINT WITHIN THE SECOND PATCH BY
APPLYING A WEIGHTED AVERAGE LOCATION USING A SLIDING WINDOW OVER THE SECOND
PATCH AT A HIGH RESOLUTION
2510
```

POSE TRACKING SYSTEM WITH MULTI DEVICE SHARED SCENE MAP

CROSS-REFERENCE TO RELATED APPLICATION(S)

This application is a continuation of and claims priority to U.S. application Ser. No. 15/918,695 filed on Mar. 12, 2018 and entitled "SYSTEM FOR DETERMINING A POSE OF AN OBJECT", which claims priority to U.S. Provisional Application Nos. 62/470,767 filed on Mar. 13, 2017 and entitled "SYSTEM FOR DETERMINING A POSE OF AN OBJECT" and 62/620,586 filed on Jan. 23, 2018 and entitled "MIXED REALITY CONTROLLER AND HEADSET TRACKING SYSTEM," which are incorporated herein by reference in their entirety.

BACKGROUND

The presence of three dimensional (3D) imaging and virtual reality systems in today's world is becoming more and more common. In some cases, the imaging system or virtual reality system may be configured to allow a user to interact with the physical world or environmental in a meaningful manner including determining object pose or position/orientation with respect to the user. Conventional systems, typically rely on multiple external imaging devices positioned in the environment of the user to triangulate the pose and identify the object. Unfortunately, use of the external imaging devices restricts the user to a predefined area or space.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 25 is an example flow diagram showing an illustrative process for determining a pose of an object using a monochrome image according to some implementations.

DETAILED DESCRIPTION

Figure 1:
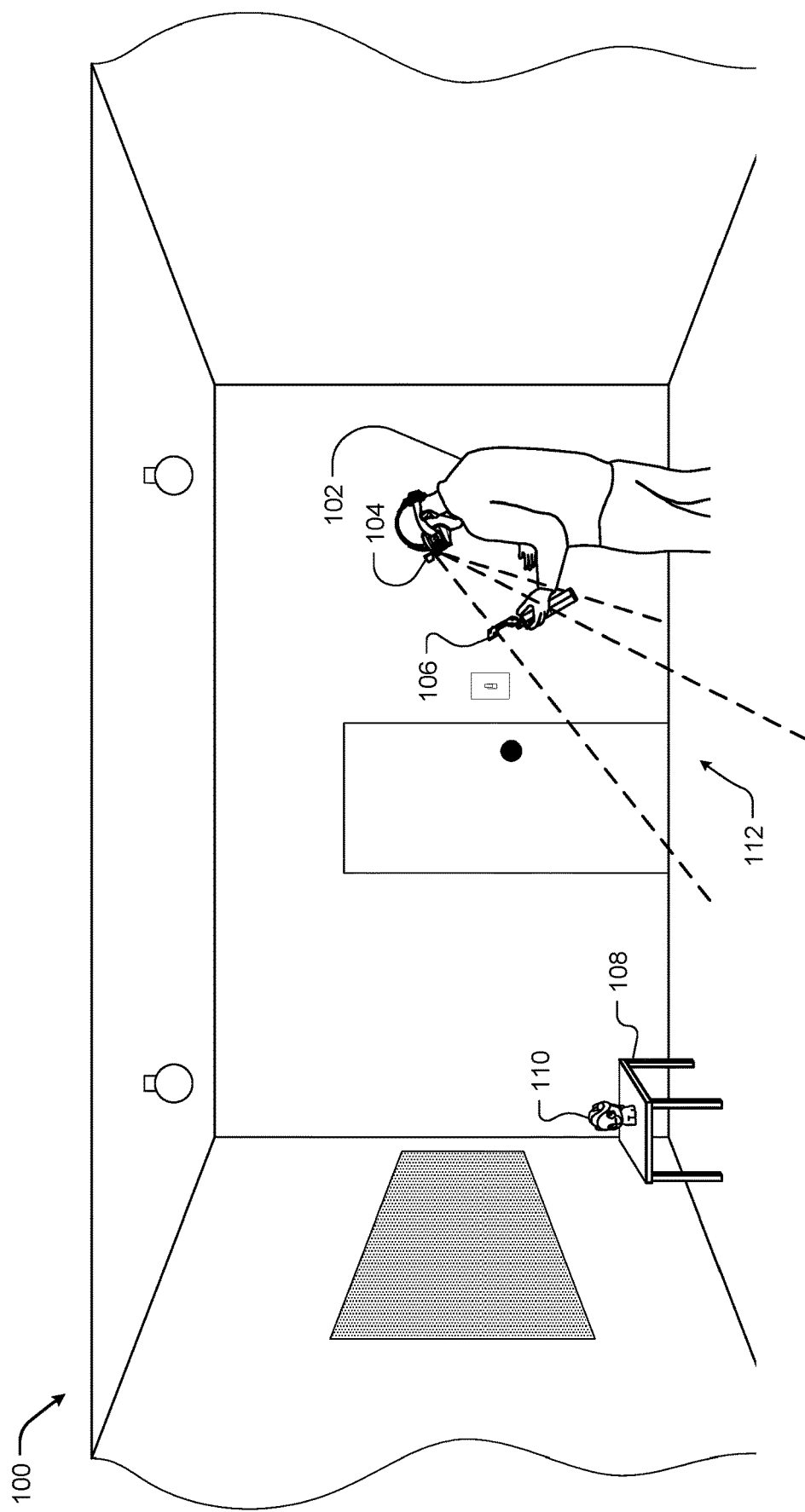
FIG. 1 illustrates an example physical environment including a user of an image system interacting with a physical object within a virtual environment generated by the image system according to some implementations.

This disclosure includes techniques and implementations for determining a six-degree of freedom (6DOF) of a three-dimensional (3D) object with respect to an electronic device based at least in part on image data captured by an image component proximate to the electronic device. For example, the electronic device may be an image system or virtual reality system configured to allow a user to interact with objects in the physical world or an environment within a virtual environment. For instance, the image system may be configured to utilize the 6DOF pose of the object as a control input or user input. In order to determine the physical object's 6DOF pose, the image system may include an image component to capture images of the physical environment that may be processed in order to determine a 6DOF pose of the physical objects represented in the captured images.

Unlike conventional systems that typically rely on multiple external imaging devices positioned in the physical environment to capture images of physical objects from multiple angles, the image component associated with the image system described herein may be approximate to or adjacent to the image system, such that the captured images are from substantially the user's perspective and/or the perspective of the image system. In one specific example, the image components may be incorporated into the image system itself in a manner that the image system is a self-contained unit. Thus, unlike the conventional system which restricts the user to a predefined area or space equipped with the external image devices, the system or devices described herein allow the user to move from physical environment to physical environment without additional setup, interrupting the virtual experience or loss of the ability to interact with the physical objects.

In some implementations, described herein, the image system may be configured to determine a 6DOF pose of an object from image data captured from a single perspective (e.g., the perspective of the image system and/or the perspective of the user). In these implementations, the object may be marked with a predetermined pattern or constellation. For instance, an object may be equipped with a number of active components, such as light emitting diodes (LEDs), arranged according to the predetermined pattern or constellation. The image system may also maintain a database or data store of object models including model points corresponding to constellation points. In some cases, the object models may be utilized in conjunction with images including the object having the constellations to determine the 6DOF pose and/or identify of the object.

In some examples, each object model may represent a known object based on a corresponding constellation. In some cases, the constellation may be represented by the object model as a series or arrangement of model points in three dimensions. Thus, in some examples, the image system may determine the 6DOF pose of the object based on performing a 3D-2D point correspondence between one or more object models in 3D and constellation points represented within at least one captured image in 2D. For instance, in one example, the image system may receive an image of an object having a constellation. The image system may apply a pixel regressor and/or classification, such as random forest, non-linear regression, and/or convolutional neural network (CNN), to identify image points (e.g., points in the captured image that may correspond to a point within the constellation on the object). The image system may then determine the pose of the object based at least in part on the image points and model points correspondences.

In some situations, application of 3D-2D point correspondence to determine the 6DOF pose of the object relies on knowing or determining the identity of at least one image point. For example, each constellation point and the corresponding model point associated with an object may be assigned a unique identifier or ID which may be used to limit or restrain the number of candidates (e.g., sets of image point to model point relationships that may be used to generate a 6DOF pose) associated with the object based on the image points detected. For instance, each candidate may include a number of image point to model point correspondence sets (e.g., two or four point 2D to 3D correspondences) that could represent the pose of the object. However, following application of the pixel regressor, the location of an image point is known but the ID of the detected image points remains variable.

Conventional systems typically determine the identity of the image point by having the constellation point on the object emit a unique pattern. For example, the conventional system may cause an light emitting diode (LED) on the object to flash or turn on and off according to preassigned patterns. Thus, in the conventional system, the identity of the image points may be determined by processing a series of captured images of the object to detect the pattern associated with each of the individual image points. Unfortunately, in the conventional approach, the object is required to include active components that emit a visible pattern, which may be an irritation in the visible spectrum to other individuals in the physical environment (e.g., others not engaged in use of an image system). Additionally, when the constellation points on the object are required to emit a pattern, the object requires a power source which limits the type and increases the cost of physical objects that may be associated with a virtual environment. Unlike, the conventional system, the image system described herein, may be configured to utilize static constellation points, thus eliminating any irritation experienced by the other individuals in the physical environment. For example, the system described herein may utilize non-flashing LEDs as constellation points on the object. Additionally, configuring the image system to determine a pose using static constellation points on the object, eliminates the requirement that the object has a power source. Thus, the system and techniques described herein allow the integration of a larger array of physical objects into a virtual environment than conventional systems. For example, the object may be painted, dyed, or otherwise marked to display a desired color, pattern, or contrast without the use of LEDs or other light sources.

In one particular example, the object may be marked with a constellation via the use of infrared coatings. For example, when the object is a toy or other item in which the painting or coloring of the object is important, marking the object with a constellation in the visible spectrum may detract from the overall desirability or look and feel of the object. Thus, by using a coating that is undetectable in the visible spectrum but detectable in the infrared spectrum, the look and feel of the object may be maintained to the user. For instance, a coating may cause black and white or dark and light patterns on the object within the infrared spectrum. In this example, the image system may be equipped with an infrared imaging component or camera to capture and process the constellation for 6DOF pose detection purposes.

In one implementation, the image system may detect a user interaction with a physical object via one or more images captured by the image components of the image system. In some cases, the image system may first perform image point detection. For example, the image system may identify a number of image points associated with the image of the object by applying a pixel regressor to regress incident likelihood that a pixel contains an image point. Next the image system may apply suppression, such as non-max suppression, to the image data. In some cases, the application of the pixel regressor may be used to identify areas or groups of pixels that are highly likely to contain an image point of the object and the suppression may be utilized to identify which pixel of the group of pixels contains the image point.

In some cases, such as when the constellation points have unique or semi-unique features, the image system may also perform classification, such as CNN classification, multi-class support vector machine (SVM) classification, or a random forest classification, on the image points and the captured image to determine a feature or class (e.g., set of image points having the same feature) of the image points. For example, each constellation point on the object may be assigned a color which may be determined during the classification phase. Thus, in this example, the image points may belong to a class based on color (e.g., red image points, blue image points, yellow image points, etc.).

Once, the detection and classification of the image points is complete, the image system may enter a 6DOF pose estimation stage. In some cases, the image system may be configured to perform several different 6DOF pose estimations techniques based at least in part on a number of image points detected. For instance, in a first example, the image system may detect a set of six or more image points within the image. In this example, the image system may be configured to perform a 3D-2D correspondence by solving a linear system of equations using an object model and the detected image points. For example, the image system may solve the linear system of equations for each candidate. Each candidate may then be scored based on a number of inliers and/or a re-projection error and the candidate with, for example, the highest number of inliers may be utilized to generate the 6DOF pose of the object. In some cases, the output of the linear system of equations may be refined using a Gauss-Newton Optimization prior to selecting the candidate to generate the pose.

In another example, if the detected points are co-planar, then the image system may again solve a linear system of equations using the object model and the image points for each candidate. Again, the image system may refine the output of the linear system of equations using a Gauss-Newton Optimization prior to the selection of a candidate.

If fewer than four image points are detected, the image system may utilize a set of two or three image points to determine the 6DOF pose together with orientation data (e.g., orientation, acceleration, angular acceleration, tilt, roll, yaw, and/or position data, among others) of the image system and/or the object. For instance, the 6DOF pose of an object with respect to a perspective of the image system and/or the user may change as the image system and/or the user moves within the physical environment. Thus, the image system may be equipped with devices or components to determine orientation data of the image system, such as internal measurement units (IMU), accelerometers, gyroscopes, magnetometers, or a combination thereof. In these instances, the orientation data of the image system may be used to constrain the number of candidates. In this manner, the image system may utilize the set of two or more image points and the object model together with the orientation data to solve the linear system of equations for each candidate and to determine the 6DOF pose of the object relative to the perspective of the image system or user in substantially real-time.

In some examples, such as when the object is not stationary, the 6DOF pose of the object with respect to the perspective of the image system and/or the user also changes as the object is moved with respect to the image system and/or the user. In this example, the physical object may also be equipped with devices or components to determine the orientation data of the object. The object may also be configured to communicate with the image system, for example, via a wireless network. In this manner, the image system may receive orientation data from the object and utilize the set of two or more image points, the object model, the orientation data of the image system, and the orientation data of the object to solve the linear system of equations for each candidate in substantially real-time.

In each of the examples above, having sets of two or three, four or five, or six or more image points within the image received, it is possible that a large number of candidates may be tested, scored, and/or discarded before selecting a candidate to use in generating the 6DOF pose of the object. However, in many cases, the image received may be one image of a series of frames associated with a real-time or substantially real-time data capture. For example, the image system may include image components configured to capture live video of the physical environment and to process each frame of the live video to determine interaction with a physical object. In these cases, the system may be configured to limit the set of candidates or remove some of the candidates prior to testing. For example, a 6DOF pose of an object within a current frame may be predicted by the image system based at least in part on the known 6DOF pose of the object associated with a previous frame. The image points detected in the current frame may be mapped against the image points in the previous frame and the image system may determine a linear translation vector in the 2D space. Thus, some of the candidates may be removed using the linear translation vector. In some instances, the image system may select the candidates (e.g., image point to model point relationships usable to generate a 6DOF pose of the object). In these instances, the system described herein is capable of reducing the overall processing resources including power consumption and clock cycles necessary to perform the classification on the detected image points by tracking the object 6DOF pose over multiple frames.

In some implementations discussed herein, the image system may be configured to utilize the 6DOF pose of an object, the user, other users, the controller, or body parts of the user (such as the hand or head) as control inputs or user inputs. I in order to determine a physical object's 6DOF pose, in these implementations, the headset device and/or the controller may include an image components or devices to capture image data of the physical environment that may be processed in order to determine a 6DOF pose of the physical objects represented in the captured images. For example, the headset device may capture image of the physical environment including the controller. The controller may also capture images of the physical environment including image data of the headset device or user themselves. Both the headset device and the controller may perform a simultaneous locations and mapping (SLAM) technique to generate a shared map or virtual scene of the physical environment. The headset device may also utilize the image date to determine and track the 6DOF pose of the controller and the controller may utilize the image data to determine and track the 6DOF pose of the headset device or the user.

As discussed above, the image system may be configured to determine a 6DOF pose of an object from image data captured from a single perspective (e.g., the perspective of the image system and/or the perspective of the user). In these implementations, the object may be marked with a predetermined pattern or constellation. For instance, an object may be equipped with a number of active components, such as LEDs, arranged according to the predetermined pattern or constellation. The image system may also maintain a database or data store of object models including model points corresponding to constellation points. In some cases, the object models may be utilized in conjunction with images including the object having the constellations to determine the 6DOF pose and/or identify of the object by utilizing the 3D-2D point correspondence between model points and image points. For example, the object may be painted, dyed, or otherwise marked to display a desired color, pattern, or contrast without the use of LEDs or other light sources.

Additionally, in some implementations, the image data may be captured as a monochromic data (e.g., black and white images or images having varying tones within a single color). For example, use of monochrome cameras or image components are typically produce a sharper image than conventional color cameras as the monochrome cameras do not require color filters over the lenses. By using sharper images, the location or position of the points of the constellations may be more accurately determined, thereby improving special interactions between the virtual and physical environments. Additionally, by using a monochrome camera the costs associated with manufacturing the headset device and the controller of the image system may be reduced.

In some examples, each object model stored on the image system may represent a known object based on a corresponding constellation. In some cases, the constellation may be represented by the object model as a series or arrangement of model points in three dimensions. Thus, in some examples, the image system may determine the 6DOF pose of the object based on performing a 3D-2D point correspondence between one or more object models in 3D and constellation points represented within at least one captured image in 2D. For instance, in one example, the image system may receive an image of an object having a constellation, such as the controller. The image system may then identify image points within the image representing the object or controller. The image system may then determine a set of possible candidate 6DOF poses of the object or controller and select one of the candidate 6DOF poses as the 6DOF pose of the object or controller by testing the candidate 6DOF poses against the corresponding stored object model.

In one implementation, the image system may receive a monochrome image including image data representative of the object or controller. In some cases, the image may be a first image captured by the image components or device. For example, upon initialization the image system may determine a starting 6DOF pose of the controller, such that the image system may preform object tracking and use the 6DOF pose of the controller as a user input. In this implementation, the image system may segment the monochrome image into multiple patches. Some of the patches will include an image point or data representative of a point in the constellation on the controller. The image system may utilize a low-resolution search on each patch to determine each patch that includes data representative of an image point. The image system may identify the location of the image point within each patch including an image point by applying a weighted average via a sliding window over the patch.

Once more than a threshold number of image points are determined (such as four or six), the image system may generate multiple sets of image points (e.g., each possible combination of four or more image points given the detected image points). The image system may then, for each set of image points, generate at least one 6DOF pose candidate. For example, the image system may apply a perspective from N points (PnP) technique to generate a 6DOF pose based on each set of image points. In some case, the image system may utilize a perspective from 3 points techniques to generate the 6DOF poses. The image system may then determine a feasibility metric for each of the 6DOF poses and discard any 6DOF poses that are below a threshold (e.g., the 6DOF pose of the object or controller is physically impossible or highly unlikely).

In some examples, for the remaining candidates, the image system may project the model points into the image space using the candidate 6DOF pose and the image devices intrinsic characteristics or parameters. The image system may then mark each of the model points that are within a threshold distance (such as six pixels) of an image point as an inlier. The system may then select the candidate 6DOF pose with the largest number of inliers as the 6DOF pose. In some situations, two or more of the candidate 6DOF poses may each have the largest number of inliers. In these situations, the image system may select the candidate 6DOF pose as the base by selecting the candidate 6DOF pose with the lowest reproduction error.

In other cases, the image system may be in a tracking state or otherwise have a prior or past 6DOF pose of the object or controller that may be used to assist with determining a current 6DOF pose of the object or controller within a newly captured image. In a first example, the controller may be equipped with a measurement units to determine orientation data of the controller. For instance, as discussed above, the controller may be equipped with an IMU, accelerometers, gyroscopes, magnetometers, or a combination thereof. In these instances, the orientation data of the controller may be used to generate one or more forward predictive 6DOF poses of the object or controller (e.g., an extrapolative 6DOF pose of the object that corresponds to the 6DOF pose of the object at the time the newly capture image was taken). Each forward predictive 6DOF pose may then be projected by the image system into the image space and a number of inliers identified as discussed above. Again, the predictive 6DOF pose with the largest number of inliers or the lowest reproduction error may be selected as the 6DOF pose. In some cases, after projecting the predicative 6DOF poses, the image system may apply a PnP (for instance, efficient perspective from N points) technique to refine the 6DOF pose. By utilizing the predictive 6DOF poses to determine a small set of 6DOF poses that include a large number of inliers (e.g., are highly likely candidates of the physical 6DOF pose), the image system discussed herein may operate in substantially real-time (e.g., significantly faster than running a PnP technique on each possible 6DOF pose), and eliminate or reduce instances of unbounded run time as a 6DOF pose is always selected.

In an alternative example, the system may generate the predictive 6DOF poses by perturbing the prior 6DOF pose along the three angles and three translations. In one specific example, the image system may generate the forward predictive 6DOF pose using the orientation data from the controller and then perturb the forward predictive 6DOF pose along the three angles and three translations to generate a plurality of predictive 6DOF poses that may be projected into the image.

In some cases, less than the threshold number of image points may be available in the newly captured image. In these cases, the image system may utilize the orientation data received from the controller or object to assist with determining the 6DOF pose. For example, the image system may determine a predicted rotation of the controller or object from the prior 6DOF pose to the current 6DOF pose based on the orientation data (e.g., data collected by a gyroscope on the controller). The image system may also approximate a depth of the controller or object (e.g., a distance between the headset and the controller). In a first example, the image system may take the estimate of the depth determined from the orientation data as true.

In a second example, the image system may approximate the depth by using a weak perspective. In this example, the perspective effects of the image device are negligible with respect to the object. For instance, the distance between the nearest point of the object and the farthest point of the object is small in comparison to the distance between the controller or object and the headset device equipped with the image device or components. Due to the relative distance, the image system may determine a ratio of the distance in image space versus distance in model space. The ratio may be used to determine a scaler value that may be used to determine depth with respect to the newly captured image.

In a third example, the image system may approximate the depth by using an edge lengths within the image and model. For instance, the image system may determine a plurality of ratios of image object to model object. The image system may then select the most common ratio as a scaler value that may be used to determine depth with respect to the newly captured image.

Once the depth (e.g., z position of the object) and the rotation of the controller or object are known, the image system may determine the translation based at least in part on determining X and Y in closed form. For example, the rotation may provide three degrees of freedom and the depth may provide input as a fourth degree of freedom for determining a six degree of freedom 6DOF pose. The image system may then bring the X and Y values into the same coordinate space by rotating the model. The image system projects model points of the rotated model into the image space at the approximated depth. The system may then use the projected model points and image points to determine the 6DOF pose.

In an alternative implementation, the image system may rely on processing or identifying the controller itself within the image data opposed to detecting the image points corresponding to the constellations on the controller or object. In this implementation, the image system may divide the newly captured image into a plurality of patches. The image system may then, for each patch, determine if the patch includes image data associated with the desired object or controller.

The image system may determine the orientation of the controller or object by applying a classifier or regressor to the patches having image data associated with the controller and then determine a translation of the controller based at least in part on the orientation and a prior 6DOF pose. For example, the image system may apply a pixel regressor and/or classification, such as random forest, non-linear regression, and/or CNN. The image device may also determine a scale associated with the image and then determine a depth of the controller based at least in part on the scale of the image.

As discussed above, once the depth (e.g., z position of the object) and the rotation of the controller or object are known. The image system may determine the X and Y in closed form. For example, the image system may then bring the X and Y values into the same coordinate space by rotating the model. The image system projects model points of the rotated model into the image space at the approximated depth. The system may then use the projected model points and image points to determine the 6DOF pose.

In some cases, the controller or object may also be equipped with an image device, such as a monochrome camera. In these cases, the image system may track the position of the controller and/or headset device by detecting markers (such as LEDs on the headset device in a manner discussed above). In some cases, the headset device and the controller may each be equipped with image devices and preform object tracking of each other using a shared scene or virtual environment map. Thus, when the controller is out of view to the headset device, such as when the user has their arms above their head, the controller's position and 6DOF pose may still be tracked if the headset device is in view of the controller (e.g., the top of the headset device is in view of the image device on the controller). In this case, the amount of movement the image system allows the user to operate in has been increased over the conventional on headset camera systems.

Generally, the LEDs or makers on the heads device are not visible to the user of the system as the LEDs or markers on the controller would be. Thus, the addition of the LEDs or markers, even active LEDs, on the headset device do not produce the irritation to the user in a manner that flashing or active LEDs on the controller or interactive object would. In this case, the controller may utilize techniques for tracking the 6DOF pose of the headset device that improve overall performance by limiting the number of candidate 6DOF poses tested by the system.

In some cases, the controller (or object) and the headset device may maintain a shared scene or virtual environment map. For example, both controller and headset device may perform a SLAM technique on a shared scene map to update the virtual environment and to maintain the 6DOF poses of the headset device (thereby the user) and the controller. In one example, the controller may be equipped with a wireless communication device and transmit the captured image data and/or the 6DOF pose of the headset device to the headset device or other remote device for processing. In some cases, by tracking the 6DOF pose of the headset device, the image system may more quickly recover the tracking when lost without the need of external image devices positioned around the physical environment.

In one example, the controller may be used as a base station that may be mounted or placed in a stationary position in view of the user, such that the base station may preform tracking on headset device and/or user. In some cases, the controller or base station may be used to allow for natural user interface (NUI), for instance, by tracking the body 6DOF pose of the user or a hand of the user.

Thus, unlike conventional systems that typically rely on multiple external imaging devices positioned in the physical environment to capture images of physical objects from multiple angles, the image component associated with the image system described herein may be approximate to or adjacent to the display and the controller, such that the captured images are from substantially the user's perspective and/or the perspective of the image system. As such, unlike the conventional system which restricts the user to a predefined area or space equipped with the external image devices, the system or devices described herein allow the user greater freedom of movement (e.g., the user does not need to keep the controller in view of the headset device) and to move from physical environment to physical environment without additional setup, interrupting the virtual experience or loss of the ability to interact with the physical objects.

FIG. 1 illustrates an example physical environment 100 including a user 102 of an image system 104 interacting with a first physical object or controller 106. In some cases, the image system 104 may be configured to use the 6DOF pose of the controller 106 as a user input or as part of a user input within the virtual environment. In these cases, the user 102 may point or otherwise position the controller 106, such that the image system 104 may perform one of a plurality of operations selected base on a determined 6DOF pose of the controller 106. For instance, in one specific example, the user 102 may point the controller 106 at a second object 108 (e.g., the table 108). The image system 104 may first identify based on detecting the 6DOF pose of the controller 106 that the controller 106 is pointed at the table 108. The image system 106 may then perform an operation such as selecting or highlighting the table 108 in response to determining that the user 102 has pointed the controller 106 at the table 108. In this specific example, once the table 108 is selected, the user 102 may transition the controller 106 to a second pose, for instance, the user 102 may rotate the controller 106 by 90 degrees. The image system 104 may detect the change in 6DOF pose or the second 6DOF pose of the controller 106 in a subsequent frame or image and interpret the second 6DOF pose as a second user input and, in response, the image system 106 may rotate the table 108 90 degrees within the virtual environment.

In some examples, the image system 104 is configured to allow the user 102 to actively engage with the virtual environment by physically interacting (e.g., moving, arranging, etc.) the physical objects within the physical environment 100. Thus, the image system 104 may select and perform operations within the virtual environment based on determined poses or changes in the 6DOF pose of the controller 106 as well as 6DOF poses of other objects in the physical environment 100, such as the toy 110.

In order to detect the 6DOF pose of the physical objects 106 or 110, the image system 104 may include one or more image components to capture images or frames of the physical environment 100 from substantially the perspective or view of the user 102 and/or the image system 104. Thus, in some cases, the image system 104 may capture the images or frames of the physical environment 100 based on a field of view 112 substantially similar to a field of view of the image system 104 and/or the user 102 when interacting directly with the physical environment 100.

In the illustrated example, the user 102 is interacting with a controller 106 within the field of vision 112 of the image system 104. In this example, the controller 106 may include constellation points, such as static colored LEDs, static visible markings (e.g., colored portions formed from coatings, plastics, etc.), infrared markings (e.g., an infrared coating that is clear in the visible spectrum), among others. The image system 104 may capture at least one image or frame including data representative of the controller 106. Within the image data, a number of constellation points may be visible and detected by the image system 106. For example, the image system 104 may perform operations associated with image point detection such as a applying a pixel regressor to determine sets or groups of pixels within the image likely to contain an image point (e.g., a representation of the physical constellation point within the captured image). The image system 104 may also perform suppression on image data during the image point detection to identify the positions or pixels corresponding to individual image points within each set of pixels.

In some cases, such as when color is used to classify the image points, the image system 104 may also perform classification (such as CNN classification) on the image points to determine, for instance, color pairs, which may be used to limit the number of candidates that may be used to generate the 6DOF pose of the controller 106. In other examples, such as when the constellation points on the physical objects 106-110 are uniform, the image system 104 may utilize a 6DOF pose from a previous frame or orientation data of the image system 104 or the object 106-110 in lieu of performing the classification or in addition to classification.

Once, the image points are detected and optionally classified, the image system 104 may enter a 6DOF pose estimation stage. During 6DOF pose estimation, a number of candidates may be generated. The image system 104 may test each of the candidates by solving linear equations based at least in part on an object model representative of the controller 106 and the image points detected. The object model may include model points representative of the constellation points. For instance, in one specific example, each of the candidates may be tested in order to determine a number of image point to model point geometric inliers associated with the candidate as well as a re-projection error metric. In the illustrated example, the image system 104 may select one of the candidates to generate the 6DOF pose of the controller 106 for the current image or frame based on the number of inliers (e.g., the candidate or image point to model point relationship sets that generated the largest number of inliers) and/or the re-projection error metric (e.g., the candidate with the lowest associated re-projection error metric). Once a candidate is selected, the 6DOF pose of the controller 106 may be determined and the image system 104 may utilize the 6DOF pose for various purposes, such as a control or user input.

Figure 2:
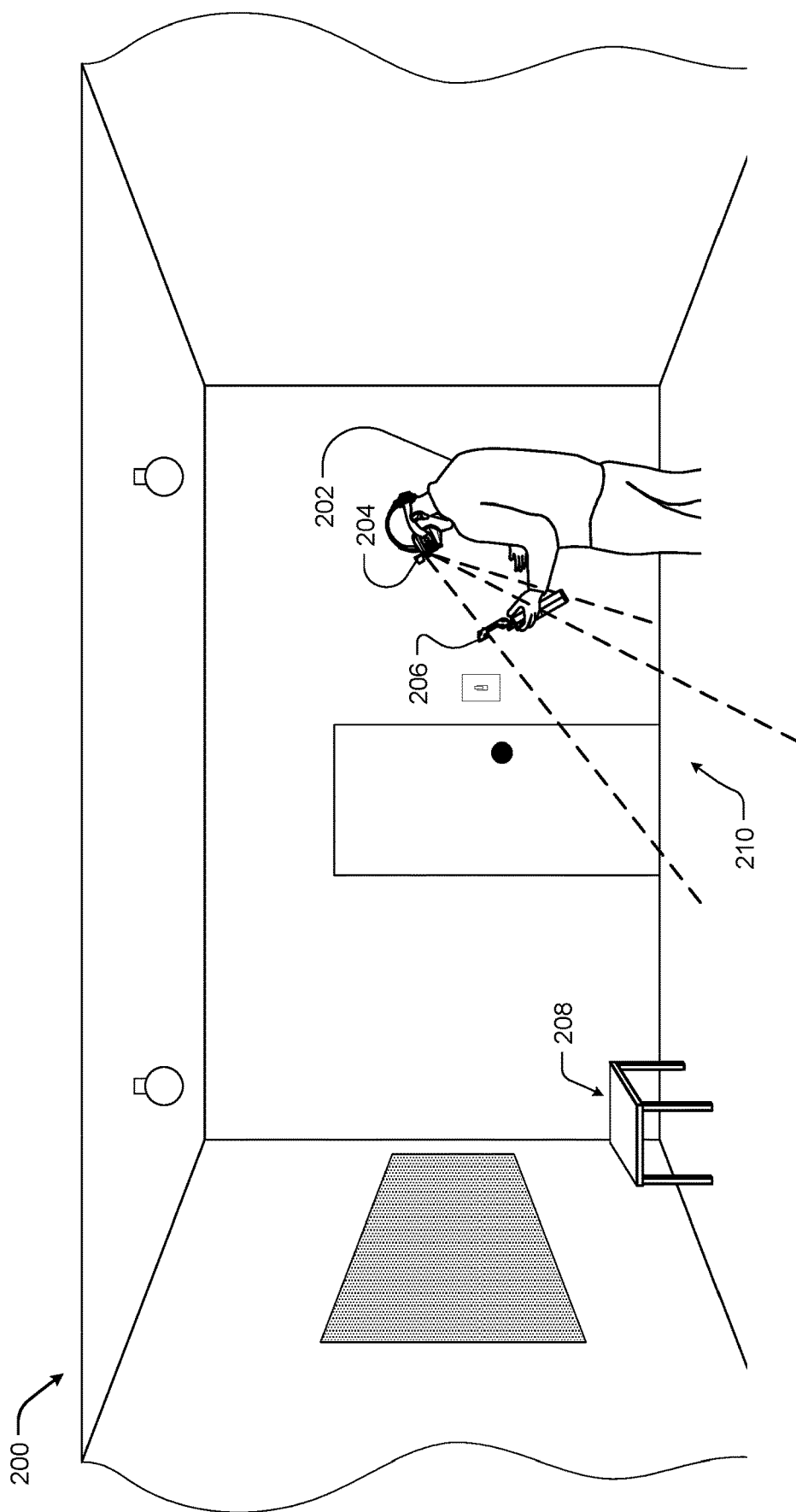
FIG. 2 illustrates an example physical environment including a user interacting with a mixed reality image system having a headset device performing tracking according to some implementations.

FIG. 2 illustrates an example physical environment 200 including a user 202 interacting with a mixed reality image system having a headset device 204 performing tracking according to some implementations. In some cases, the image system may be configured to use the 6DOF pose of a controller 206 as a user input or as part of a user input within the virtual environment. In these cases, the user 202 may point or otherwise position the controller 206, such that the image system may perform one of a plurality of operations selected base on a determined 6DOF pose of the controller 206. For instance, in one specific example, the user 202 may point the controller 206 at a second object (e.g., the table 208). The image system may first identify based on detecting the 6DOF pose of the controller 206 that the controller 206 is pointed at the table 2108. The image system may then perform an operation such as selecting or highlighting the table 208 in response to determining that the user 202 has pointed the controller 206 at the table 208. In this specific example, once the table 208 is selected, the user 202 may transition the controller 206 to a second 6DOF pose, for instance, the user 202 may rotate the controller 206 by 90 degrees. The image system may detect the change in 6DOF pose or the second 6DOF pose of the controller 206 in a subsequent frame or image and interpret the second 6DOF pose as a second user input and, in response, the image system may rotate the table 208 by 90 degrees within the virtual environment.

In some examples, the image system is configured to allow the user 202 to actively engage with the virtual environment by physically interacting (e.g., moving, arranging, etc.) the physical objects within the physical environment 200. Thus, the image system may select and perform operations within the virtual environment based on determined 6DOF poses or changes in 6DOF pose of the controller 206 as well as 6DOF poses of other objects in the physical environment 200.

In order to detect the 6DOF pose of the controller 206, the headset device 204 may include one or more image components to capture images or frames of the physical environment 200 from substantially the perspective or view of the user 202. Thus, in some cases, the image system 2104 may capture the images or frames of the physical environment 200 based on a field of view 210 substantially similar to a field of view of the headset device 204 and/or the user 202 when interacting directly with the physical environment 200.

In the illustrated example, the user 202 is interacting with a controller 206 within the field of vision 210 of the headset device 204. In this example, the controller 206 may include constellation points, such as static LEDs, static visible markings (e.g., colored portions formed from coatings, plastics, etc.), infrared markings (e.g., an infrared coating that is clear in the visible spectrum), among others. The headset device 204 may capture at least one image or frame including data representative of the controller 206. Within the image data, a number of constellation points may be visible and detected by the image system. For example, the image system may perform operations associated with image point detection.

Once, the image points are detected, the image system may enter a 6DOF pose estimation stage. During 6DOF pose estimation, a number of 6DOF pose candidates may be generated in a number of different ways. For example, as discussed above, the image data captured by the headset device 104 may be monochromic. Thus, the image system may be configured to detect the image points and determine the 6DOF pose of the controller 206 using monochrome images.

In a first example, the image system may segment the image into multiple patches. Some of the patches will include an image point or data representative of a point in the constellation on the controller 206 as the controller 206 is within the field of view 210. The image system may utilize a low-resolution search on each patch to determine each patch that includes data representative of an image point. The image system may identify the location of the image point within each patch including an image point by applying a weighted average via a sliding window over the patch.

Once more than a threshold number of image points are determined (such as four or six), the image system may generate multiple sets of image points. The image system may then, for each set of image points, generate at least one 6DOF pose candidate. For example, the image system may apply a PnP technique to generate a six-degree of freedom 6DOF pose based on each set of image points. The image system may also determine a feasibility metric for each of the 6DOF poses and discard any 6DOF poses that are below a feasibility threshold. In some instances, for the remaining candidates, the image system may project the model points into the image space using the candidate 6DOF pose and the camera intrinsic characteristics or parameters of the headset device 104. The image system may mark each of the model points that are within a threshold distance (such as six pixels) of an image point as an inlier. The system may then select the candidate 6DOF pose with the largest number of inliers as the 6DOF pose of the controller 106. In some situations, two or more of the candidate 6DOF poses may each have the largest number of inliers. In these situations, the image system may select the candidate 6DOF pose as the base by selecting the candidate 6DOF pose with the lowest reproduction error.

In a second example, the controller 206 may be equipped with a measurement units to determine orientation data of the controller. In these instances, the orientation data of the controller 206 may be used to generate one or more forward predictive 6DOF poses of the controller 206. Each forward predictive 6DOF pose may be projected by the image system to project the 6DOF pose into the image space and a number of inliers identified as discussed above in the first example.

In a third example, the image system may generate the predictive 6DOF poses by perturbing the prior 6DOF pose along the three angles and three translations. In one specific example, the image system may generate the forward predictive 6DOF pose of the controller 206 using the orientation data from the controller 206 and then perturb the forward predictive 6DOF pose along the three angles and three translations to generate a plurality of predictive 6DOF poses that may be projected into the image. Each of the predictive 6DOF poses may then be projected into the image space and a predictive 6DOF pose selected as the 6DOF pose of the controller 206.

In a fourth example, less than the threshold number of image points may be available in the field of view 210. In these cases, the image system may utilize the orientation data received from the controller 206 to assist with determining the 6DOF pose. For example, the image system may determine a predicted rotation of the controller 206 from the prior 6DOF pose and the orientation data. The image system may also approximate a depth of the controller 206. For instance, the image system may take the estimate of the depth determined from the orientation data as true. Alternatively, the image system may approximate the depth by using a weak perspective. In this alternative, the perspective effects of the image device are assumed to be negligible with respect to the controller 206 and the image system may determine a ratio of the distance in image space versus distance in model space. The ratio may be used to determine a scaler value that may be used to determine depth with respect to the newly captured image. In another alternative, the image system may approximate the depth by using an edge lengths within the image and model. For instance, the image system may determine a plurality of ratios of image object to model object. The image system may then select the most common ratio as a scaler value that may be used to determine depth with respect to the newly captured image.

In this example, once the depth and the rotation of the controller 106 are known, the image system may determine the translation based at least in part on determining X and Y in closed form. For instance, the image system projects model points of the rotated model into the image space at the approximated depth. The system may use the projected model points and image points to determine the 6DOF pose of the controller 206.

In a fifth example, the image system may rely on processing or identifying the controller 206 itself within the image data opposed to detecting the image points corresponding to the constellations on the controller 106. In this implementation, the image system may divide the newly captured image into a plurality of patches. The image system may then, for each patch, determine if the patch includes image data associated with the desired object or controller.

The image system may determine the orientation of the controller or object by applying a classier or regressor to the patches having image data associated with the controller 206 and then determine a translation of the controller 206 based at least in part on the orientation and a prior 6DOF pose. The image device may also determine a scale associated with the image and a depth of the controller 206 based at least in part on the scale of the image.

Figure 3:
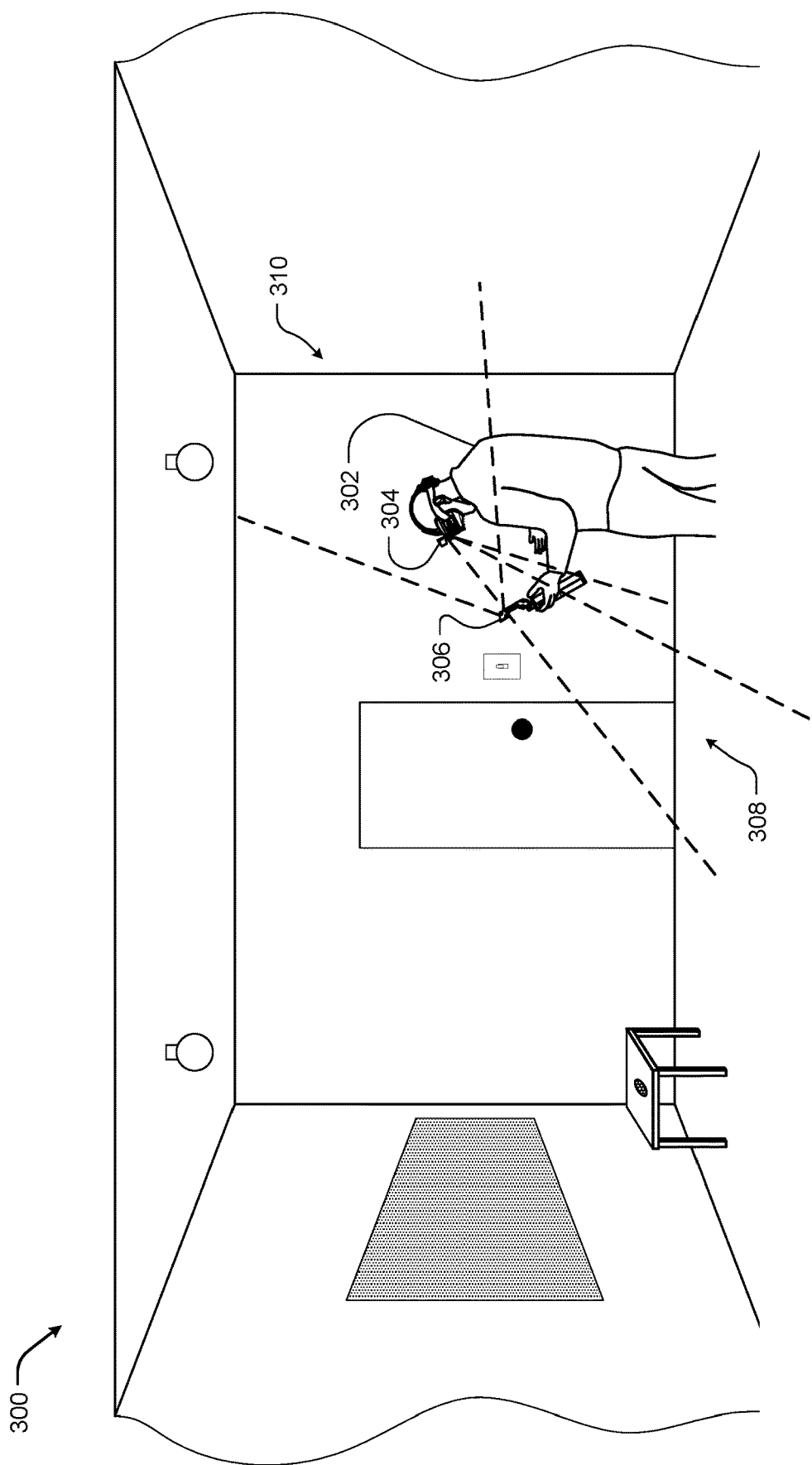
FIG. 3 illustrates yet another example physical environment including a user interacting with a mixed reality image system having a headset device and a controller performing tracking according to some implementations.

FIG. 3 illustrates yet another example physical environment 300 including a user 302 interacting with a mixed reality image system having a headset device 304 and a controller 306 performing tracking according to some implementations. In the current example, both the headset device 304 and the controller 306 may be equipped with one or more image components or devices to capture image data along a corresponding field of view 308 and 310. In this example, both the headset device 304 and the controller 306 may track the 6DOF pose of the other using a shared map or scene. Thus, in some cases, both the headset device 304 and the controller 306 may be equipped with image components as well as markers, such as LEDs or inferred patterns.

In one example, the image data collected by both the headset device 304 and the controller 306 may be used to generate a virtual scene or map of the physical environment, as well as to located the user within the virtual scene. In some cases, since both the controller 306 and the headset device 304 are tracking the 6DOF pose of the other (as well as other objects, such as the user), the image system may be able to utilize both the 6DOF pose of the user 302 and the 6DOF pose of the controller 306 as a combination natural input to the virtual scene or image system. For example, pointing the controller 306 at an object and rotating the head of the user 302 may be an input to select the object the controller 306 is pointed at to a location in view of the head of the user 302.

In one particular example, the controller 306 may perform SLAM based tracking and mapping of the user 302 and/or the headset 304. For instance, the headset may be equipped with markers, including active markers such as flashing LEDs. The controller 306 may receive an image. In some cases, the image may include infrared image data. The controller 306 may then apply a pixel regressor to the image data to identify one or more sets of pixels that may include an image point (e.g., the image point may correspond to a constellation point on the headset 304). In some instances, the image system may perform regression of image point detection likelihoods on a per pixel basis. For instance, the image system may perform random forest or convolutional neural net operations on the image to determine a probability that each pixel within the image may contain an image point. In some cases, the output of the pixel regressor may include a mapping wherein each pixel is converted to a value between zero and one. In these cases, the value is representative of the likelihood or percentage that each pixel contains an image point (e.g., a value of zero is 0% likelihood of a pixel having an image point and a value of one is 100% likelihood of a pixel having an image point). Thus, pixels with values close to zero have a low likelihood of containing an image point while pixels with a value close to one have a high likelihood of containing an image point.

The controller 306 may next perform suppression on the sets of pixels to determine a pixel associated with each of the image points. For instance, the controller 306 may perform suppression, such as non-max suppression, on the mapping of likelihoods output by the pixel regressor, in order to select a pixel within each set of pixels that are likely to contain an image point as the pixel that contains the image point. It should be understood that while the image system discussed above selects a pixel as the pixel containing the image point, in some cases, more than one pixel may be representative of the image point (e.g., when the constellation points are large enough to be represented by multiple pixels) and in these cases, the image system may select a group of pixels as the pixels containing the image point.

The controller 306 may also perform classification on the image points to determine a class of the image points. For example, each image point may include a feature or unique characteristic, such as a unique color, pattern, or shading. In some cases, the image system may perform classification operations, such as operations associated with CNN classification, multi-class SVM, or a random forest classifier, on the image points to determine the class, feature, or characteristic. In some instances, the classification of the image points may result in an output of image point pairs (e.g., a blue image point paired with a yellow image point). Additionally, it should be understood that any number of image positions may share a class.

The controller 306 may also determine a set of candidates that may be utilized to generate the 6DOF pose of the object based at least in part on the class and a position of the image point. As discussed above, each of the candidates may be a set of image point to model point relationships that may be used to generate a 6DOF pose associated with the object. For instance, each candidate may include a number of image point to model point correspondence sets that may represent the 6DOF pose of the object.

In a first example, the image system may determine the set of candidates based on a previous 6DOF pose from a previous frame when available. For example, once the image points of the current frame are determined, the determined image points may be mapped against the image points in the previous 6DOF pose to identify a linear translation vector in the 2D space. Some of the candidates may be eliminated when the candidate has corresponding model points that exceed a margin of error supported by the linear translation vector. In some instances, use of the linear translation vector allows the linear equations used to test the candidates to be converted from a 2D to 3D (e.g., image point to model point) correspondence to be a 2D to 2D (e.g., current image point to previous image point) correspondence.

In other situations, such as during initialization of the image system use of a previous 6DOF pose to determine the current 6DOF pose of the object may be unavailable. In some of these situations, the image system and/or the object itself (e.g., the headset 206) may be equipped with a measurement unit (e.g., an IMU, gyroscope, accelerometer, magnetometer, other device capable of capturing changes in orientation, position, or momentum of the object, or a combination thereof) to capture orientation data (e.g., acceleration, angular momentum, rotation data, pitch, roll, yaw, etc.) associated with the image system and/or the object. In some cases, when the orientation data of the headset 306 is available, the candidate may be selected and the 6DOF pose determined when as few as two image points are available in the captured frame or image.

In still other situations, the use of a previous frame and the orientation data of the headset 306 may be unavailable. In these instances, the candidate 6DOF pose may be selected based at least in part on the object model and the image points detected. For example, the controller 306 may generate candidates based on sets of four or more image points per object. In some cases, during image point detection, the controller 306 may be configured to generated pairs of classified image points that may be utilized to limit the number of candidate 6DOF poses, such that the candidates 6DOF poses may each be tested in substantially real-time or within a time frame that the user is unable to detect a pause or lag.

The controller 306 may then determine a 6DOF pose of the object based at least in part on the candidate 6DOF poses and an object model associated with the object. For instance, each of the candidate 6DOF poses may be tested or used to solve a set of linear equations in order to determine a number of inliers as well as a re-projection error metric. In one specific example, the image system may utilize RANSAC operations in association with the object model and the candidates to determine a number inliers. In this example, the image system may select one of the candidates to use to generate the 6DOF pose of the object based on the number of inliers and/or the re-projection error metric.

While the discussion above includes the 6DOF pose estimation being performed by the controller 306, it should be understood that in some implementations classification may not be performed on the controller 306 but on other components or devices associated with the image system 300 and that an iterative approach to candidates testing may be utilized.

At substantially the same time, the headset device 306 may be tracking a 6DOF pose of the controller 306. In this case, the controller 304 may utilize non-color markers or infrared markers to reduce irritation to the user 304 as the controller 306 may be visible to the user 302 either within the virtual environment or within the physical environment. Thus, the headset device 304 may receive an image, such as a monochrome image. The headset device 304 may then identify image points associated with an object or controller 306 within the image. For instance, the headset device 304 may apply a pixel regressor to the image data to determine sets or groups of pixels within the image likely to contain an image point. The headset device 304 may also perform suppression on image to identify the position or pixel corresponding to individual image points within each set of pixels.

In one example, the headset device 304 may segment the image into multiple patches. Some of the patches will include an image point or data representative of a point in the constellation. The headset device 304 may utilize a low-resolution search on each patch to determine each patch that includes data representative of an image point. The headset device 304 may identify the location of the image point within each patch including an image point by applying a weighted average via a sliding window over the patch.

The headset device 304 may determine a set of candidate 6DOF poses that may be utilized to generate the 6DOF pose of the controller 306 or object. In some examples, each of the candidate 6DOF poses may be a set of image point to model point relationships that may be used to generate a 6DOF pose associated with the controller 306. For instance, the headset device 204 may generate multiple sets of image points and, then, for each set of image points, generate at least one candidate 6DOF pose. In other cases, the headset device 304 may utilize orientation data of the controller 306 may be used to generate one or more candidate 6DOF pose. In an alternative example, the headset device 304 may generate the candidate 6DOF pose by perturbing the prior 6DOF pose along the three angles and three translations. In one specific example, the headset device 304 may generate the forward predictive 6DOF pose using the orientation data from the object and then perturb the forward predictive 6DOF pose along the three angles and three translations to generate a plurality of candidate 6DOF poses.

The headset device 304 may also determine a 6DOF pose of the controller 306 or object based at least in part on the image points, the set of candidate 6DOF poses, and the object model associated with the object. For instance, each of the candidate 6DOF poses may be project into the image space and a number of inliers determined based on a distance between each projected point and the nearest image point. The candidate 6DOF pose having the largest number of inliers may be selected as the 6DOF pose. In the case that multiple candidate 6DOF poses have the largest number of inliers, then the image system may select the remaining candidate 6DOF pose having the lowest reprojection error.

Again, the discussion above includes the 6DOF pose estimation being performed by the headset device 304, it should be understood that in some implementations classification may not be performed on the headset device 304 but on other components or devices associated with the image system 300 and that an iterative approach to candidates testing may be utilized.

Additionally, it should be understood, the 6DOF pose of the headset device 304 determined by the controller 306 is a 6DOF pose of the headset 304 relative to the controller 206 and that the 6DOF pose of the controller 306 determined by the headset device 304 is a 6DOF pose of the controller 306 relative to the headset device 304 within a shared scene or map of the physical environment. For example, the map or scene may be shared between the controller 306 and the headset device 304 such that as each device 306 and 304 collects image data, the map may be updated. Thus, the controller 306 and/or the headset device 304 may determine the 6DOF pose of the other relative to the shared scene, using the relative poses (e.g., controller 306 to headset 304 or headset 304 to controller 306) and a known location relative to the shared map or scene.

Figure 4:
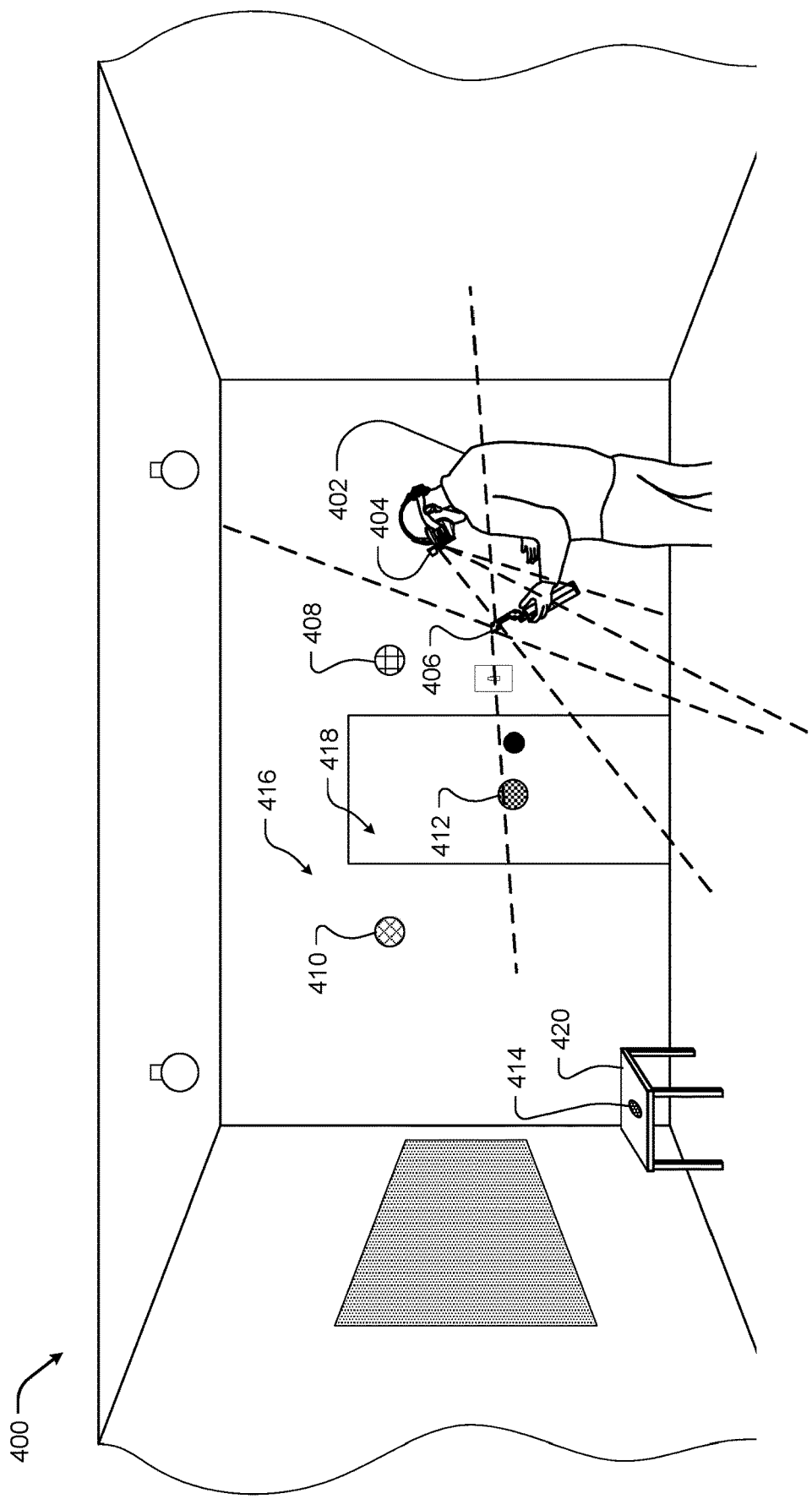
FIG. 4 illustrates another example physical environment including a user interacting with a mixed reality image system having tracking enhancement tags within the physical environment according to some implementations.

FIG. 4 illustrates another example physical environment 400 including a user 402 interacting with a mixed reality image system having tracking enhancement tags 408-414 within the physical environment 400 according to some implementations. As discussed above with respect to FIGS. 1-3, the image system may be configured to use the 6DOF pose of the controller 406 as a user input or as part of a user input within the virtual environment. In these cases, the user 402 may point or otherwise position the controller 406, such that the image system may perform one of a plurality of operations selected base on a determined 6DOF pose of the controller 406. In other cases, the system may also utilize a 6DOF pose of the user 402 as an input.

In some cases, in order to determine the 6DOF pose of the controller 404, the headset device 404, or the user 402, the controller 406 and the headset device 404 may include one or more image components to capture images or frames of the physical environment 400.

In this example, the headset device 404 may include constellation points, such as static colored LEDs, active colored LEDs, static visible markings (e.g., colored portions formed from coatings, plastics, etc.), infrared markings (e.g., an infrared coating that is clear in the visible spectrum), among others. The headset device 404 may capture at least one image or frame including data representative of the controller 406. Within the image data, a number of constellation points of the controller 406 may be visible and detected by the image system. For example, the image system may perform operations associated with image point detection and then determine a 6DOF pose of the controller 406.

Likewise, the controller 406 may include constellation points, such as static colored LEDs, active colored LEDs, static visible markings (e.g., colored portions formed from coatings, plastics, etc.), infrared markings (e.g., an infrared coating that is clear in the visible spectrum), among others. The controller 406 may capture at least one image or frame including data representative of the headset device 404. Within the image data, a number of constellation points of the headset device 406 may be visible and detected by the image system. For example, the image system may perform operations associated with image point detection and then determine a 6DOF pose of the headset device 404.

In one specific example, the headset device 404 and/or the controller 406 may be utilized to generate a shared map of the physical environment 400. In some cases, the 6DOF pose of the headset device 404 and/or the controller 406 may be relative to the shared map. In this example, to assist with generating the shared map and for determining a 6DOF pose of either the headset device 304, the controller 306, or the user 402 (e.g., the user 402 or a body part of the user 402), the physical environment 400 may be equipped with tracking enhancement tags, such as tags 408-414. For example, the tags 408-414 may be patterned or otherwise distinguishable by the image system when is captured of the environment 400. Thus, in a manner, similar to detecting an object as discussed herein, the system may detect features of the environment, such as the wall 416, the door 418, or the table 420 using constellation points formed by the tracking enhancement tags or stickers 408-414. In some instances, as the tags 408-414 are patterned within the infrared spectrum, the tags 408-414 may go unnoticed by the user 402 when not engaged with the image system discussed herein.

In other example, the tags 408-414 may be coded with data that usable by the system to determine orientations of the tags 408-414. For example, the tags 408-414 may be pattern in a manner that an upright position of the tags 408-414 may be determined by the system when the image data includes the tags 408-414.

In some cases, the headset device 404 and/or the controller 406 may be configured to perform a SLAM technique with respect to each of the tracking enhancement tags 408-414. For instance, the headset device 404 and/or the controller 406 may locate the 6DOF pose of each of the tracking enhancement tags 408-414 within the 3D model of the physical environment 400. Thus, the headset device 404 may track both the 6DOF pose of the controller 406 and the 6DOF pose of each of the tags 408-414 in view. Likewise, the controller may track both the 6DOF pose of the headset device 404 and the 6DOF pose of each of the tags 408-414 in view.

In some specific example, the pose of the tracking enhancement tags 408-414 may be tracked using fewer than 6 dimension of freedom as the tags 408-414 do not move relative to the physical environment 400.

Figure 5:
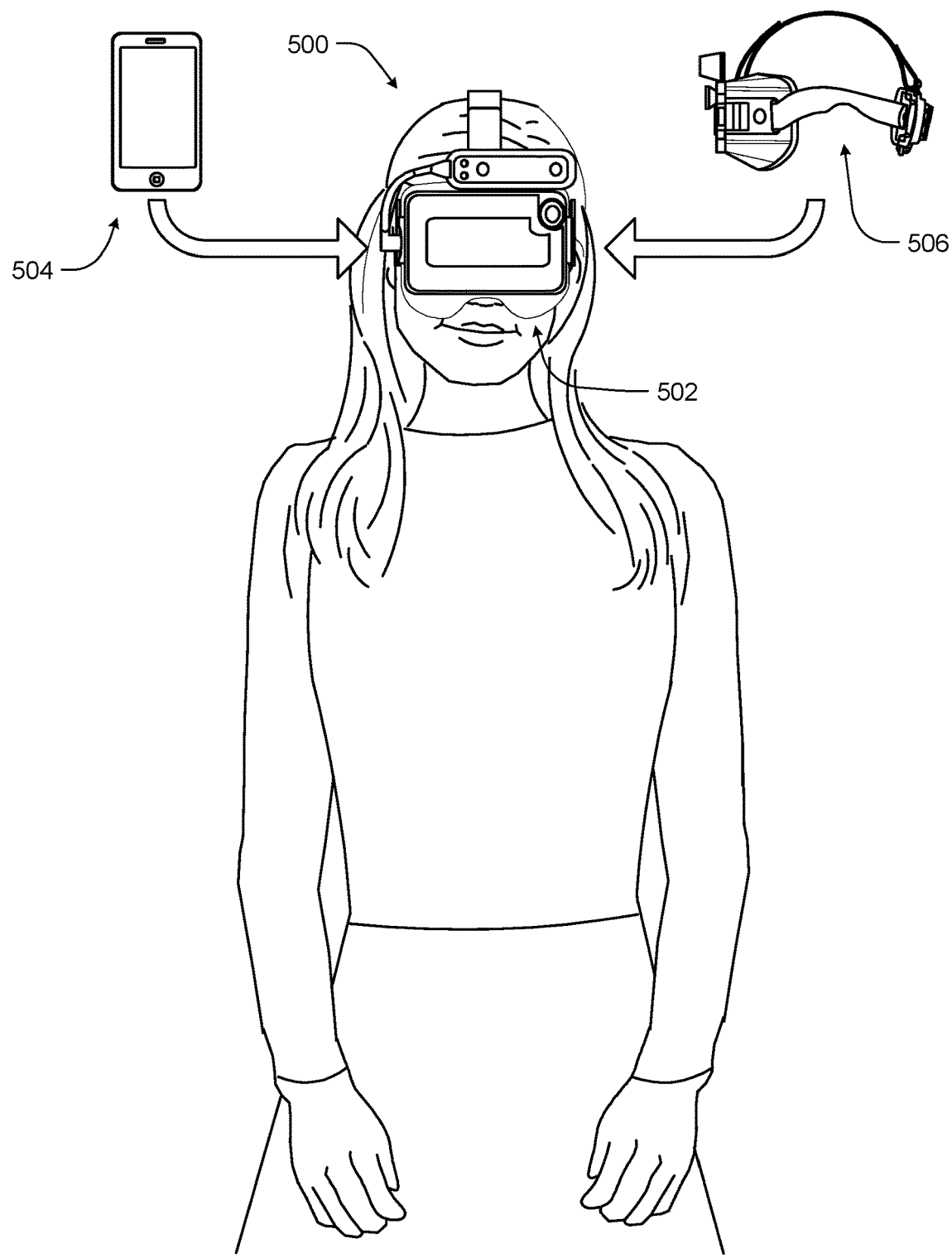
FIG. 5 illustrates an example user engaged with a virtual environment generated by an imaging system according to some implementations.

FIG. 5 illustrates an example user 500 engaged with a virtual environment generated by an image system 502 according to some implementations. In some implementations, the image system 502 may include an electronic device 504 and a headset device 506. For instance, the image system 502 may be modular, such that the headset device 506 may be compatible with a verity of electronic devices 504 having a virtual environment application installed. In some instances, the image system 502 may be configured to provide an enclosed environment from which the virtual environment may be viewed, while in other instances, the image system 502 may be an open air design. In one particular implementation, the image system 502 may be convertible from an open air system to an enclosed system. In other examples, the image system 502 may be a self-contained unit that includes processing resources, sensors or image components, displays, lenses, projects, etc. In this example, the image system 502 take other forms, such as a handheld system or other designs that may or may not fit on the user's 500 head.

As discussed above, in one example, the electronic device 504 may be a portable electric device, such as tablets, netbooks, laptops, cell phones, mobile phones, smart phones, etc. that includes processing and storage resources, such as processors, memory devices, and/or storage devices. The headset 506 may include components configured to secure the electronic device 504 in a manner viewable by the user 500 as well as sensors, measurement units or devices, and image components for capturing images and/or video from a physical environment. In some cases, the headset 506 may also include projectors to, for instance, project a grid or pattern within the physical environment to assist with determining positions and surfaces of the physical environment. For instance, the image system 502 may be configured to perform operations, such as structured light, such as stationary objects (e.g., walls, furniture, etc.). In some specific examples, the headset 506 may also be equipped with specialized viewing lenses that together with the display of the electronic device 502 cause the user 500 to experience the virtual environment in 3D.

While FIG. 5 illustrates the image system 502 utilizing a headset device 506 it should be understood that in some examples the image system 502 may operate as other wearable electronics or as hand held electronic devices.

Figure 6:
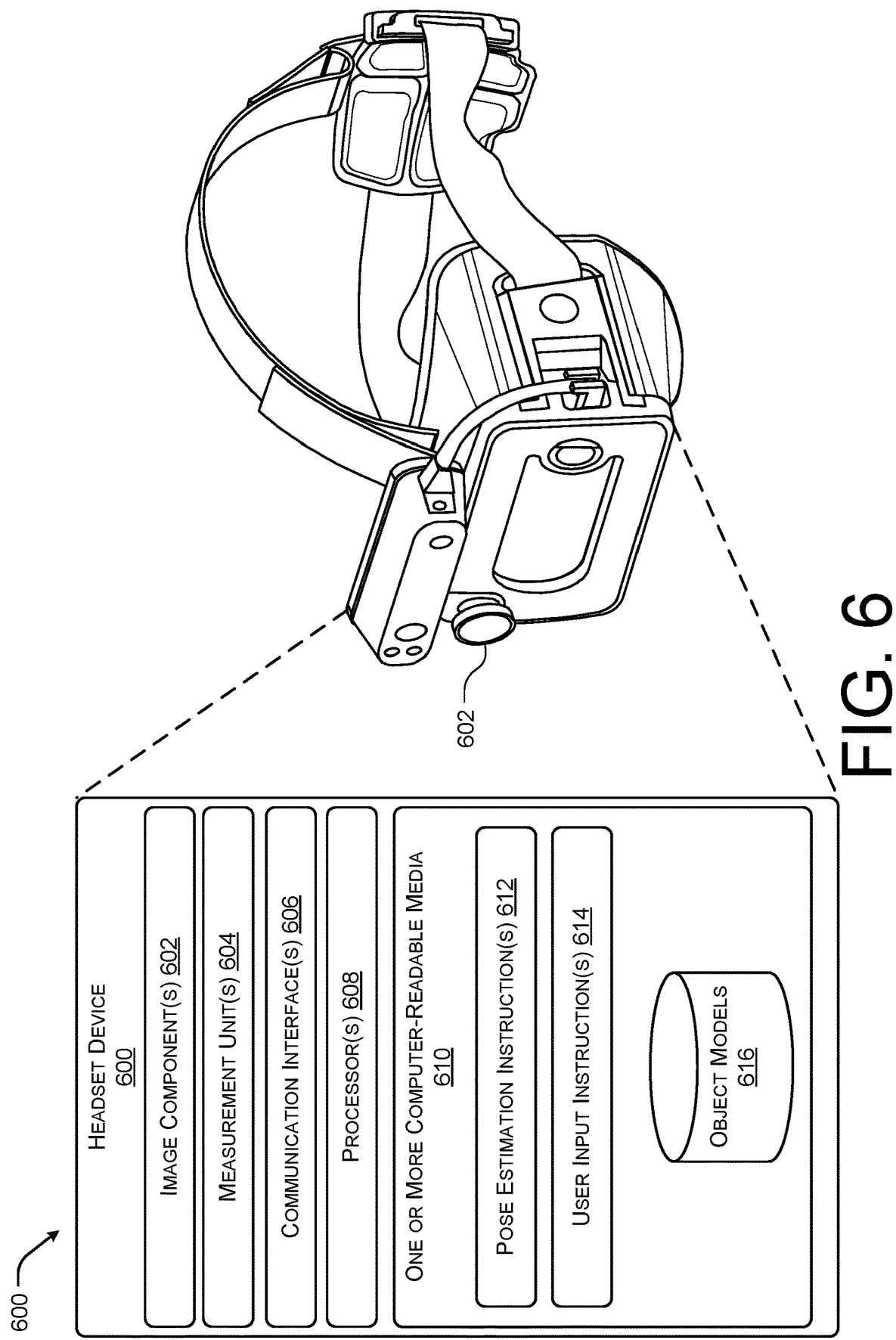
FIG. 6 is an example headset device according to some implementations.

FIG. 6 is an example headset device 600 of an image system according to some implementations. As described above, an headset device 600 may be a combination of an electronic device and a headset or be a self-contained unit for determining a 6DOF pose of a physical object. In the current example, the headset device 600 may include image components 602 for capturing visual data, such as images or frames, from a physical environment. For example, the image components 602 may be positioned to capture multiple image from substantially the same perspective as the user (e.g., a position proximate the user's eyes or head) in order to incorporate the image data associated with the captured image into the virtual environment. The image components 602 may be of various sizes and quality, for instance, the image components 602 may include one or more wide screen cameras, 3D cameras, high definition cameras, video cameras, among other types of cameras. In general, the image components 602 may each include various components and/or attributes.

In some cases, the 6DOF pose of an object may be determined with respect to a perspective of the headset device 600 and/or the user that may change as the headset device 600 and/or the user moves within the physical environment. Thus, the headset device 600 may include one or more measurement units 604 to determine the orientation data of the headset device 600 (e.g., acceleration, angular momentum, pitch, roll, yaw, etc. of the headset device 600). The measurement units 604 may include one or more IMUs, one or more accelerometers, one or more gyroscopes, one or more magnetometers, and/or one or more pressure sensors, as well as other sensors. In one particular example, the measurement units 604 may include three accelerometers placed orthogonal to each other, three rate gyroscopes placed orthogonal to each other, three magnetometers placed orthogonal to each other, and a barometric pressure sensor. In cases, the headset device 600 may utilize the set of two or more image points and the object model together with the orientation data to solve the linear system of equations for each candidate. Thus, even when some of the constellation points of an object are blocked by, for instance, a hand of the user, the headset device 600 may identify the 6DOF pose of the object.

The headset device 600 may also include one or more communication interfaces 606 configured to facilitate communication between one or more networks, one or more cloud-based management system, and/or one or more physical objects, such as controller 106 of FIG. 1. The communication interfaces 606 may also facilitate communication between one or more wireless access points, a master device, and/or one or more other computing devices as part of an ad-hoc or home network system. The communication interfaces 606 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interfaces 306 may be configured to receive orientation data associated with the object from an object, such as the controller 106 of FIG. 1. For example, when the object is mobile, the 6DOF pose of the object with respect to the perspective of the headset device 600 and/or the user may change as the object is moved. In this example, the physical object may also be equipped with measurement units 304 to capture orientation data of the object and configured to send the orientation to the communication interfaces 606.

The headset device 600 may also include one or more processors 608, such as at least one or more access components, control logic circuits, central processing units, or processors, as well as one or more computer-readable media 610 to perform the function associated with the virtual environment. Additionally, each of the processors 608 may itself comprise one or more processors or processing cores.

Depending on the configuration, the computer-readable media 610 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 308.

Several modules such as instruction, data stores, and so forth may be stored within the computer-readable media 610 and configured to execute on the processors 608. For example, as illustrated, the computer-readable media 610 store pose estimation instructions 612 and user input instructions 614 as well as one or more object models 616. For example, the pose estimation instructions 612 when executed by the processor 308 may cause the processor 308 to perform operations associated with image point detection. For instance, the 6DOF pose estimation instructions 612 may cause the processor 608 to apply a pixel regressor (e.g., random forest, CNN based regression, etc.) to an image to determine sets of pixels likely to contain an image points. The pose estimation instructions 612 may also cause the processor 608 to perform suppression (e.g., non-max suppression) on the image to identify which pixel within the set of pixels that contains the image point.

In some cases, such as when color is used as a class or feature of the image points, the pose estimation instructions 612 may cause the processor 608 to perform classification (e.g., CNN classification) on the image points identified during detection to determine the class of each image point. For instance, the pose estimation instructions 612 may cause the processor 308 to identify color of each image point or color pair sets of image points. The identified features may be used by the pose estimation instructions 612 to limit the number of candidates given the detected image points and the object model 616. In other cases, such as when the constellation points are uniform on the physical object, the pose estimation instructions 612 may utilize a 6DOF pose determined from a previous frame to limit the number of candidates.

Once, the image points are detected and classified, the pose estimation instructions 612 may cause the processor 608 to test each of the candidates. For example, the pose estimation instructions 612 may cause the processor 608 to solve linear equations using image point to model point correspondences associated with the candidate to determine a number of inliers. In this example, the pose estimation instructions 612 may select one of the candidates to generate the 6DOF pose of the object for the image based on the number of inliers (e.g., the candidate that generated the largest number of inliers). In one particular example, the pose estimation instructions 612 may cause the processor 308 to perform operations associated to a random sample consensus (RANSAC) using the candidate image point to model point relationships to identify the inliers. For example, the pose estimation instruction 612 may determine a number of model points that fall within a predefined distance or threshold of corresponding image points and classify the model points within the predefined distance or threshold as inliers and the model points that fall outside the predefined distance or threshold as outliers. Once the 6DOF pose is determined, the pose estimation instructions 612 may output the 6DOF pose to the user input instructions 614.

The user input instructions 614 may be configured to receive the 6DOF pose identified by the pose estimation instructions 612 and to perform various operations based on the 6DOF pose and/or the object. For instance, the user input instructions 614 may be configured to use the 6DOF pose as a user input to select or manipulate other items or objects within the virtual environment.

Figure 7:
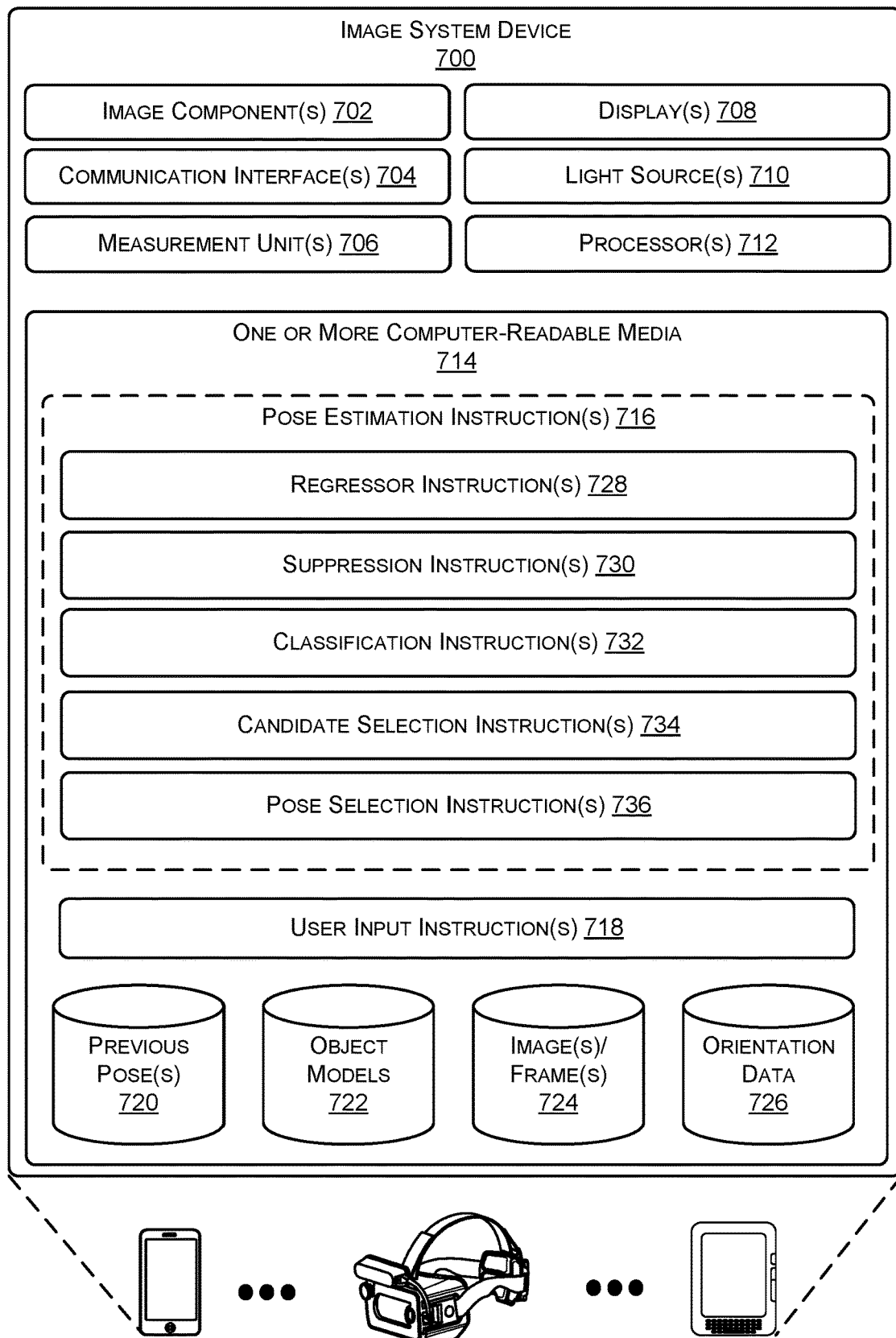
FIG. 7 is another example image system according to some implementations.

FIG. 7 is another example image system 700 according to some implementations. For example, as discussed above with respect to FIG. 6, in some cases, the image system 700 may be an application installed on various types of electronic devices, such as a mobile phone, tablet, portable computer, laptop, etc. in addition to a system configured to secure to a head of a user. In the current example, the image system 700 may include image components 702 for capturing visual data, such as images or frames, from a physical environment. For example, the image components 702 may be positioned to capture multiple image from the perspective of the image system 700. As discussed above, the image components 702 may be of various sizes and quality, for instance, the image components 702 may include one or more wide screen cameras, 3D cameras, high definition cameras, video cameras, among other types of cameras.

As discussed above, the 6DOF pose of an object may be determined with respect to a perspective of the image system 700 and/or the user that may change as the image system 700 and/or the user moves within the physical environment. Thus, the image system 700 may include one or more measurement units 706 to determine the orientation data of the image system 700 (e.g., acceleration, angular momentum, pitch, roll, yaw, etc. of the image system 700).

The image system 700 may also include one or more communication interfaces 706 configured to facilitate communication between one or more networks, one or more cloud-based management system, and/or one or more physical objects, such as controller of FIGS. 1-4. In some cases, the communication interfaces 706 may be configured to receive orientation data associated with the object from an object, such as the controller FIGS. 1-4. For example, when the object is mobile, the 6DOF pose of the object with respect to the perspective of the image system 700 and/or the user may change as the object is moved. In this example, the physical object may also be equipped with measurement units 406 to capture orientation data of the object and configured to send the orientation to the communication interfaces 704.

In the illustrated example, the image system 700 also includes a display 708, such as a virtual environment display or a traditional 2D display. For instance, in one example, the display 708 may include a flat display surface, such as a touch screen or LED display, combined with optical lenses configured to allow a user of the image system 700 to view the display 700 in 3D.

The image system 700 may also include one or more light sources 710. In some cases, the light sources 710 may be configured to activate at high power for a short duration. In some cases, the short duration may be substantially synchronized with an exposure interval of the image components 702.

In one example, the light source 710 may be an infrared illuminator. For example, in situations, in which the constellation on the object are formed via an infrared coating, the image system may be equipped with an infrared illuminator that activates in substantial synchronization with the image components 702. In these situations, the synchronization may allow the image components 702 to capture images within the infrared spectrum with a high degree of contrast resulting in image data for easier detection of image points. In some cases, the object may be equipped with retro-reflectors or high-contrast material that may be able to reflect the infrared spectrum (e.g., the light emitted by the infrared illuminator) allowing for an easier detection of the image points within the image data.

The image system 700 may also include one or more processors 712, such as at least one or more access components, control logic circuits, central processing units, or processors, as well as one or more computer-readable media 714 to perform the function associated with the virtual environment. Additionally, each of the processors 712 may itself comprise one or more processors or processing cores.

Depending on the configuration, the computer-readable media 714 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 712.

Several modules such as instruction, data stores, and so forth may be stored within the computer-readable media 714 and configured to execute on the processors 712. For example, as illustrated, the computer-readable media 714 store pose estimation instructions 716 and user input instructions 718 as well as data such as previous poses 720, object models 722, images and/or frames 724, and object orientation data 726.

In some cases, the store pose detection instructions 716 may also comprise additional instructions, such as regressor instructions 728, suppression instructions 730, classification instructions 732, candidate selection instructions 734, and pose selection instructions 736. For example, the regressor instructions 728 when executed by the processor 712 may cause the processor 712 to perform operations associated with image point detection. For instance, the regressor instructions 728 may cause the processor 708 to perform random forest, CNN based pixel regressor, etc. on an image to determine sets of pixels likely to contain an image points. In one specific example, the regressor instructions 728 may cause each pixel of the image to be assigned a value between zero and one representative of the likelihood or percentage that each pixel contains an image point. In this example, pixels with values close to zero have a low likelihood of continuing an image point while pixels with a value close to one have a high likelihood of containing an image point. In the current example, the output of the processor when the regressor instructions 728 are completed may include a map of the image having The suppression instructions 730 may cause the processor 712 to perform suppression, such as non-max suppression on the map or image data output following the completion of operations associated with the regressor instructions 728. In some cases, the suppression instructions 730 may to performed to identify which pixel within each of the set of pixels contains the image point.

The classification instructions 732 may cause the processor 712 to perform classification, such as CNN classification, on the image points identified. For instance, the classification instructions 732 may cause the processor 708 to identify color of each image point or color pair sets of image points or to classify each image point into a class, such as red image points, blue image points, green image points, etc. By classifying the image points the number of candidates may be further limited to reduce resource consumption associated with testing.

The candidate selection instructions 734 may cause the processor 712 to remove candidates from the candidate set based at least in part on orientation data associated with the image system 700, orientation data associated with and received from the object, pose data associated with a previous 6DOF pose of the object, the classification of the image points, and data associated with the identified image points (e.g., relative position, identity, etc.).

The pose selection instructions 736 may cause the processor 712 to test each of the candidates. For example, the candidate selection instructions 734 may cause the processor 712 to solve linear equations using image point to model point correspondences associated with the candidate to determine a number of inliers and/or a re-projection error metric associated with the object. In some case, the result of the linear equations may be refined using a Gauss-Newton Optimization procedure. The pose selection instructions 736 may select one of the candidates and generate the 6DOF pose of the object using one or more constraints or relationship based on the number of inliers. For example, the pose selection instructions 736 may select the candidate having the largest number of inliers and then utilize the candidate correspondences to generate the pose. Once the 6DOF pose is determined, the pose estimation instructions 716 may output the 6DOF pose to the user input instructions 718.

The user input instructions 718 may be configured to receive the pose identified by the pose estimation instructions 716 and to perform various operations based on the pose and/or the object. For instance, the user input instructions 718 may be configured to use the 6DOF pose as a user input to select or manipulate other items or objects within the virtual environment.

Figure 8:
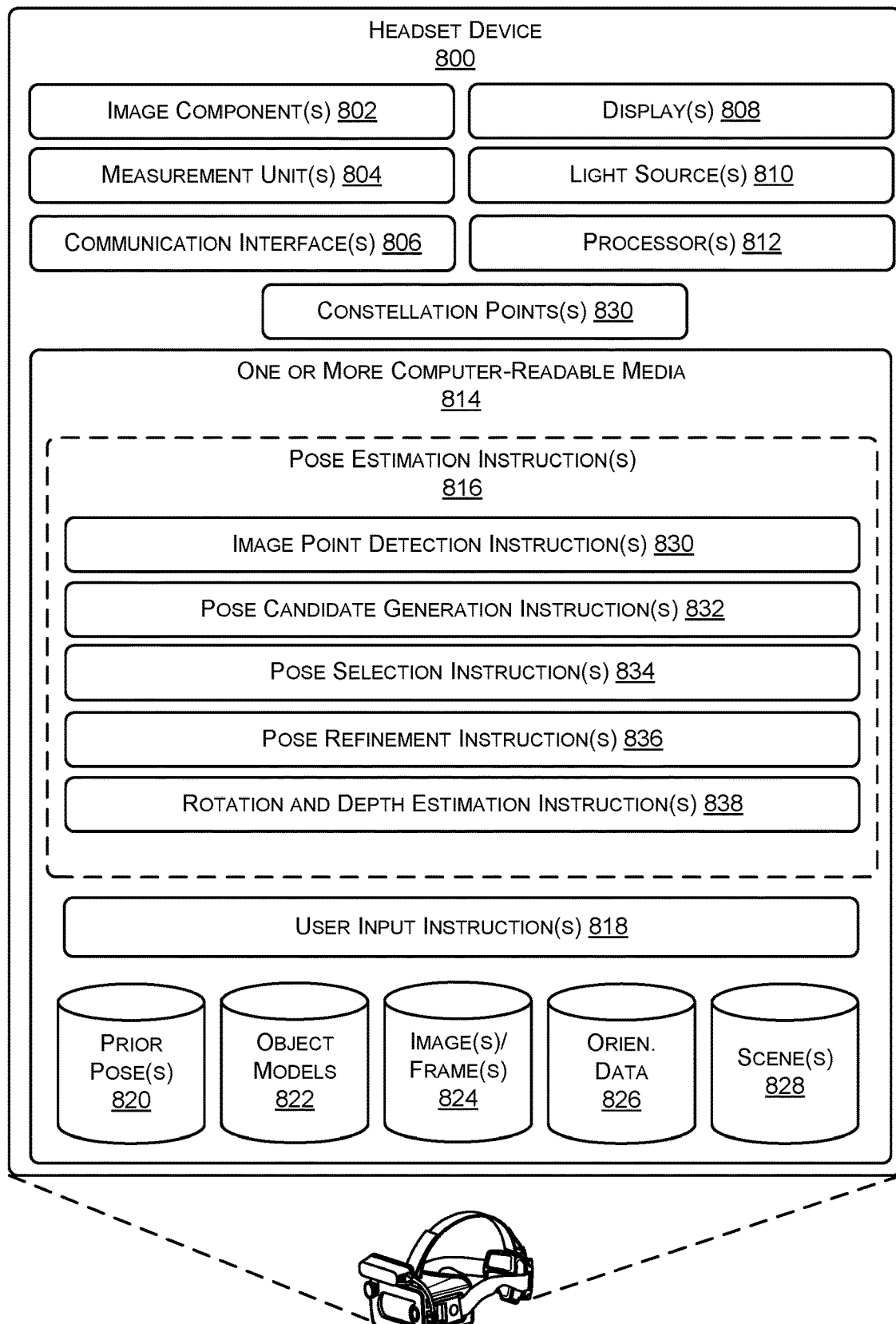
FIG. 8 is an example headset device for multi-device object tracking according to some implementations.

FIG. 8 is an example headset device 800 for multi-device object tracking according to some implementations. For instance, while the examples of FIGS. 6 and 7 may be associated with a headset device or single device performing a SLAM technique, in the current example, both the headset device 800 and a controller may be equipped with one or more image components or devices to capture image data and preform operations associated with SLAM object tracking. Thus, the headset device 800, in this example, may track the 6DOF pose of the controller and the controller may also be tracking the 6DOF pose of the headset device 800.

Thus, in the current example, the headset device 800 may include image components 802 for capturing visual data, such as images or frames, from a physical environment. As discussed above, the image components 802 may be positioned to capture multiple image from substantially the same perspective as the user (e.g., a position proximate the user's eyes or head) in order to incorporate the image data associated with the captured image into the virtual environment. The image components 802 may be of various sizes and quality, for instance, the image components 802 may include one or more wide screen cameras, 3D cameras, high definition cameras, video cameras, among other types of cameras. In general, the image components 802 may each include various components and/or attributes. In one specific example, the image components 802 may be configured to capture monochrome image data of the physical environment.

In some cases, the 6DOF pose of an object may be determined with respect to a perspective of the headset device 800 and/or the user that may change as the headset device 800 and/or the user moves within the physical environment. Thus, the headset device 800 may include one or more measurement units 804 to determine the orientation data of the headset device 800 (e.g., acceleration, angular momentum, pitch, roll, yaw, etc.). The measurement units 804 may include one or more IMUs, one or more accelerometers, one or more gyroscopes, one or more magnetometers, and/or one or more pressure sensors, as well as other sensors. In one particular example, the measurement units 804 may include three accelerometers placed orthogonal to each other, three rate gyroscopes placed orthogonal to each other, three magnetometers placed orthogonal to each other, and a barometric pressure sensor.

The headset device 800 may also include one or more communication interfaces 806 configured to facilitate communication between one or more networks, one or more cloud-based management system, and/or one or more physical objects, such as controller of FIGS. 1-4. The communication interfaces 806 may also facilitate communication between one or more wireless access points, a master device, and/or one or more other computing devices as part of an ad-hoc or home network system. The communication interfaces 806 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interfaces 806 may be configured to receive orientation data, image data, and/or headset device 800 or user 6DOF pose data from the controller.

In the illustrated example, the headset device 800 also includes a display 808, such as a virtual environment display or a traditional 2D display. For instance, in one example, the display 808 may include a flat display surface, such as a touch screen or LED display, combined with optical lenses configured to allow a user of the image system 800 to view the display 800 in 3D.

The headset device 800 may also include one or more light sources 810. In some cases, the light sources 810 such as active or static LEDs that may be detected within image data captured of the headset device 800 by, for instance, the controller or base station of an image system. In the illustrated example, the headset device 800 may also include one or more constellation points 830 along the exterior. For example, the constellation points 830 may be formed from LED lights, tracking enhancement tags, paint, or plastics. In general, the constellation points 830 from the constellation on the headset device 800 such that the headset device 800 may be tracked using a SLAM technique, as discussed herein.

The headset device 800 may also include one or more processors 812, such as at least one or more access components, control logic circuits, central processing units, or processors, as well as one or more computer-readable media 814 to perform the function associated with the virtual environment. Additionally, each of the processors 808 may itself comprise one or more processors or processing cores.

Depending on the configuration, the computer-readable media 814 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 812.

Several modules such as instruction, data stores, and so forth may be stored within the computer-readable media 814 and configured to execute on the processors 812. For example, as illustrated, the computer-readable media 814 store 6DOF pose estimation instructions 816 and user input instructions 818 as well as one or more previous or prior 6DOF poses of the controller or object 820, object models 811, image or frames 824 captured by the image components 802, orientation data 826 (either received by the communication interface 806 or captured by the measurement units 804) and a scene or virtual map 828.

In the illustrated example, the pose estimation instructions 816 may include image point detection instructions 830, pose candidate generation instructions 832, pose selection instructions 834, pose refinement instructions 836, and rotation and depth estimation integration instructions 838.

The image point detection instructions 830 may cause the processor 812 to segment an image 824 (such as a monochrome image) into multiple patches. Some of the patches will include an image point or data representative of a point in the constellation on the controller or object being tracked. The image point detection instructions 830 may utilize a low-resolution search on each patch to determine each patch that includes data representative of an image point. The image point detection instructions 830 may identify the location of the image point within each patch including an image point by applying a weighted average via a sliding window over the patch.

The pose candidate generation instructions 832 may cause the processor 812 to generate a plurality of possible candidate 6DOF poses. For example, the candidate 6DOF poses may include possible 6DOF poses that the controller or other object may have given the image 824. In one example, the pose candidate generation instructions 832 may generate multiple sets of image points. The pose candidate generation instructions 832 may then, for each set of image points, generate at least one 6DOF pose candidate. For example, the pose candidate generation instructions 832 may apply a PnP technique (such as P3P) to generate a six-degree of freedom pose based on each set of image points.

In another example, the pose candidate generation instructions 832 may utilize orientation data 826 of the controller received by the communication interface 806 to generate one or more forward predictive 6DOF poses of the controller. The pose candidate generation instructions 832 may also generate the candidate 6DOF poses by perturbing a prior 6DOF pose 820. In one specific example, the pose candidate generation instructions 832 may generate the forward predictive 6DOF pose using the orientation data 826 of the controller and perturbing the forward predictive 6DOF pose to generate the candidate 6DOF poses.

The pose selection instruction 834 may take the candidate 6DOF poses and project them into the image space. The pose selection instruction 834 may then mark each of the model points that are within a threshold distance (such as six pixels) of an image point as an inlier. The pose selection instruction 834 may then select the candidate 6DOF pose with the largest number of inliers as the 6DOF pose. In some situations, two or more of the candidate 6DOF poses may each have the largest number of inliers. In these situations, the pose selection instruction 834 may select the candidate 6DOF pose by selecting the candidate 6DOF pose with the lowest reproduction error.

The pose refinement instructions 836 may cause the processor 812 to apply a PnP (for instance, efficient perspective from N points) technique to refine the selected 6DOF pose.

In some cases, less than the threshold number of image points may be identified by the image point detection instructions 830. In these cases, the rotation and depth estimation instructions 838 may cause the processor to utilize the orientation data 826 received from the controller or object to assist with determining the 6DOF pose. For example, the rotation and depth estimation instructions 838 may determine a predicted rotation of the controller or object from the prior 6DOF pose based on the orientation data 826 The rotation and depth estimation instructions 838 may also approximate a depth of the controller or object (e.g., a distance between the headset and the controller or object). In one case, the rotation and depth estimation instructions 838 may take the estimate of the depth determined from the orientation data 826. In another case, the rotation and depth estimation instructions 838 may approximate the depth by using a weak perspective. In a third case, the rotation and depth estimation instructions 838 may approximate the depth by using an edge length of the object or controller within the image and model. Once the depth (e.g., z position of the object) and the rotation of the controller or object are known, the rotation and depth estimation instructions 838 may determine the translation based at least in part on determining X and Y. The rotation and depth estimation instructions 838 may then determine the 6DOF pose using the X, Y, and Z (depth), and rotation of the object or controller.

The user input instructions 818 may be configured to receive the 6DOF pose identified by the pose estimation instructions 828 and to perform various operations based on the 6DOF pose and/or the object. For instance, the user input instructions 818 may be configured to use the 6DOF pose as a user input to select or manipulate other items or objects within the virtual environment.

Figure 9:
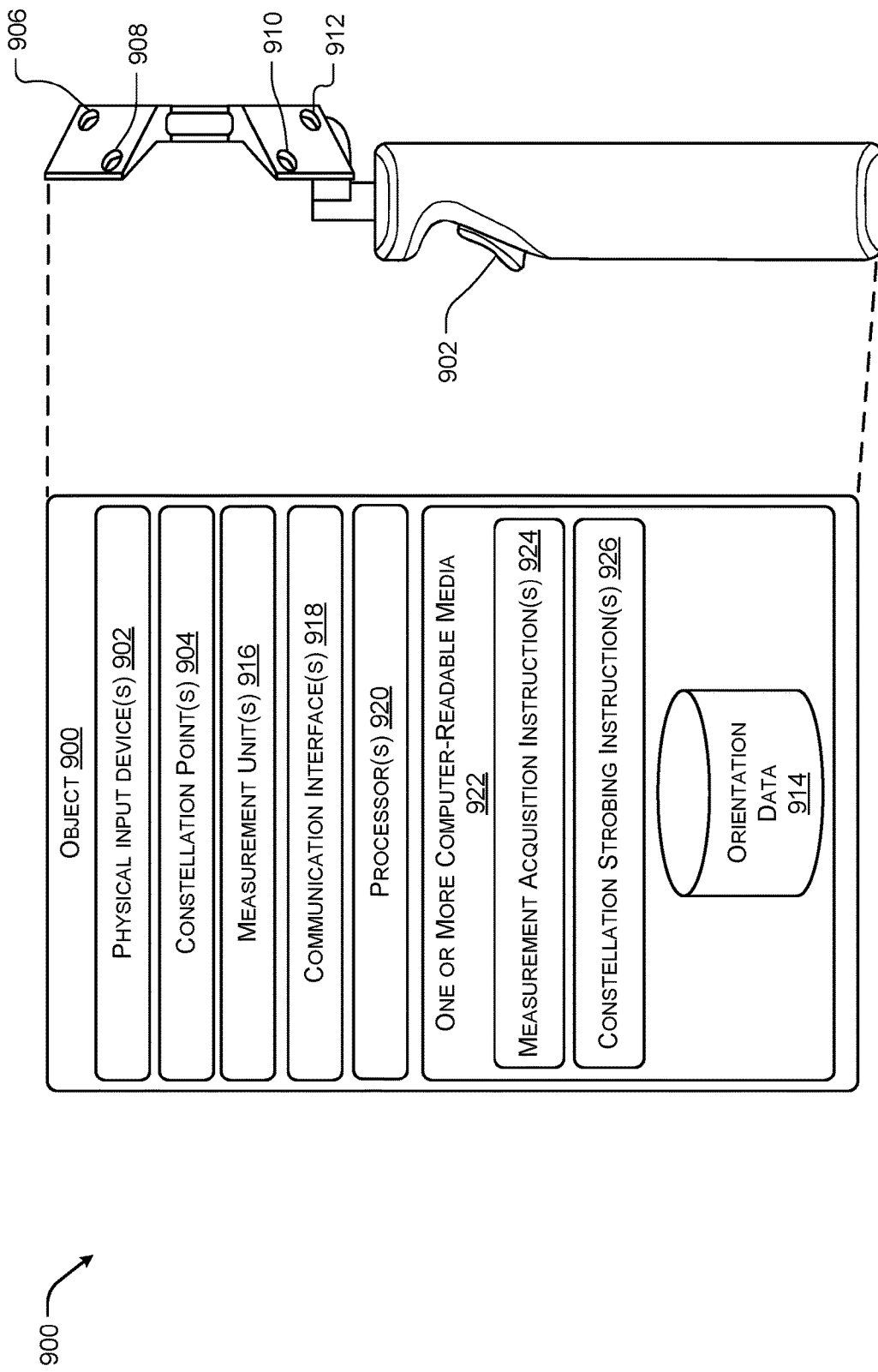
FIG. 9 is an example object configured for interacting with a virtual environment generated by an image system according to some implementations.

FIG. 9 is an example object 900 configured for interacting with a virtual environment generated by an image system according to some implementations. In the current example, the object 900 is a controller that may be used to provide user inputs to the image system. In some cases, the 6DOF pose of the object 900 may at least in part be used as the control input. For example, the user may point the object 900 at an article within the physical or virtual environment while actuating a physical input device 902, such as a trigger or other switch on the controller, to cause the image system to select, manipulate, or interact with the article.

In the current example and as discussed above, the image system may be configured to utilize the 6DOF pose of the object 900 as a control input and/or user input in addition to or in lieu of any physical input device 902. In order to determine the physical pose of the object 900, the image system may include an image component to capture images of the object 900 that may be processed to identify image points corresponding to constellation points 904 on the exterior of the object 900. For instance, in the illustrated example, the constellation points 904 may be formed from color coded LED lights, generally indicated by LED lights 906-912. In general, the LEDs 906-912 form the constellation on the object and may be detected within an image captured by the image system. In some cases, the LEDs 906-912 may be color coded such that image points corresponding to the LEDs 906-912 within the captured image may be classified by the image system to reduce the number of candidates tested when determining the 6DOF pose of the object 900.

As discussed above, in some cases, such as when only two or three image points are detected within an image and the object 900 is movable or portable, the image system may utilize orientation data 914 associated with the object 900 to determine the 6DOF pose of the object 900 relative to the image system. In these cases, the object 900 may be equipped with one or more measurement units 916 and one or more communication interfaces 918. The measurement units 916 may be configured to collect data (e.g., the orientation data 914) associated with the movement of the object 900, such as acceleration data, angular momentum data, pitch data, roll data, yaw data, etc. In one example, the measurement units 916 may include one or more IMUs, one or more accelerometers, one or more gyroscopes, one or more magnetometers, and/or one or more pressure sensors, as well as other sensors. In one particular example, the measurement units 916 may include three accelerometers placed orthogonal to each other, three rate gyroscopes placed orthogonal to each other, three magnetometers placed orthogonal to each other, and a barometric pressure sensor.

The object 900 may also include one or more communication interfaces 918 configured to facilitate communication between one or more networks, one or more cloud-based system, and/or one or more image systems, such as image system FIGS. 1-4. The communication interfaces 918 may also facilitate communication between one or more wireless access points, a master device, and/or one or more other computing devices as part of an ad-hoc or home network system. The communication interfaces 924 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interfaces 918 may be configured to send orientation data 914 associated with the object 900 to an image system, such as the image system of FIGS. 1-4. For example, when the object 900 is mobile, the 6DOF pose of the object 900 with respect to the perspective of the image system and/or the user may change as the object 900 is moved. In this example, the physical object 900 send capture orientation data 914 to the image system via the communication interfaces 918 to assist the image system with determining the 6DOF pose of the object 900.

The object 900 may also include one or more processors 920, such as at least one or more access components, control logic circuits, central processing units, or processors, as well as one or more computer-readable media 922 to perform the function associated with the virtual environment. Additionally, each of the processors 920 may itself comprise one or more processors or processing cores.

Depending on the configuration, the computer-readable media 922 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 920.

Several modules such as instruction, data stores, and so forth may be stored within the computer-readable media 922 and configured to execute on the processors 920. For example, as illustrated, the computer-readable media 922 may store measurement acquisition instructions 924 and constellation strobing instructions 926 as well as orientation data 914 collected by the measurement units 916. In one example, the measurement acquisition instructions 924 may be executed by the processor 920 to cause the processor 920 to perform operations associated processing, pre-processing, organizing, arranging, etc. The orientation data 914 collected by the measurement units 916 prior to transmitting the orientation data 914 to the image system. For instance, in this example, the measurement acquisition instructions 924 may assist with the processing of the orientation data 914, such as to compress the orientation data 914 prior to transmission.

In some cases, such as when the constellation points 904 are LEDs or other light emitting devices, the constellation strobing instructions 926 may be configured to cause the LEDs 904-912 to strobe or pulse at specified frequencies. For instance, the strobing or pulsing may be utilized to improve the quality of any image captured of the device, such as by the image system. In another example, the strobing or pulsing of each LEDs 904-912 may be unique to the LED 904-912 to allow the image system to determine the identify of each constellation point or image point. In one particular example, the LEDs 904-912 may be configured to activate at high power for a short duration. The image system may also be configured to capture image data of the LEDs 904-912 using a short exposure interval that may correspond to the high power duration of the LEDs 904-912. In one particular implementation, a light source or infrared illuminator may be equipped on the image system and also configured to activate at high power during the short exposure interval. Thus, in some instance, the timing between the high-power duration of the LEDs or light source, may be substantially synchronized such that when the pixels of, for example, a rolling shutter camera are exposed the object is highly illuminated resulting high quality image capture and more visible image points.

Figure 10:
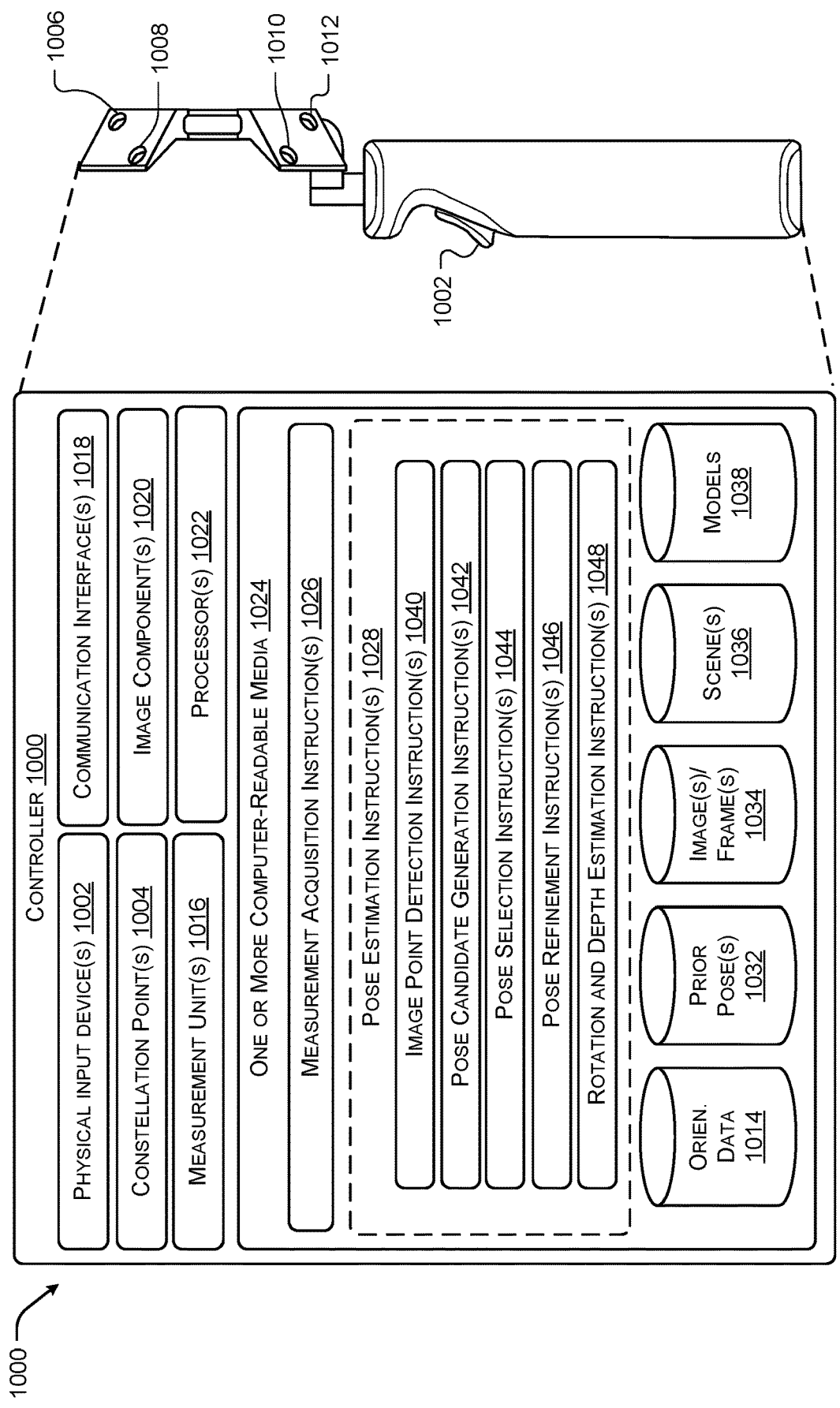
FIG. 10 is another example object configured for interacting with a virtual environment generated by an image system according to some implementations.

FIG. 10 is an example controller 1000 according to some implementations. In the current example, the controller 1000 is a controller that may be used to provide user inputs to the image system. In some cases, the 6DOF pose of the controller 1000 may at least in part be used as the control input. For example, the user may point the controller 1000 at an article within the physical or virtual environment while actuating a physical input device 1002, such as a trigger or other switch on the controller, to cause the image system to select, manipulate, or interact with the article.

In the current example and as discussed above, the image system may be configured to utilize the 6DOF pose of the controller 1000 as a control input and/or user input in addition to or in lieu of any physical input device 1002. In order to determine the physical pose of the controller 1000, the image system may include an image component to capture images of the controller 1000 may be processed to identify image points corresponding to constellation points 1004 on the exterior of the object 1000. For instance, in the illustrated example, the constellation points 1004 may be formed from LED lights, generally indicated by LED lights 1006-1012. In general, the LEDs 1006-1012 from the constellation on the object and may be detected within a monochrome image captured by the headset device or other image device of the image system.

As discussed above, in some cases, the image system may utilize orientation data 1014 associated with the controller 1000 to determine the 6DOF pose of the controller 1000. In these cases, the controller 1000 may be equipped with one or more measurement units 1016 and one or more communication interfaces 1018. The measurement units 1016 may be configured to collect data (e.g., the orientation data 1014) associated with the movement of the controller 1000, such as acceleration data, angular momentum data, pitch data, roll data, yaw data, etc. In one example, the measurement units 1016 may include one or more IMUs, one or more accelerometers, one or more gyroscopes, one or more magnetometers, and/or one or more pressure sensors, as well as other sensors. In one particular example, the measurement units 1016 may include three accelerometers placed orthogonal to each other, three rate gyroscopes placed orthogonal to each other, three magnetometers placed orthogonal to each other, and a barometric pressure sensor. In some cases, the controller 1000 may be configured to stream or substantially continuously send the origination data 1014 from the measurement units 1016 to the headset device via the communication interface 1018.

The controller 1000 may also include one or more communication interfaces 518 configured to facilitate communication between one or more networks, one or more cloud-based system, and/or one or more other device, such as a headset device. The communication interfaces 1018 may also facilitate communication between one or more wireless access points, a master device, and/or one or more other computing devices as part of an ad-hoc or home network system. The communication interfaces 1018 may support both wired and wireless connection to various networks, such as cellular networks, radio, WiFi networks, short-range or near-field networks (e.g., Bluetooth®), infrared signals, local area networks, wide area networks, the Internet, and so forth.

The controller 1000 may also include one or more image components 1020. The image components 1020 may be of various sizes and quality, for instance, the image components 1020 may include one or more wide screen cameras, 3D cameras, high definition cameras, video cameras, among other types of cameras. In general, the image components 1020 may each include various components and/or attributes. In one specific example, the image components 1020 may be configured to capture monochrome image data of the physical environment.

The controller 1000 may also include one or more processors 1022, such as at least one or more access components, control logic circuits, central processing units, or processors, as well as one or more computer-readable media 1024 to perform the function associated with the virtual environment. Additionally, each of the processors 1022 may itself comprise one or more processors or processing cores.

Depending on the configuration, the computer-readable media 524 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1022.

Several modules such as instruction, data stores, and so forth may be stored within the computer-readable media 1024 and configured to execute on the processors 1022. For example, as illustrated, the computer-readable media 1024 may store measurement acquisition instructions 1026 and pose estimation instructions 1028 as well as orientation data 1014 collected by the measurement units 1016, prior 6DOF pose data 1032 (e.g., prior 6DOF pose data of the headset device), and image or frame data 1034, scene 1036, and models 1038.

In one example, the measurement acquisition instructions 1026 may be executed by the processor 1022 to cause the processor 1022 to perform operations associated processing, pre-processing, organizing, arranging, etc. The orientation data 1014 collected by the measurement units 1016 prior to transmitting the orientation data 1014 to the headset device. For instance, in this example, the measurement acquisition instructions 1026 may assist with the processing of the orientation data 1014, such as to compress the orientation data 1014 prior to transmission.

In the illustrated example, the pose estimation instructions 1028 may include image point detection instructions 1040, pose candidate generation instructions 1042, pose selection instructions 1044, pose refinement instructions 51046, and rotation and depth estimation integration instructions 1048.

The image point detection instructions 1040 may cause the processor 1022 to segment an image into multiple patches. Some of the patches will include an image point or data representative of a point in the constellation on the headset device or other object being tracked. The image point detection instructions 1040 may utilize a low-resolution search on each patch to determine each patch that includes data representative of an image point. The image point detection instructions 1040 may identify the location of the image point within each patch including an image point by applying a weighted average via a sliding window over the patch.

In other examples, the image point detection instructions 1040 may apply a regressor or classifier to determine an identity of a specific image point within the image. For instance, if color or other active features (such as LEDs flashing at different speeds) are incorporate into the headset device, the image point detection instructions 1040 may determine the 6DOF pose of the headset device by determining the identity of individual image points which always the image system to constrain the number of possible 6DOF poses to be tested for inliers.

The pose candidate generation instructions 1042 may cause the processor 1022 to generate a plurality of possible candidate 6DOF poses. For example, the candidate 6DOF poses may include possible 6DOF poses that the controller or other object may have given the image. In one example, the 6DOF pose candidate generation instructions 1042 may generate multiple sets of image points. The pose candidate generation instructions 1042 may then, for each set of image points, generate at least one 6DOF pose candidate. For example, the pose candidate generation instructions 1042 may apply a PnP technique (such as P3P) to generate a six-degree of freedom pose based on each set of image points.

In other cases, the candidate 6DOF poses may be generated based on the known identity of one or more image point and a model 1038 stored in memory. For example, the pose candidate generation instructions 1042 may align the model 1038 using the known image points and the corresponding model points to generate candidate 6DOF poses.

In another example, the pose candidate generation instructions 1042 may utilize orientation data 1014 of the headset device received by the communication interface 1018 to generate one or more forward predictive 6DOF poses of the controller. The pose candidate generation instructions 1042 may also generate the candidate 6DOF poses by perturbing a prior 6DOF pose 1032. In one specific example, the pose candidate generation instructions 1042 may generate the forward predictive 6DOF pose using the orientation data 1014 of the controller and perturbing the forward predictive 6DOF pose to generate the candidate 6DOF poses.

The pose selection instruction 1044 may cause the processor 1022 to take the candidate 6DOF poses and project them into the image space. The pose selection instruction 1044 may then mark each of the model points that are within a threshold distance (such as six pixels) of an image point as an inlier. The pose selection instruction 1044 may then select the candidate 6DOF pose with the largest number of inliers as the 6DOF pose. In some situations, two or more of the candidate 6DOF poses may each have the largest number of inliers. In these situations, the pose selection instruction 1044 may select the candidate 6DOF pose by selecting the candidate 6DOF pose with the lowest reproduction error.

The pose refinement instructions 1046 may cause the processor 1022 to apply a PnP (for instance, efficient perspective from N points) technique to refine the selected 6DOF pose.

In some cases, less than the threshold number of image points may be identified by the image point detection instructions 1040. In these cases, the rotation and depth estimation instructions 1048 may cause the processor 1022 to utilize the orientation data 1014 received from the headset device or object to assist with determining the 6DOF pose. For example, the rotation and depth estimation instructions 1048 may determine a predicted rotation of the controller or object from the prior 6DOF pose based on the orientation data 1014 The rotation and depth estimation instructions 51048 may also approximate a depth of the controller or object (e.g., a distance between the headset and the controller or object). In one case, the rotation and depth estimation instructions 1048 may take the estimate of the depth determined from the orientation data 1014. In another case, the rotation and depth estimation instructions 1048 may approximate the depth by using a weak perspective. In a third case, the rotation and depth estimation instructions 1048 may approximate the depth by using an edge length of the object or controller within the image and model.

Once the depth (e.g., z position of the object) and the rotation of the headset device or object are known, the rotation and depth estimation instructions 1038 may determine the translation based at least in part on determining X and Y. The rotation and depth estimation instructions 1038 may then determine the 6DOF pose using the X, Y, and Z (depth), and rotation of the object or headset device.

Figure 11:
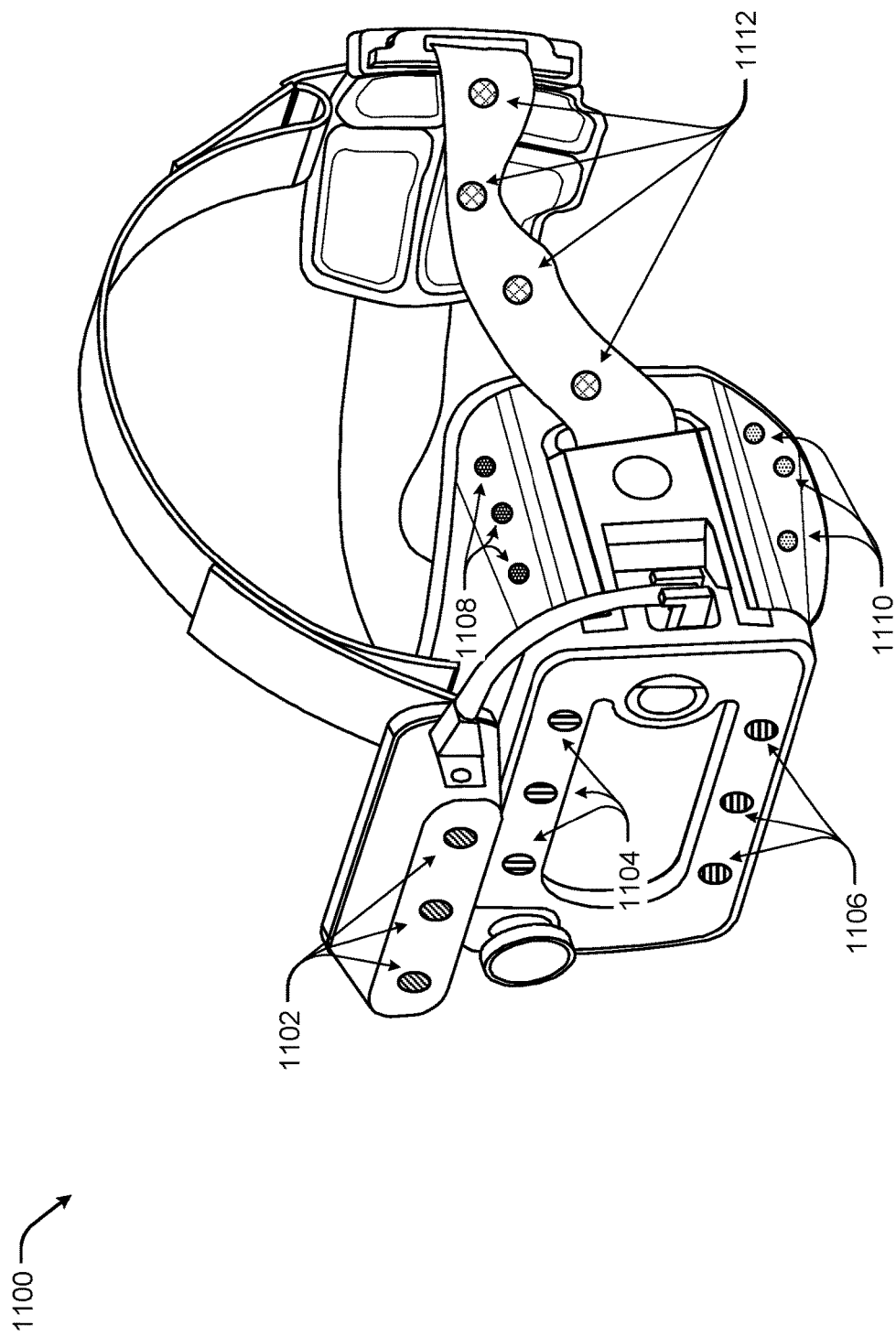
FIG. 11 is an example headset device with constellation points according to some implementations.

FIG. 11 is an example headset device 11100 with constellation points, generally indicated by 1102-1112 according to some implementations. For example, the headset device 1100 may be used in systems in which multiple devices are performing SLAM techniques. In illustrated example, the headset device 1100 is shown having static constellation points 1102-1112 positioned around the exterior. However, in other examples, the constellation points 1102-1112 may be static LEDs, color LEDs, flashing LEDs, or other active components. In some cases, the constellation points 1102-1112 may be formed from colored plastics that differ from the color of the plastic of the headset device 1100 or added during the molding process. In another case, the constellation points 1102-1112 may be formed from paint or coatings that may be applied to desired positions or regions of the headset device 1100. In some specific cases, the constellation points 1102-1112 may be formed by applying a coating detectable in the infrared spectrum by undetectable or invisible in the visible spectrum.

In the current implementation, the each of the constellation points 1102-1112 are shown as belonging to a unique class or including a unique feature. For instance, each of the constellation points 1102 may belong to a first class, the constellation points 1104 may belong to a second class, the constellation points 606 may belong to a third class, the constellation points 1108 may belong to a fourth class, the constellation points 1110 may belong to a fifth class, and the constellation points 1112 may belong to a sixth class. In some cases, the number of classes or location of constellation points belong to each class may vary.

Each class of constellation points may have a unique color, shading, pattern, or active component that is detectable by the image system, such as by performing classification on a set of detected image points corresponding to at least some of the constellation points 1102-1112. However, it should be understood, that in other examples, the constellation points 1102-1112 may be of the same class or have the same features.

Figure 12:
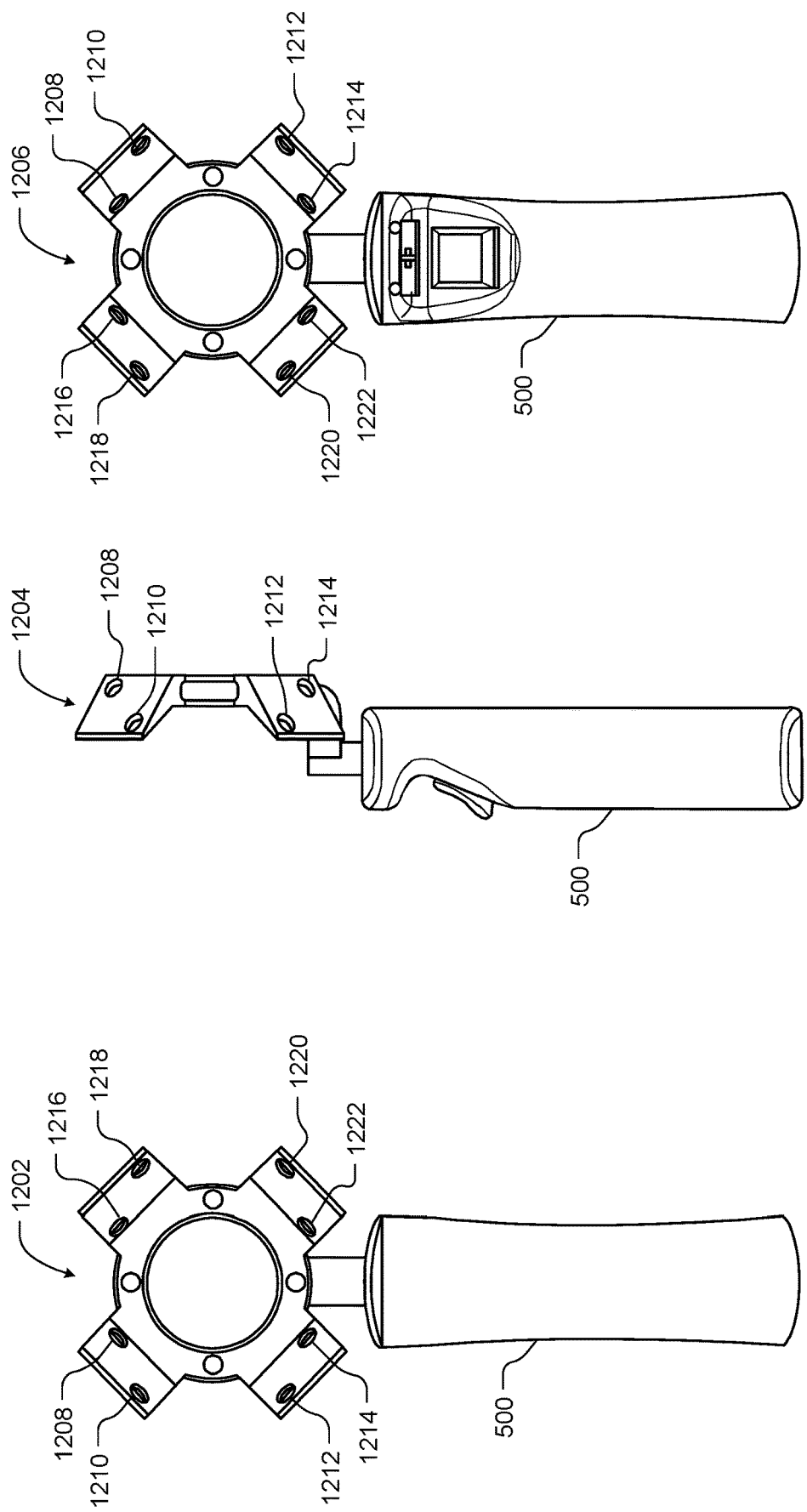
FIG. 12 illustrates example of the object of FIG. 5 from three perspectives or having three different poses from the perspective of an image system according to some implementations.

FIG. 12 illustrates example of the object 1200 (such as a controller) from three perspectives or having three different views 1202, 1204, and 1206 from the perspective of an image system according to some implementations. For instance, in the current example, the object 1200 is illustrated from a front view 1202, a side view 1204, and a rear view 1206. As illustrated, the object 1200 has constellation points 1208, 1210, 1212, and 1214 that are visible in each of the views 1202-1206 as well as constellation points 1216, 1218, 1220, and 1222 that are visible in views 1202 and 1206 but not in view 1204. Thus, depending on the pose of the object 1200, the number of image points in a captured image and representative of the constellation points 1202-1222 may vary. As such, the image system described herein may be configured to determine the pose of the object 1200 based on sets of six or more image points, four or more image points, or two or three image points.

Figure 13:
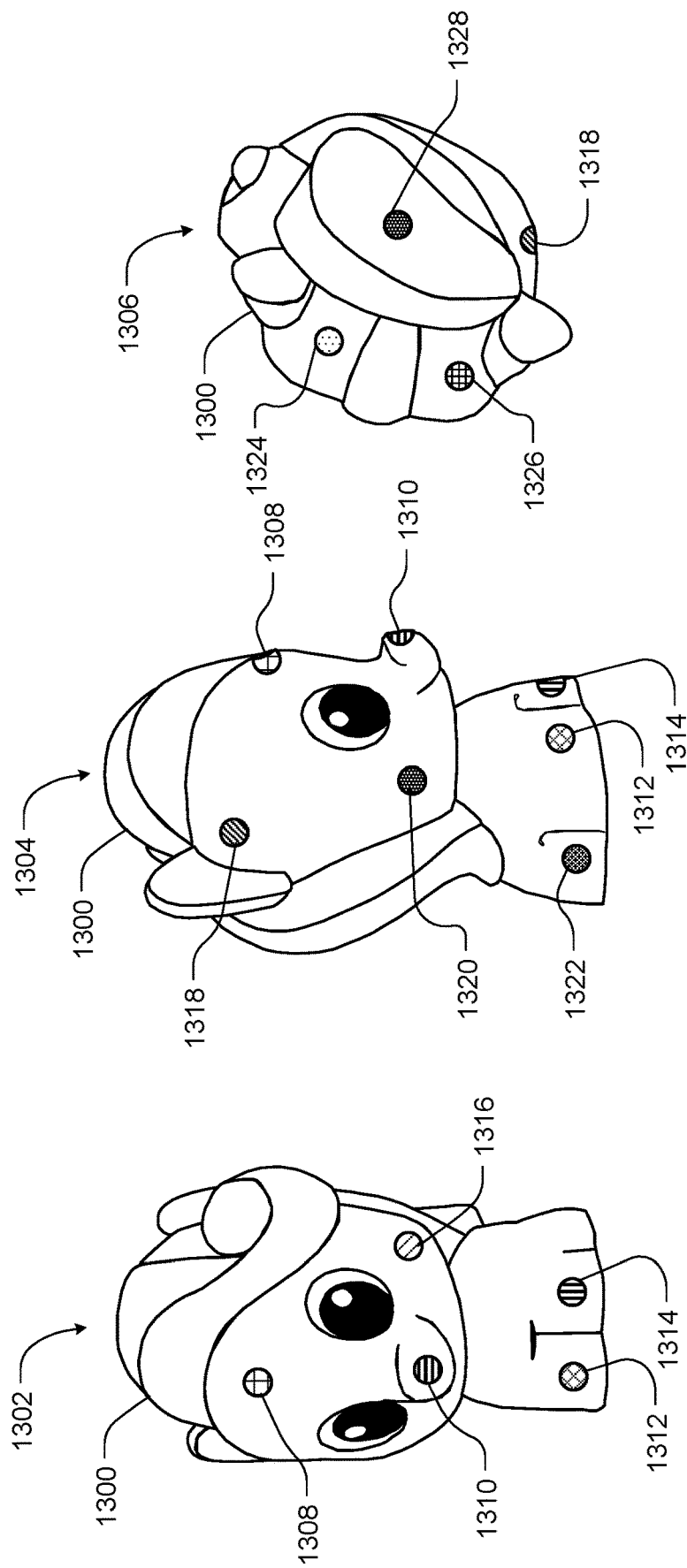
FIG. 13 illustrates another example object from three perspectives or having three different poses from the perspective of an image system according to some implementations.

FIG. 13 illustrates another example object 1300 from three perspectives or having three different view 1302, 1304, and 1306 from the perspective of an image system according to some implementations. For instance, the object 1300 is illustrated from a front view 1302, a side view 1304, and a top view 1306. In each of the views 1302-1306 different sets of constellation points 1308-1328 are visible. In some instance, such as pose 1302 and 1304 some of the constellation points, such as constellation points 1308-1314 may be visible with both view 1302 and 1304, while other constellation points, such as constellation points 1316 and 1318, may be visible from only one of the views 1302 and 1304.

In illustrated example, the object 1300 is a toy that may be made of plastic and without any electronic components. The addition of LEDs or other components requiring a power source as constellation points may result in a drastic increase in price of the toy 1300 resulting in a far less competitive product. Thus, in the current example, the toy 1300 may include static constellation points 1308-1328 positioned around the exterior of the toy 1300. For example, in some cases, the constellation points 1308-1328 may be formed from colored plastics that differ from the color of the plastic of the toy 1300. In this case, the constellation points 1308-1328 may be added during the molding process. In another case, the constellation points 1308-1328 may be formed from paint or coatings that may be applied to desired positions or regions of the toy 1300. In some specific cases, the be formed by applying a coating detectable in the infrared spectrum by undetectable or invisible in the visible spectrum. As such, in the current case, the toy 1300 may include constellation points 1308-1328 detectable by an image system while maintaining the desired look and feel of the toy 1300 and the desired appeal to, for instance, a child.

In the current implementation, each of the image points 1308-1328 are shown as belonging to a unique class or including a unique feature. For instance, each of the image points 1308-1328 may have a unique color, shading, or pattern that is detectable by the image system, such as by performing classification on a set of detected image points corresponding to at least some of the constellation points 1308-1328. However, it should be understood, that in other examples, the constellation points 13708-1328 may be of the same class or have the same features. For instance, if the constellation points 1308-1328 are formed using infrared coating, the toy 1300 may appear in the infrared image as black while each of the image points corresponding to the constellation points 1308-1328 may appear white (or the toy 1300 may appear dark while the image points appear light). In still another example, the toy 1300 may be configured such that some of the constellation points 1308-1328 are of the same class or include the same feature. In this manner, the toy 1300 may have sets of constellation points 1308-1328 that, for instance, share a color or pattern.

Figure 14:
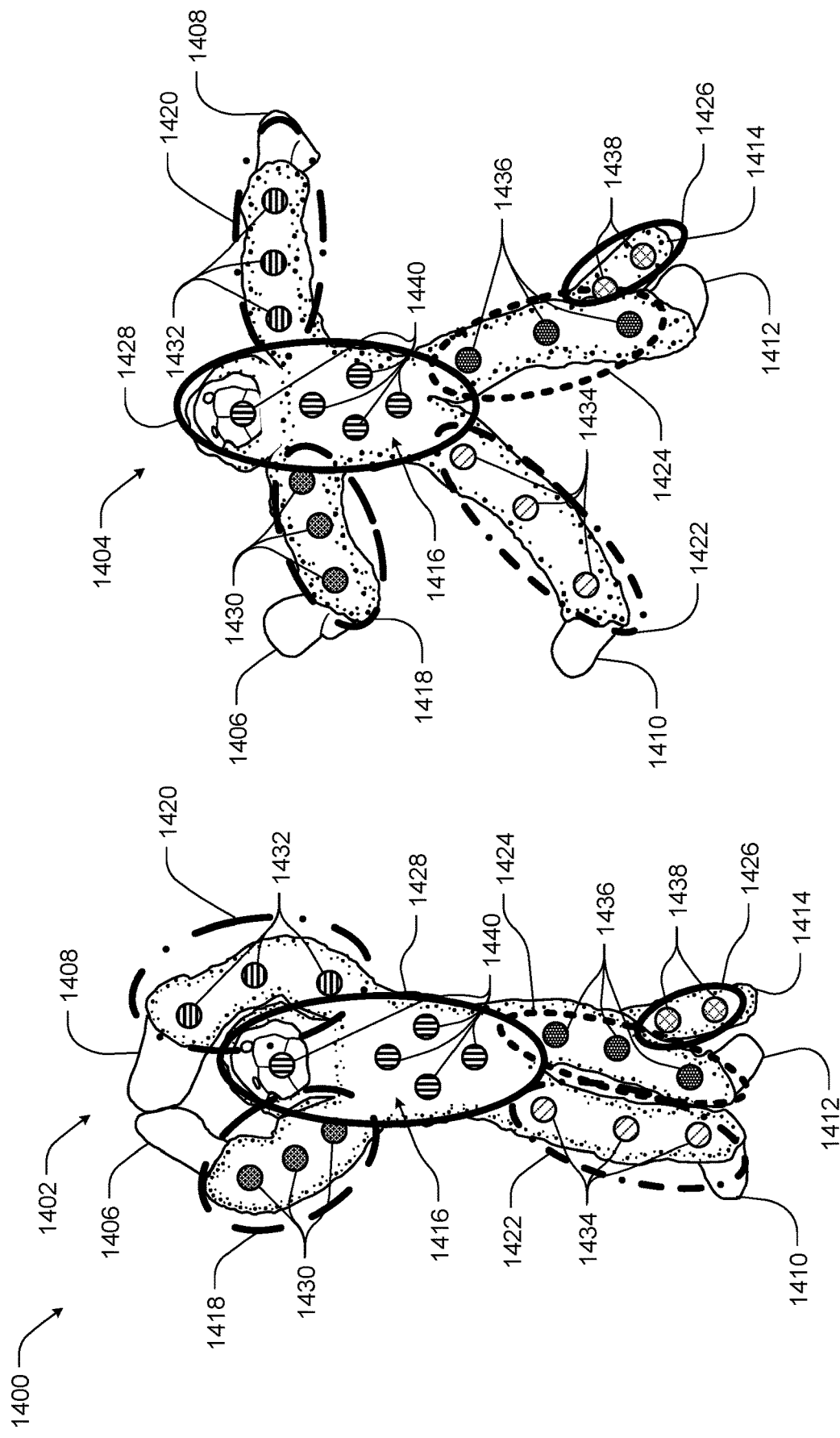
FIG. 14 illustrates yet another example object from two perspectives or having two different poses from the perspective of an image system according to some implementations.

FIG. 14 illustrates yet another example object 1400 from two perspectives or having two different poses 1402 and 1404 from the perspective of an image system according to some implementations. Similarly, a user may utilize the view 1402 or 1404 as an input into an image system, for instance, to cause an effect within a viewed virtual environment. In the current example, the object 1400 is again a toy. However, unlike the toy 1300 of FIG. 13 or the controller 1200 of FIG. 12, the toy 1400 may be posable or have members, such has right arm 14806, left arm 1408, right leg 1410, left leg 1412, and tail 1414, that may be moved independently of each other and/or the torso 1416 of the toy 1400. Thus, while both the view 1402 and the view 1404 are from the front of the toy 1400, the two poses 1402 and 1404 are not identical. Thus, each of the members 1406-1414 including the torso 1416 may be configured by an image system to be different sub-objects, generally indicated by 1418-1428, having different corresponding object models.

In this example, to determine the view 1402 or the view 1404 of the toy 1400, the image system may determine the pose of each of the members 1406-1416 or sub-objects 1418-1428 and combine the pose of each of the sub-objects 1418-1428 into the view of the toy 1400. In this manner, it should be understood that the image system may utilize a combination of poses or poses of multiple objects, such as sub-objects 1418-1428 as an input. For instance, the image system may utilize the view of the right arm 1406 as an input (e.g., to select an article indicated by view of the right arm 1406). In another instance, the image system may utilize the view of both the right arm 1406 and the left arm 1408 as an input (e.g., to move the article indicated by the right arm 1406 to a location indicated by the left arm 1408). In other instance, the image system may utilize the 6DOF pose of each of the members 1406-1416 in combination as an input (e.g., if view 1402 is identified as the 6DOF pose of the toy 1400, the image system may cause the toy 800 to transform into a super monkey within the virtual environment).

In the current example, each of the sub-objects 1418-1428 corresponding to one of the members 806-816 may include corresponding constellation points 1430-1440. In the current example, the constellation points 1430-1440 associated with each sub-object 14818-1428 may be of the same class or include the same feature. For instance, in the illustrated example, the constellation points 1430 share a class that differs from the class of constellation points 1432-1440. Likewise, the constellation points 1440 share a class that differs from the class of constellation points 1430-1438. The constellation points 1434-1438 also each share a class that differs from the constellation points 1430-1440 of the other sub-objects 1418-1428. However, it should be understood, that the constellation points 1430-1440 may all be of the same class regardless of the corresponding sub-object 1418-1428 or that each of the constellation points 1430-1440 may have a unique class. In other instances, some of the constellation points 1430-1440 in each sub-object 1418-1428 may belong to the same class while some of the constellation points 1430-14840 of each sub-object 1418-1428 may belong to different classes. For example, each sub-object 1418-1428 may have one constellation point 1430-1440 from each class of constellation points associated with the object 1400.

Figure 15:
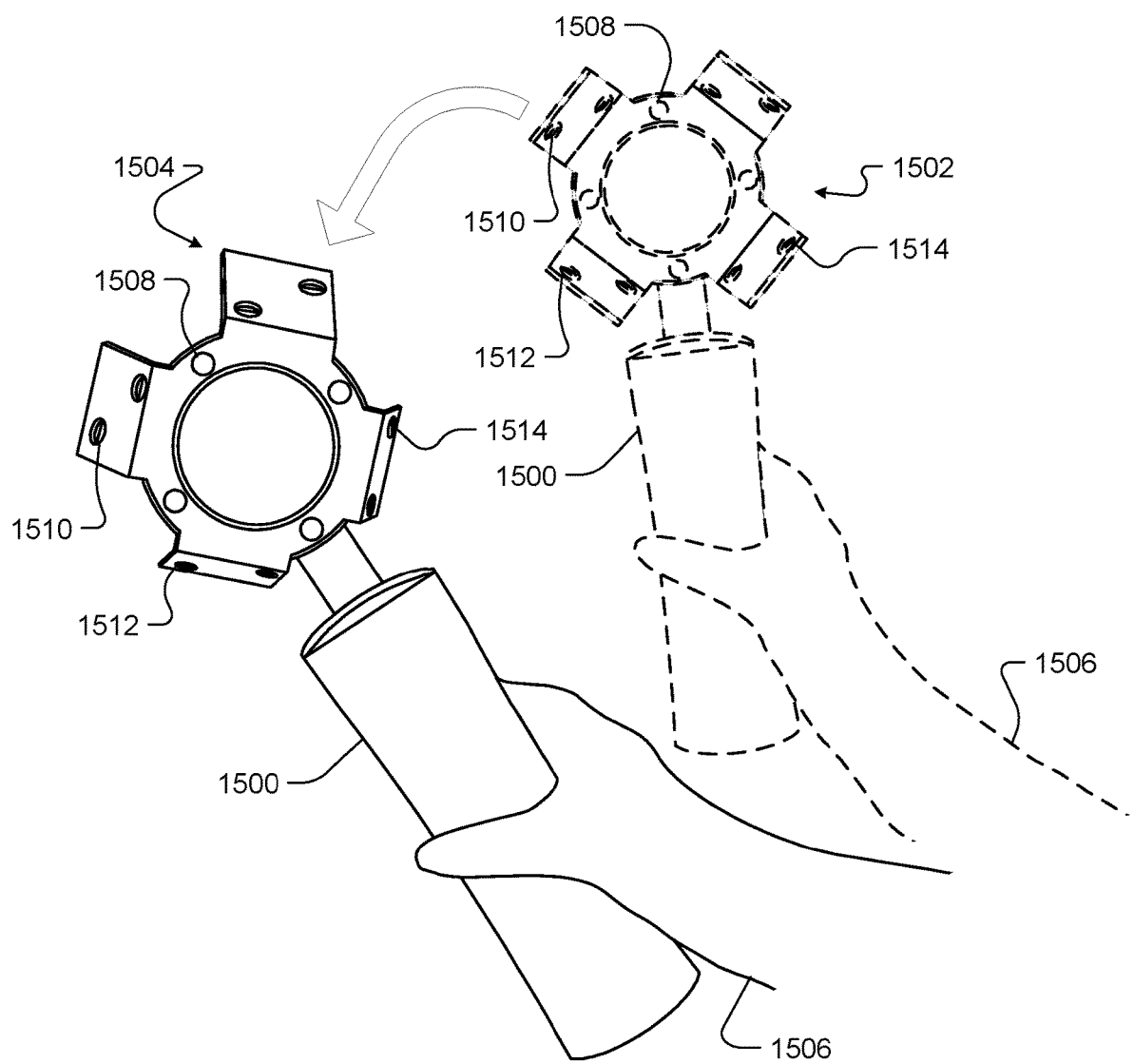
FIG. 15 illustrates an example object as the object is moved from a first pose to a second pose according to some implementations.

FIG. 15 illustrates an example object 1500 as the object is moved from a first 6DOF pose 1502 to a second 6DOF pose 1504 according to some implementations. As discussed above, in some cases, the image system may be configured to track or monitor the movement of the 6DOF pose of the object 1500 as the object 1500 is moved by the user 1506.

In these example, the image system may utilize a pose, such as the first 6DOF pose 1502, determined with respect to a previous frame to assist in determining a pose, such as the second 6DOF pose 1504, in a current frame. In these cases, the system may be configured to limit the set of candidates associated with determining the second 6DOF pose 904 using data associated with the first 6DOF pose 1502.

For example, the image points, such as representative image points 1508-1514, may be present in both the previous frame and the current frame captured by the image system. In this example, the image points, such as image points 1508-1514, detected in the current frame may be mapped against the image points 1508-1514 in the previous pose. From the mapping, the image system may determine linear translation vector in the 2D space based on a 2D correspondence between the image points 1508-1514 in the current frame and the previous frame. Thus, the image system is able to convert a 2D-3D correspondence problem between an image and an object model into a 2D-2D correspondence problem between a current frame and a previous frame. In this manner, the image system may limit the number of candidates included in the candidate set prior to testing the candidates using the object models, thereby reducing the computing resources and time consumed to perform 6DOF pose detection. In some specific examples, the previous 6DOF pose may be transformed by the orientation data associated with the image system and/or the object prior to use with respect to determining the 6DOF pose associated with the current frame.

FIGS. 16-36 are flow diagrams illustrating example processes associated with determining a 6DOF pose of an object according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 16:
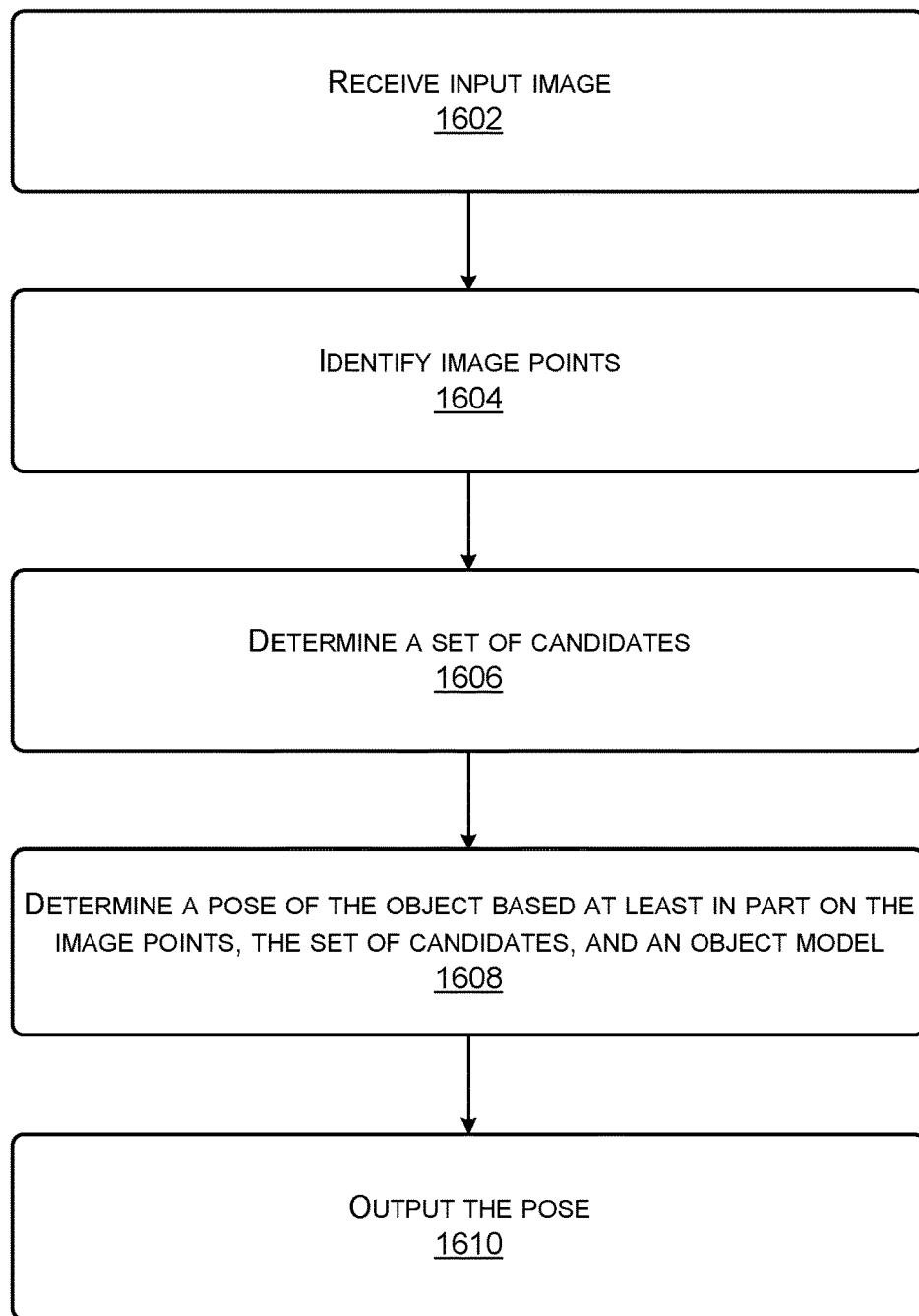
FIG. 16 is an example flow diagram showing an illustrative process for determining a pose of an object according to some implementations.

FIG. 16 is an example flow diagram showing an illustrative process 1600 for determining a 6DOF pose of an object according to some implementations. As discussed above, described herein is an image system that may be configured to determine a 6DOF pose of an object from image data captured from a single perspective. For example, an object may be marked with a predetermined pattern or constellation and the image system may store a corresponding 3D representation or object model of the object including the constellation.

At 1602, the image system may receive an image. For example, the image system may include or be equipped with various image components for capturing image data such as still images and video of a physical environment. In some cases, the image components may include infrared imaging devices for capturing data usable to identify image points corresponding to constellation points on the exterior of an object within the infrared spectrum. In some cases, the image may include data of an object associated with the image system.

At 1604, the image system may identify image points associated with an object within the image. For instance, the image system may apply a pixel regressor to the image data to determine sets or groups of pixels within the image likely to contain an image point. The image system may also perform suppression on image to identify the position or pixel corresponding to individual image points within each set of pixels. In some cases, such as when the image points belong to different classes, the image system may also perform classification on the image points to determine a class associated with each image point.

At 1606, the image system may determine a set of candidates that may be utilized to generate the 6DOF pose of the object. In some examples, each of the candidates may be a set of image point to model point relationships that may be used to generate a 6DOF pose associated with the object. For instance, each candidate may include a number of image point to model point correspondence sets (e.g., two or four 2D to 3D point correspondences) that may represent the 6DOF pose of the object.

In a first example, the image system may determine the set of candidates based on a previous 6DOF pose from a previous frame when available. For example, once the image points of the current frame are determined, the determined image points may be mapped against the image points in the previous 6DOF pose to identify a linear translation vector in the 2D space. Thus, some of the candidates may be eliminated as possible candidates for generating a 6DOF pose of the object within the current frame when the candidate has corresponding model points that exceed a margin of error supported by the linear translation vector. In some instances, use of the linear translation vector allows the linear equations used to test the candidates to be converted from a 2D to 3D (e.g., image point to model point) correspondence to be a 2D to 2D (e.g., current image point to previous image point) correspondence.

In other situations, such as during initialization of the image system or when the current frame is a first frame, use of a previous 6DOF pose to determine the current 6DOF pose of the object may be unavailable. In some of these situations, the image system and/or the object itself may be equipped with a measurement unit (e.g., an IMU, gyroscope, accelerometer, magnetometer, other device capable of capturing changes in orientation, position, or momentum of the object, or a combination thereof) to capture orientation data associated with the image system and/or the object. For instance, since the 6DOF pose of an object is with respect to a perspective of the image system and/or the user, and the perspective of the image system and/or user changes as the image system and/or the user moves within the physical environment, the measurement unit on the image system may utilize to limit or restrict candidates based on the perspective of the image system and/or user. Likewise, when the object is posable or portable, the 6DOF pose of the object with respect to the perspective of the image system and/or the user also changes as the object is moved. In this instance, the physical object may also be equipped with a measurement unit such that, the image system may restrict or limit the candidates based on the orientation of the object itself. In some cases, when the orientation data of the image system and/or the object is available, the candidate may be selected and the 6DOF pose determined when as few as two image points are available in the captured frame or image.

In still other situations, the use of a previous frame and the orientation data of the image system and the object may be unavailable. In these instances, the candidate may be selected based at least in part on the object model and the image points detected. For example, the image system may generate candidates based on sets of four or more image points per object. In some cases, during image point detection, the image system may be configured to generated pairs of classified image points that may be utilized to limit the number of candidates, such that the candidates may each be tested in substantially real-time or within a time frame that the user is unable to detect a pause or lag.

At 1608, the image system may determine a 6DOF pose of the object based at least in part on the image points, the set of candidates, and the object model associated with the object. For instance, each of the candidates of the set of candidates may be tested or used to solve a set of linear equations in order to determine a number of inliers associated with each of the candidate as well as a re-projection error metric. In one specific example, the image system may utilize RANSAC operations in association with the image points, the object model, and each of the candidates to determine a number inliers of a candidate given the image points and the object model. In this example, the image system may select one of the candidates to use to generate the 6DOF pose of the object based on the number of inliers (e.g., the candidate or image point to model point relationship sets that generated the largest number of inliers) and/or the re-projection error metric (e.g., the candidate with the lowest associated re-projection error metric).

At 1610, the image system may output the pose. For example, once a candidate is selected, the 6DOF pose of the object may be generated and the image system may utilize the 6DOF pose for various purposes, such as a control or user input into the virtual environment. For instance, the image system may select one or more articles presented on the display and associated with the virtual environment based at least in part on the 6DOF pose of the object.

Figure 17:
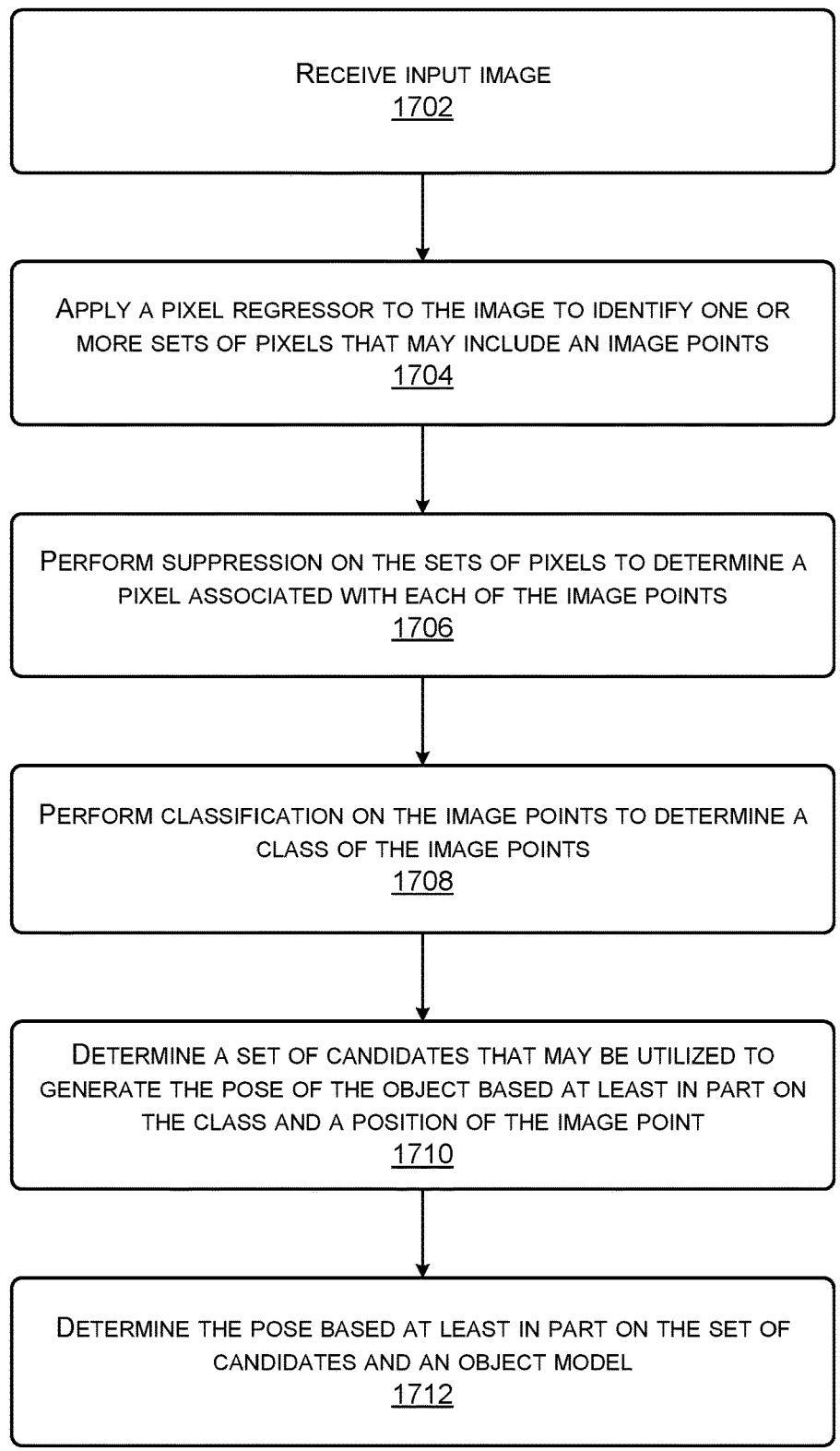
FIG. 17 is another example flow diagram showing an illustrative process for determining a pose of an object according to some implementations.

FIG. 17 is another example flow diagram showing an illustrative process 1700 for determining a 6DOF pose of an object according to some implementations. In some cases, an image system may be configured to use the 6DOF pose of an object as a user input or as part of a user input associated with a virtual environment. In these cases, the user may point or otherwise position the object. The image system may then determine the 6DOF pose of the object to, for example, identify an article that the object is being pointed at and to select or highlight the article.

At 1702, the image system may receive an image. For example, the image system may include or be equipped with various image components for capturing image data such as still images and video of a physical environment. In some cases, the image components may include infrared imaging devices for capturing data usable to identify image points corresponding to constellation points on the exterior of an object within the infrared spectrum. In some cases, the image may include data of an object associated with the image system.

At 1704, the image system may apply a pixel regressor to the image to identify one or more sets of pixels that may include an image point. For example, the image system may perform regression of image point detection likelihoods on a per pixel basis. For instance, the image system may perform random forest or convolutional neural net operations on the image to determine a probability that each pixel within the image may contain an image point. In some cases, the output of the pixel regressor may include a mapping wherein each pixel is converted to a value between zero and one. In these cases, the value is representative of the likelihood or percentage that each pixel contains an image point (e.g., a value of zero is 0% likelihood of a pixel having an image point and a value of one is 100% likelihood of a pixel having an image point). Thus, pixels with values close to zero have a low likelihood of continuing an image point while pixels with a value close to one have a high likelihood of containing an image point.

At 1706, the image system may perform suppression on the sets of pixels to determine a pixel associated with each of the image points. For instance, the image system may perform suppression, such as non-max suppression, on the mapping of likelihoods output by the pixel regressor, in order to select a pixel within each set of pixels that are likely to contain an image point as the pixel that contains the image point. It should be understood that while the image system discussed above selects a pixel as the pixel containing the image point, in some cases, more than one pixel may be representative of the image point (e.g., when the constellation points are large enough to be represented by multiple pixels) and in these cases, the image system may select a group of pixels as the pixels containing the image point.

In one particular example, a conventional image system that is processing a 200×200 pixel image requires 40,0000 applications of the regressor and 40,000 application of the suppressor (e.g., one time for each pixel). However, in some implementations described herein, since the pixel regressor is continuous and detections are usually found in regions or groups that are 4 or 5 pixels in diameter, the regressor may be applied with a stride factor. For instance, the regressor stride factor may be set to a value of two. In this case, the regressor may be applied for every other column and every other row of the image. By applying the regressor every other row and every other column, the same 200×200 pixel image may be processed using 10,000 applications of the regressor opposed to the conventional 40,000 applications. It should be understood that the particular example above is one example associated with using the pixel repressor having a stride factor and that other resolutions, image sizes, and stride factors may be utilized.

In the current instance, the output of the regressor may be a 100×100 pixel image. The 100×100 pixel image may then be used to identify regions of interest or locations within the original 200×200 pixel image. The pixel regressor may then be applied to the 200×200 pixel image with a stride factor of one but limited to the regions of interest. Following the application of the regressor with a stride factor of one to the region of interest, the suppressor may also be applied to the region of interest further reducing the applications of the suppressor as well as the applications of the regressor.

At 1708, the image system may perform classification on the image points to determine a class of the image points. For example, each image point may include a feature or unique characteristic, such as a unique color, pattern, or shading. In some cases, the image system may perform classification operations, such as operations associated with CNN classification, multi-class SVM, or a random forest classifier, on the image points to determine the class, feature, or characteristic. In some instances, the classification of the image points may result in an output of image point pairs (e.g., a blue image point paired with a yellow image point). Additionally, it should be understood that any number of image positions may share a class.

At 1710, the image system may determine a set of candidates that may be utilized to generate the 6DOF pose of the object based at least in part on the class and a position of the image point. As discussed above, each of the candidates may be a set of image point to model point relationships that may be used to generate a 6DOF pose associated with the object. For instance, each candidate may include a number of image point to model point correspondence sets that may represent the 6DOF pose of the object.

In a first example, the image system may determine the set of candidates based on a previous 6DOF pose from a previous frame when available. For example, once the image points of the current frame are determined, the determined image points may be mapped against the image points in the previous 6DOF pose to identify a linear translation vector in the 2D space. Some of the candidates may be eliminated when the candidate has corresponding model points that exceed a margin of error supported by the linear translation vector. In some instances, use of the linear translation vector allows the linear equations used to test the candidates to be converted from a 2D to 3D (e.g., image point to model point) correspondence to be a 2D to 2D (e.g., current image point to previous image point) correspondence.

In other situations, such as during initialization of the image system use of a previous 6DOF pose to determine the current 6DOF pose of the object may be unavailable. In some of these situations, the image system and/or the object itself may be equipped with a measurement unit (e.g., an IMU, gyroscope, accelerometer, magnetometer, other device capable of capturing changes in orientation, position, or momentum of the object, or a combination thereof) to capture orientation data (e.g., acceleration, angular momentum, rotation data, pitch, roll, yaw, etc.) associated with the image system and/or the object. For instance, since the 6DOF pose of an object is with respect to a perspective of the image system and/or the user, and the perspective of the image system and/or user changes as the image system and/or the user moves within the physical environment, the measurement unit on the image system may be utilize to limit or restrict candidates based on the perspective of the image system and/or user. Likewise, when the object is portable, the 6DOF pose of the object with respect to the perspective of the image system and/or the user also changes as the object is moved with respect to the image system and/or the user. When the object is portable, the object may also be equipped with a measurement unit such that, the image system may restrict or limit the candidates based on the orientation of the object itself. In some cases, when the orientation data of the image system and/or the object is available, the candidate may be selected and the 6DOF pose determined when as few as two image points are available in the captured frame or image.

In still other situations, the use of a previous frame and the orientation data of the image system and the object may be unavailable. In these instances, the candidate may be selected based at least in part on the object model and the image points detected. For example, the image system may generate candidates based on sets of four or more image points per object. In some cases, during image point detection, the image system may be configured to generate pairs of classified image points that may be utilized to limit the number of candidates, such that the candidates may each be tested in substantially real-time or within a period of time undetectable by a user as a pause or lag. However, it should be understood that in some implementations classification may not be performed on the image points and that an iterative approach to candidates testing may be utilized.

At 1712, the image system may determine a 6DOF pose of the object based at least in part on the candidates and an object model associated with the object. For instance, each of the candidates may be tested or used to solve a set of linear equations in order to determine a number of inliers as well as a re-projection error metric. In one specific example, the image system may utilize RANSAC operations in association with the object model and the candidates to determine a number inliers. In this example, the image system may select one of the candidates to use to generate the 6DOF pose of the object based on the number of inliers and/or the re-projection error metric.

Figure 18:
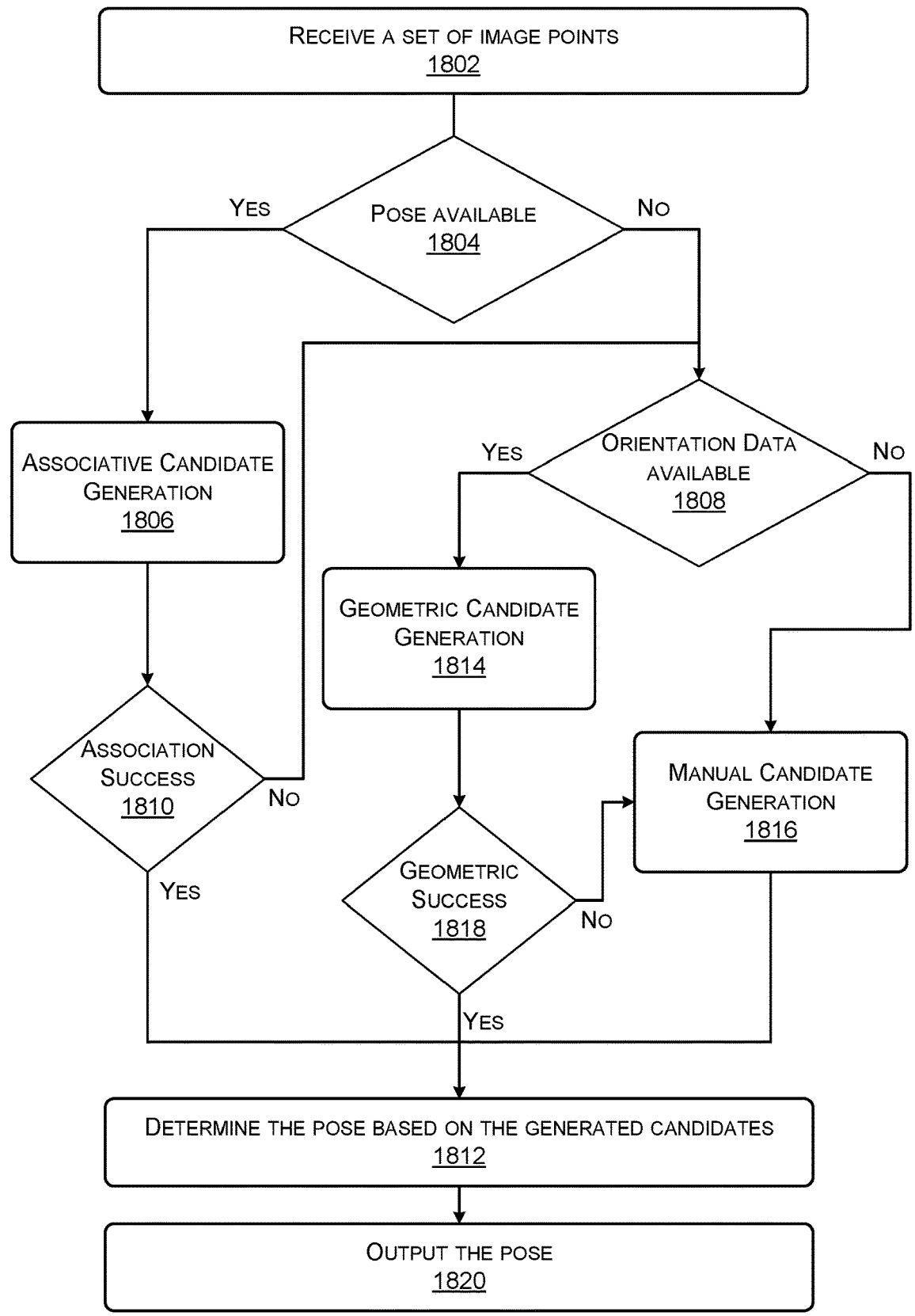
FIG. 18 is another example flow diagram showing an illustrative process for determining a pose of an object according to some implementations.

FIG. 18 is another example flow diagram showing an illustrative process 1200 for determining a 6DOF pose of an object according to some implementations. In some cases, an image system may be configured to utilize a 6DOF pose of a physical object as an input into a virtually generated environment (e.g., with for the user of mixed reality systems). In some implementations, the image system may determine a 6DOF pose of the object based on a set of image points detected within an image of the object and a set of model points associated with a stored 3D model of the object.

At 1802, the image system may receive a set of image points. For example, the image system may first apply a pixel regressor to an image to determine a likelihood that each pixel contains an image point. The image system may also perform suppression on the image to assign a pixel within the set of pixels likely to contain a pixel as the pixel containing the image point. In some cases, such as when color is used to classify the image points, the image system may perform classification on the image points to determine a class of each image point.

At 1804, the image system may determine if a previous 6DOF pose of the object is available. For example, if a previous 6DOF pose was determined, the process 1800 proceeds to 1806. However, if a previous 6DOF pose is unavailable, the process 1800 advances to 1808. At 1806, the image system may perform association candidate generation. For example, if a previous 6DOF pose of the object was determined with respect to a previous frame or image, the image system may utilize the previous 6DOF pose to determine a linear translation vector that may be used to generate the candidates. In some cases, by utilizing the linear translation vector the number of candidates generated can be reduced.

At 1810, the image system determines if the association candidate generation was successful (e.g., identified a candidate that could be utilized to generate the 6DOF pose of the object). If the association candidate generation was successful, the process advances to 1812. Otherwise, the process 1800 proceeds to 1808. At 1808, the image system determines if orientation data for the image system and/or the object is available. If the orientation data is available, the process 1800 proceeds to 1814, otherwise the process 1800 advances to 1816.

At 1814, the image system may perform geometric candidate generation. For instance, since the 6DOF pose of an object is with respect to a perspective of the image system and the perspective of the image system changes as the user moves, having the orientation data of the image system allows the image system to limit the number of candidates to be tested. Likewise, when the object is portable, the 6DOF pose of the object with respect to the perspective of the image system also changes as the object is moved. Thus, having orientation data of the object also allows the image system to limit the candidates.

At 1818, the image system determines if the geometric candidate generation was successful (e.g., identified a candidate that could be utilized to generate the 6DOF pose of the object). If the geometric candidate generation was successful, the process advances to 1812. Otherwise, the process 1800 proceeds to 1816.

At 1816, the image system may perform manual candidate generation. In this example, the image system may utilize sets of four or more image points to generate candidates based on the object model. In some cases, when classification was performed on the image points, the image system may utilize the class of one or more image points or classes of pairs of image points to limit the number of candidates.

At 1812, the image system generates a 6DOF pose for the objected based on the selected candidate. For example, the image system may apply operations associated with RANSAC to the selected candidate to generate the pose. At 1820 the image system may output the 6DOF pose or otherwise utilize the 6DOF pose to allow the user to interact with the virtual environment. For example, the image system may utilize the 6DOF pose to cause an interaction such as selection of an object within the virtual environment.

Figure 19:
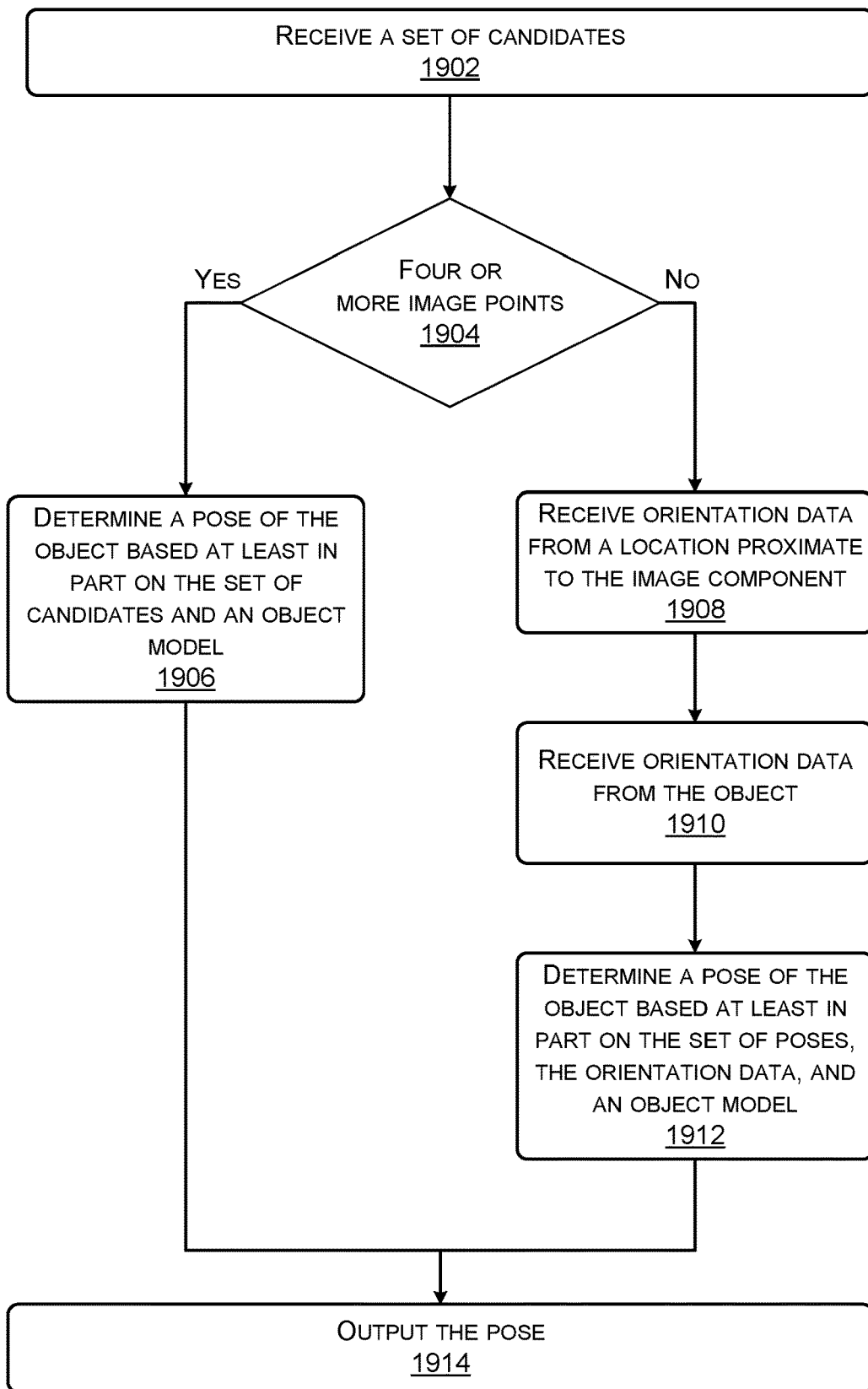
FIG. 19 is another example flow diagram showing an illustrative process for determining a pose of an object according to some implementations.

FIG. 19 is another example flow diagram showing an illustrative process 1900 for determining a 6DOF pose of an object according to some implementations. In some cases, an image system may be configured to use the 6DOF pose of an object as a user input or as part of a user input associated with a virtual environment. In these cases, the user may point or otherwise position the object. The image system may then determine the 6DOF pose of the object to, for example, identify an article that the object is being pointed at and to select or highlight the article.

At 1902, the image system may receive a set of candidates. For example, the candidate may be generated based on an associated candidate generation, geometric candidate generation, or iterative candidate generation as discussed above with respect to FIG. 18. In some cases, the candidates may be sets of image point to model point relationships or correspondences that may be used to generate a pose.

At 1904, image system may determine if four or more image points are available in the image. If four or more image points are available, the process 1900 may proceed to 1906. Otherwise, if two or three image points are available the process 1900 may advance to 1908. In some cases, if no image points were detected or if only a single image point was detected the image system may be unable to determine a 6DOF pose of the object and may wait for another image or frame of the object to be captured.

At 1906, the image system may determine the 6DOF pose of the object with respect to a current frame or image based at least in part on the set of candidates and the object model. For example, the image system may apply an operations associated with RANSAC to the image points, object model, and data associated with each candidate to determine a number of inliers or and/or re-projection error. The candidate with the highest number of inliers may be selected to generated the 6DOF pose of the object. In some cases, the 6DOF pose may be refined using a Gauss-Newton Optimization prior to selecting the candidate to generate the pose.

At 1908, the image system may receive orientation data from a location proximate to the image component or from a location proximate to the perspective that the virtual environment is being viewed. For instance, since the 6DOF pose of an object is with respect to a perspective of the image system and the perspective of the image system changes as the user moves, having the orientation data provides additional data that may be utilized when applying operations associated with RANSAC to identify inliers or re-production error.

At 1910, the image system may receive orientation data from the object. Again, the 6DOF pose of the object with respect to the perspective of the image system also changes as the object is moved. Thus, having orientation data of the object also may be utilized by the image system when applying operations associated with RANSAC to identify inliers or re-production error.

At 1912, the image system may determine the 6DOF pose of the object with respect to a current frame or image based at least in part on the set of candidates, the orientation data of the image system, the orientation data of the object, and the object model. For example, the image system may apply an operations associated with RANSAC to the image points, object model, orientation data, and data associated with each candidate to determine a number of inliers or and/or re-projection error. The candidate with the highest number of inliers may be selected to generated the 6DOF pose of the object. In some cases, the 6DOF pose may be refined using a Gauss-Newton Optimization prior to selecting the candidate to generate the pose.

At 1914, the image system may output or provide the data associated with the 6DOF pose to another system, module, or component. For instance, the 6DOF pose may be used as a user input or other control input by the image system. In one example, the 6DOF pose of the object may be used to select articles within the virtual environment, to manipulate articles within the virtual environment, or otherwise traverse the virtual environment.

Figure 20:
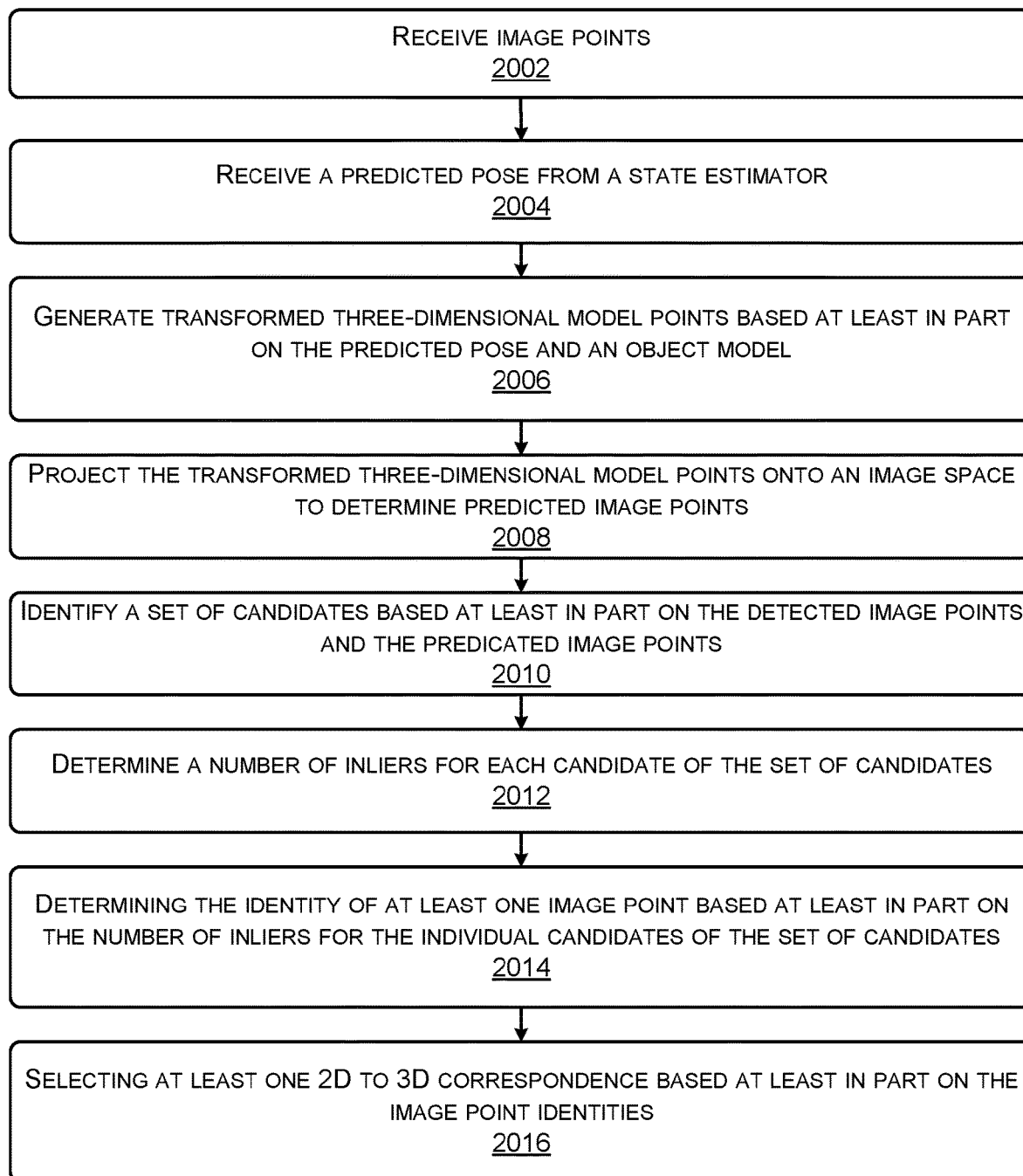
FIG. 20 is an example flow diagram showing an illustrative process for association candidate generation according to some implementations.

FIG. 20 is an example flow diagram showing an illustrative process 2000 for association candidate generation according to some implementations. For example, in some cases, a previous 6DOF pose identified with respect to a previous frame or image may be utilized to determine the 6DOF pose associated with a current frame. In some examples, such as process 1810 of FIG. 18, the association candidate generation may be utilized to decrease the time and processing resources necessary to identify the current pose.

At 2002, an image system may receive one or more image points identified with respect to an image containing data associated with an object. For example, the image points may correspond to constellation points on the exterior of the physical object represented in the image.

At 2004, the image system may receive a predicted 6DOF pose from a state estimator. For example, a predicted 6DOF pose may be determined from a previous 6DOF pose associated with the object and determined with respect to a previous frame or image captured by the image system. For instance, the state estimator may predict the 6DOF pose based on a projected or estimated trajectory of the object and the previous pose.

At 2006, the image system may generate transformed 3D model points from an object model and the predicted pose. For instance, the image system may store an object model including a 3D representation of the object with model points corresponding to the constellation points on the exterior of the physical object.

At 2008, the image system may project the transformed 3D model points onto an image space to determine predicted image points. For example, the predicted image points projected in the image space may be an estimate of a position of the image points in 2D based on the predicted image 6DOF pose and the object model.

At 2010, the image system may identify a set of candidates based at least in part on the detected image points and the predicted image points and, at 2012, the image system may determine a number of inliers for each candidate of the set of candidates. For example, based on the detected image points and the predicted image points, the image system may select candidates that are possible given the constraints of an estimated image space translation. The image system may then determine if the corresponding image points (e.g., the detected image point that corresponds to the predicted image point with the applied estimated translation) are within a predetermined distance or threshold of each other.

Each detected image point may be considered an inlier when the distance between the detected image point and the corresponding predicted image point (with the applied estimated translation) are within the predetermined distance or threshold and an outlier when the distance is greater than the predetermined distance or threshold. In some specific examples, if the image points were classified, the classification of the image points may be used to reduce the number of candidates identified as part of the candidate set.

At 2014, the image system may determine the identity of at least one detected image point based at least in part on the number of inliers for the individual candidates of the set of candidates. For instance, the candidate resulting in the highest number of inliers may be used to determine the identity of one or more of the detected image points. In one example, the image system may assign an identity to the image points based on the identity of the closest predicted image point within the candidate having the most inliers.

At 2016, the image system may select at least one 2D to 3D candidate based at least in part on the image point identities.

Figure 21:
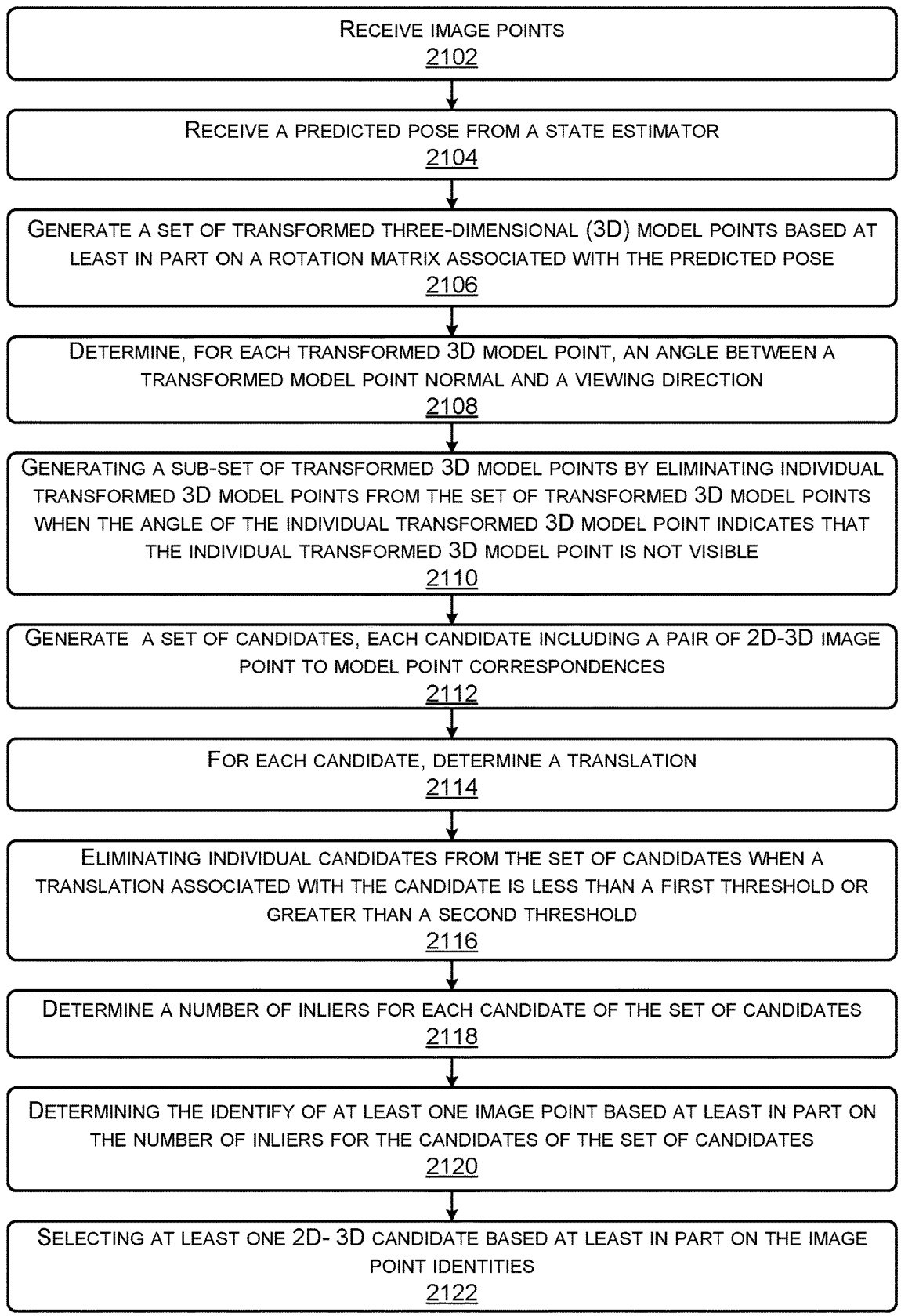
FIG. 21 is an example flow diagram showing an illustrative process for geometric candidate generation according to some implementations.

FIG. 21 is an example flow diagram showing an illustrative process 2100 for geometric candidate generation according to some implementations. For example, in some cases, orientation data associated with an image system and/or the object may be utilized to determine a 6DOF pose associated with a current frame. In some examples, such as process 1814 of FIG. 18, the geometric candidate generation may be utilized to decrease the time and processing resources necessary to identify the current pose.

At 2102, an image system may receive one or more image points identified with respect to an image containing data associated with an object. For example, the image points may correspond to constellation points on the exterior of the physical object represented in the image.

At 2104, the image system may receive a predicted 6DOF pose from a state estimator. For example, a predicted 6DOF pose may be determined from orientation data associated with the image system and/or the physical object. For instance, the state estimator may predict the 6DOF pose based on the object model of the physical object and the orientation of the image system with respect to the orientation of the object.

At 2106, the image system may generate transformed 3D model point from a rotation matrix associated with predicted pose. For example, the rotation matrix may be based at least in part on the orientation data of the image system and/or the physical object.

At 2108, the image system may determine, for each transformed 3D model point, an angle between a transformed model point normal and a viewing direction. For example, the viewing direction may be determined based on the orientation data associate with the image system.

At 2110, the image system may generate a sub-set of transformed 3D model points by eliminating individual transformed 3D model points from the set of transformed 3D model points when the angle of the individual transformed 3D model point indicates that the individual transformed 3D model point is not visible.

At 2112, the image system may generate a set of candidates, each candidate including a pair of 2D-3D image point to model point correspondences. In some specific examples, if the image points were classified, the classification of the image points may be used to reduce the number of candidates identified as part of the candidate set.

At 2114, the image system may, for each candidate, determine a translation that translates the transformed 3D model points so as to produce the observed image points under projection. For example, the image system may determine a distance between the image points of each pair. The image system may then determine a scaling factor that may be used to determine a location of an image point in 3D space when deprojected. The scaling factor may then be utilized to determine the translation.

At 2116, the image system may eliminate individual candidate from the set of candidates when a translation associated with the candidate is less than a first threshold or greater than a second threshold. For instance, if the translation is less than 0.5 meters or greater than 1.3 meters the candidate may be eliminated as a 6DOF pose generated using the candidate is impossible in a physical environment.

At 2118, the image system may determine a number of inliers for each candidate of the set of candidates. For example, the image system may determine if a distance between an image point in the image and an projected transformed 3D model point with the translation applied (predicted image point) is within a predetermined distance or threshold of each other. Each image point may be considered an inlier when the distance between the detected image point and the corresponding predicted image point are within the predetermined distance or threshold and an outlier when the distance is greater than the predetermined distance or threshold.

At 2120, the image system may determine the identity of at least one detected image point based at least in part on the number of inliers for the individual candidates of the set of candidates. For instance, the candidate resulting in the highest number of inliers may be used to determine the identity of one or more of the detected image points. In one example, the image system may assign an identity to the image points based on the identity of the closest image point associated with the candidate having the most inliers.

At 2122, the image system may select at least one 2D to 3D candidate based at least in part on the image point identities.

Figure 22:
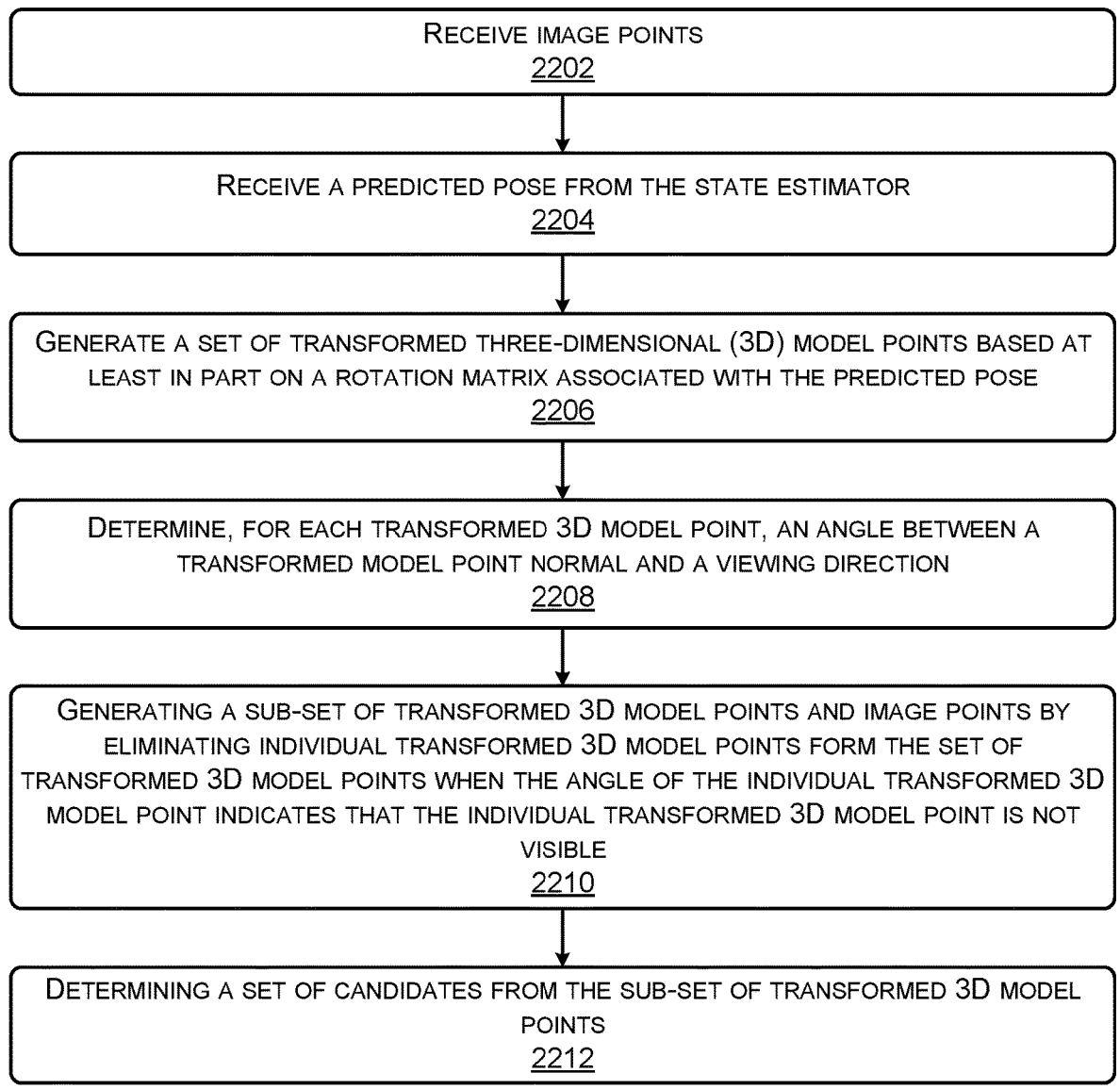
FIG. 22 is another example flow diagram showing an illustrative process for geometric candidate generation according to some implementations.

FIG. 22 is another example flow diagram showing an illustrative process 2200 for geometric candidate generation according to some implementations. For example, in some cases, orientation data associated with an image system and/or the object may be utilized to determine a 6DOF pose associated with a current frame. In some examples, such as process 1814 of FIG. 18, the geometric candidate generation may be utilized to decrease the time and processing resources necessary to identify the current pose.

At 2202, an image system may receive one or more image points identified with respect to an image containing data associated with an object. For example, the image points may correspond to constellation points on the exterior of the physical object represented in the image.

At 2204, the image system may receive a predicted 6DOF pose from a state estimator. For example, a predicted 6DOF pose may be determined from orientation data associated with the image system and/or the physical object. For instance, the state estimator may predict the 6DOF pose based on the object model of the physical object and the orientation of the image system with respect to the orientation of the object.

At 2206, the image system may generate transformed 3D model point from a rotation matrix associated with predicted pose. For example, the rotation matrix may be based at least in part on the orientation data of the image system and/or the physical object.

At 2208, the image system may determine, for each transformed 3D model point, an angle between a transformed model point normal and a viewing direction. For example, the viewing direction may be determined based on the orientation data associate with the image system.

At 2210, the image system may generate a sub-set of transformed 3D model points and image points by eliminating individual transformed 3D model points from the set of transformed 3D model points when the angle of the individual transformed 3D model point indicates that the individual transformed 3D model point is not visible.

At 2212, the image system may determine a set of candidates from the sub-set of transformed 3D model points. In some specific examples, if the image points were classified, the classification of the image points may be used to reduce the number of candidates within the set of candidates.

Figure 23:
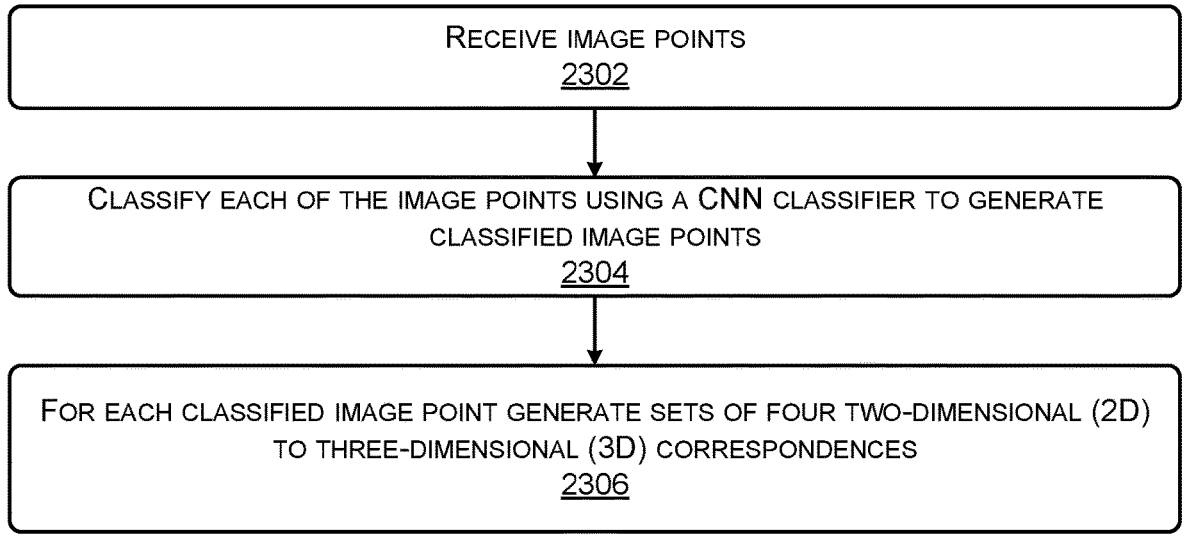
FIG. 23 is an example flow diagram showing an illustrative process for manual candidate generation according to some implementations.

FIG. 23 is an example flow diagram showing an illustrative process 1700 for manual candidate generation according to some implementations. In some examples, such as process 1816 of FIG. 18, the manual candidate generation may be utilized to generate many or all possible candidates required to determine a 6DOF pose of an object even when the orientation data and/or a previous 6DOF pose are unavailable.

At 2302, an image system may receive one or more image points identified with respect to an image containing data associated with an object. For example, the image points may correspond to constellation points on the exterior of the physical object represented in the image.

At 2304, the image system may classify each of the image points using a CNN classifier to generate classified image points. For example, the object may include constellation points capable of emitting light. In some instances, the color of the light may be used to classify the image points.

At 2306, the image system may for each classified image point generate sets of two to four 2D to 3D correspondences. For example, the image system may identify each set of four 2D to 3D image points that may be used to estimate a pose.

Figure 24:
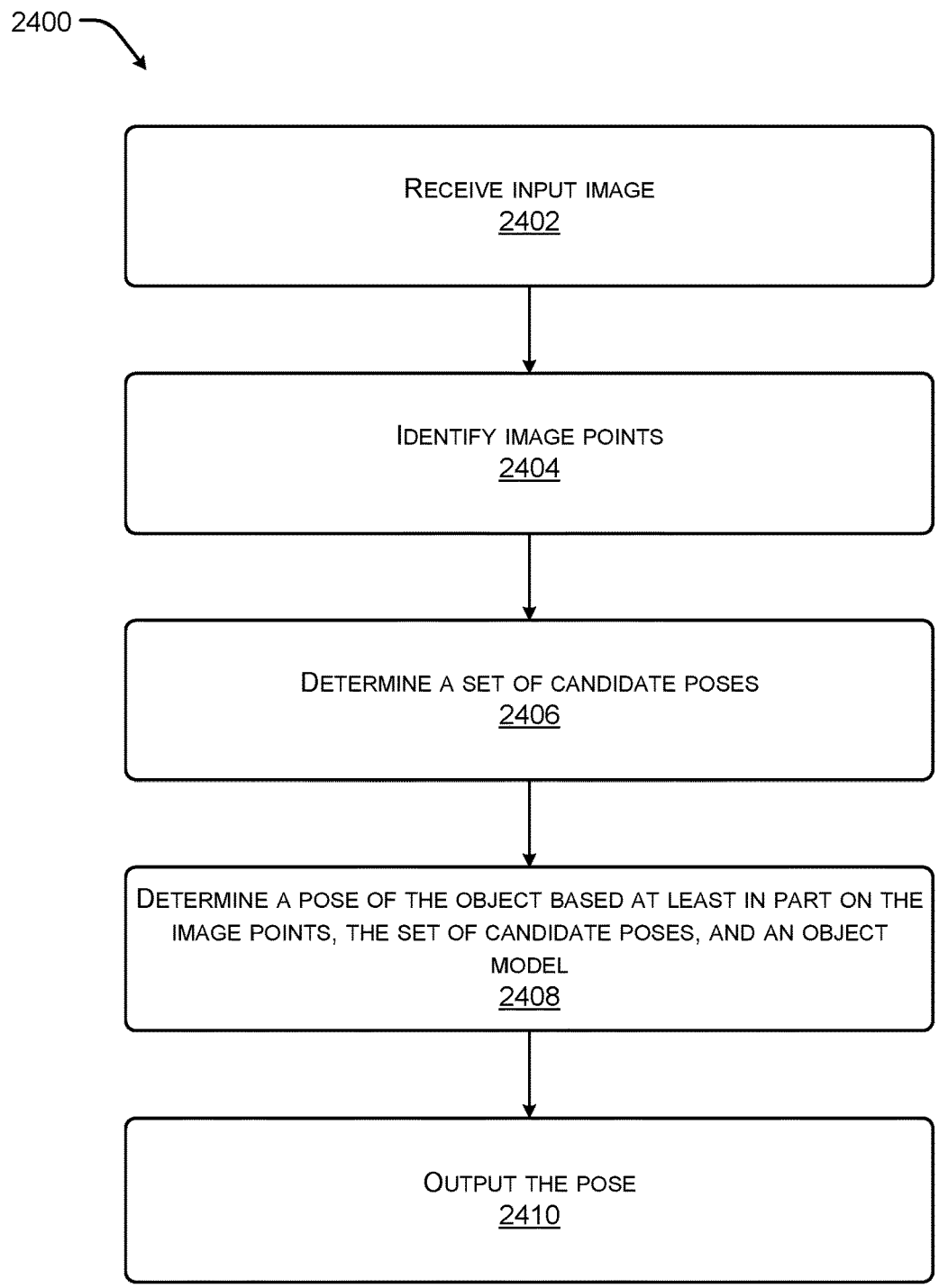
FIG. 24 is an example flow diagram showing an illustrative process for determining a pose of an object according to some implementations.

FIG. 24 is an example flow diagram showing an illustrative process 2400 for determining a 6DOF pose of an object according to some implementations. As discussed above, described herein is an image system that may be configured to determine a 6DOF pose of an object from image data captured from a single perspective, in some implementations. For example, an object may be marked with a predetermined pattern or constellation and the image system may store a corresponding 3D representation or object model of the object including the constellation.

At 2402, the image system may receive an image, such as a monochrome image when the image is captured by the headset device. For example, the image system may include or be equipped with various image components for capturing image data such as still images and video of a physical environment. In some cases, the image components may include monochrome imaging devices for capturing data usable to identify image points corresponding to constellation points on the exterior of an object, as monochrome cameras typically produce a sharper image as color filters over the lenses may be removed. In some cases, the image may include data of a controller associated with the image system.

At 2404, the image system may identify image points associated with an object, headset device, or controller within the image. For instance, the image system may apply a pixel regressor to the image data to determine sets or groups of pixels within the image likely to contain an image point. The image system may also perform suppression on image to identify the position or pixel corresponding to individual image points within each set of pixels. In some cases, such as when the image points are the headset device and belong to different classes (e.g., different color LEDs or differently timed flashing LEDs are used as constellation points), the image system may also perform classification on the image points to determine a class associated with each image point.

In one example, the image system may segment the image into multiple patches. Some of the patches will include an image point or data representative of a point in the constellation. The image system may utilize a low-resolution search on each patch to determine each patch that includes data representative of an image point. The image system may identify the location of the image point within each patch including an image point by applying a weighted average via a sliding window over the patch.

At 2406, the image system may determine a set of candidate 6DOF poses that may be utilized to generate the 6DOF pose of the object. In some examples, each of the candidate 6DOF poses may be a set of image point to model point relationships that may be used to generate a 6DOF pose associated with the object. For instance, the image system may generate multiple sets of image points and, then, for each set of image points, generate at least one candidate 6DOF pose. In other cases, the image system may utilize orientation data of the object may be used to generate one or more candidate 6DOF pose. In an alternative example, the system may generate the candidate 6DOF pose by perturbing the prior 6DOF pose along the three angles and three translations. In one specific example, the image system may generate the forward predictive 6DOF pose using the orientation data from the object and then perturb the forward predictive 6DOF pose along the three angles and three translations to generate a plurality of candidate 6DOF poses.

At 2408, the image system may determine a 6DOF pose of the object based at least in part on the image points, the set of candidate 6DOF poses, and the object model associated with the object. For instance, each of the candidate 6DOF poses may be project into the image space and a number of inliers determined based on a distance between each projected point and the nearest image point. The candidate 6DOF pose having the largest number of inliers may be selected as the 6DOF pose. In the case that multiple candidate 6DOF poses have the largest number of inliers, then the image system may select the remaining candidate 6DOF pose having the lowest reprojection error.

At 2410, the image system may output the 6DOF pose. For example, once a candidate 6DOF pose is selected, the 6DOF pose of the object may be generated and the image system may utilize the 6DOF pose for various purposes, such as a control or user input into the virtual environment. For instance, the image system may select one or more articles presented on the display and associated with the virtual environment based at least in part on the 6DOF pose of the object.

FIG. 25 is an example flow diagram showing an illustrative process 2500 for determining a 6DOF pose of an object using a monochrome image according to some implementations. For example, prior to determining the 6DOF pose of an object, such as the controller, headset or other item in the physical environment, the image system detects image points within the captured image data. As discussed above, the image system may also be configured to utilize monochrome images or image devices to capture the image data. Additionally, the constellation points on the object may be static. Thus, in the system discussed herein, the 6DOF pose is determined without the use of classification based on color or active components (e.g., flashing LEDs).

At 2502, the image system may receive an image. In some cases, the image may include at least a first image point and a second image point. The image may also include additional image points, such as a third and fourth image point. As discussed above, the image may be a monochrome image.

At 2504, the image system may segment the monochrome image into multiple patches. Some of the patches will include an image point, such as the first or second image point. Other patches may not contain an image point and, thus, may be discarded.

At 2506, the image system may identify using a low resolution search a first patch containing the first image point and a second patch containing the second image point. The image system may utilize a low-resolution search on each patch to determine each patch that includes data representative of an image point, as the search may be performed quicker and with less computing resources.

At 2508, the image system may identify the location of the first image point within the first patch by applying a weighted average location using a sliding window over the first patch at a high resolution and, at 810, the image system may identify the location of the second image point within the second patch by applying a weighted average location using a sliding window over the second patch at a high resolution. For example, identifying the first and second patches using a low-resolution search may allow the patch to be selected, the accurately identifying the location of the image point assists in more accurately determining the 6DOF pose of the object. However, by only applying the sliding window in high resolution to the patches having an image point opposed to every patch the processing time may still be reduced over conventional mixed reality systems.

Figure 26:
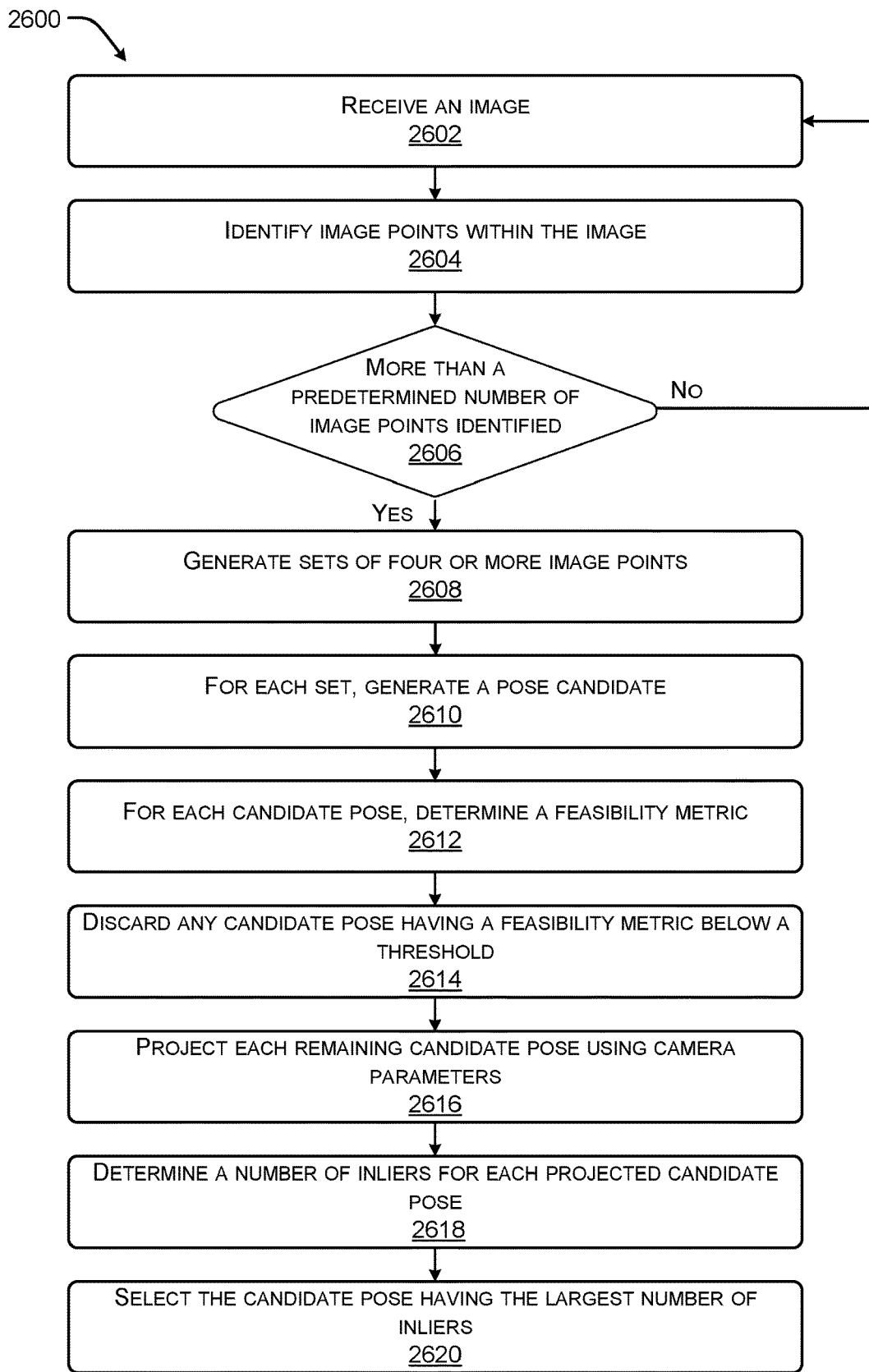
FIG. 26 is an example flow diagram showing an illustrative process for determining a pose of an object without a stored prior pose according to some implementations.

FIG. 26 is an example flow diagram showing an illustrative process 2600 for determining a 6DOF pose of an object without a stored prior 6DOF pose according to some implementations. For example, when the image system is initialized or activated for the first time, the image system is unaware of the prior 6DOF pose (or any 6DOF pose) of the object being tracked (e.g., the controller or headset device). Similarly, in some cases, the object being tracked may be moved out of view from the image device and, thus, the image system may need to re-initialize the tracking during use. In these examples, the image system may perform an initial 6DOF pose.

At 2602, the image system may receive an image including image data representative of the object. In the current example, the image may be a monochrome image, as discussed above. For instance, the image device may be associated with the headset device and the image may include image data representative of a controller used to interact with the virtual scene.

At 2604, the image system may identify image points within the image. For example, the image system may segment the image into multiple patches. Some of the patches will include an image point or data representative of a point in the constellation on the object. The image system may utilize a low-resolution search on each patch to determine each patch that includes data representative of an image point. The image system may identify the location of the image point within each patch including an image point by applying a weighted average via a sliding window over the patch in a high resolution.

At 2606, the image system may determine if more than a predetermined number of image points were identified within the image. For example, the image system may require a predetermined number of image points (such as four or six) to accurately identify an initial 6DOF pose of the object. In these cases, the image system may cause the system to return to 2602 when less than the predetermined number of image points are identified. Otherwise, the image system may proceed to 2608.

At 2608, the image system may generate sets of four or more image points from the identified image points. For instance, the image system may determine a set for each possible combination of the image points. In some cases, the sets of image points may be four image points, five image points, and six image point combinations.

At 2610, the image system may generate a 6DOF pose for each set of image points generated. For example, the image system may apply a PnP technique, such as P3P, to generate a six-degree of freedom 6DOF pose based on each set of image points.

At 2612, the image system may determine a feasibility metric for each of the 6DOF poses. For example, given the candidate 6DOF pose, the object model, and the image data, some of the candidate 6DOF poses generated may be physically impossible.

At 2614, the image system may discard any candidate 6DOF pose that has a feasibility metric below a threshold. For example, the threshold may be set such that any candidate 6DOF pose having a lower feasibility metric is either impossible or highly unlikely and, thus, should not be tested.

At 2616, the image system may project each remaining candidate 6DOF pose using the camera parameters. For example, the image system may project the candidate 6DOF poses into the image space.

At 2618, the image system may determine a number of inliers for each candidate 6DOF pose. For instance, the image system may determine the number of inliers by identifying each image point within a threshold distance of a corresponding point of the projected candidate 6DOF pose. In some cases, the toehold distance may be a pixel value, such as 2 pixels, 4 pixels, 6 pixels, 8 pixels, or 10 pixels.

At 2620, the image system may select the candidate 6DOF pose having the largest number of inliers. For example, the candidate 6DOF pose having the most inliers is the most likely 6DOF pose of the object as the candidate 6DOF pose is a closest match given the known image points within the image.

Figure 27:
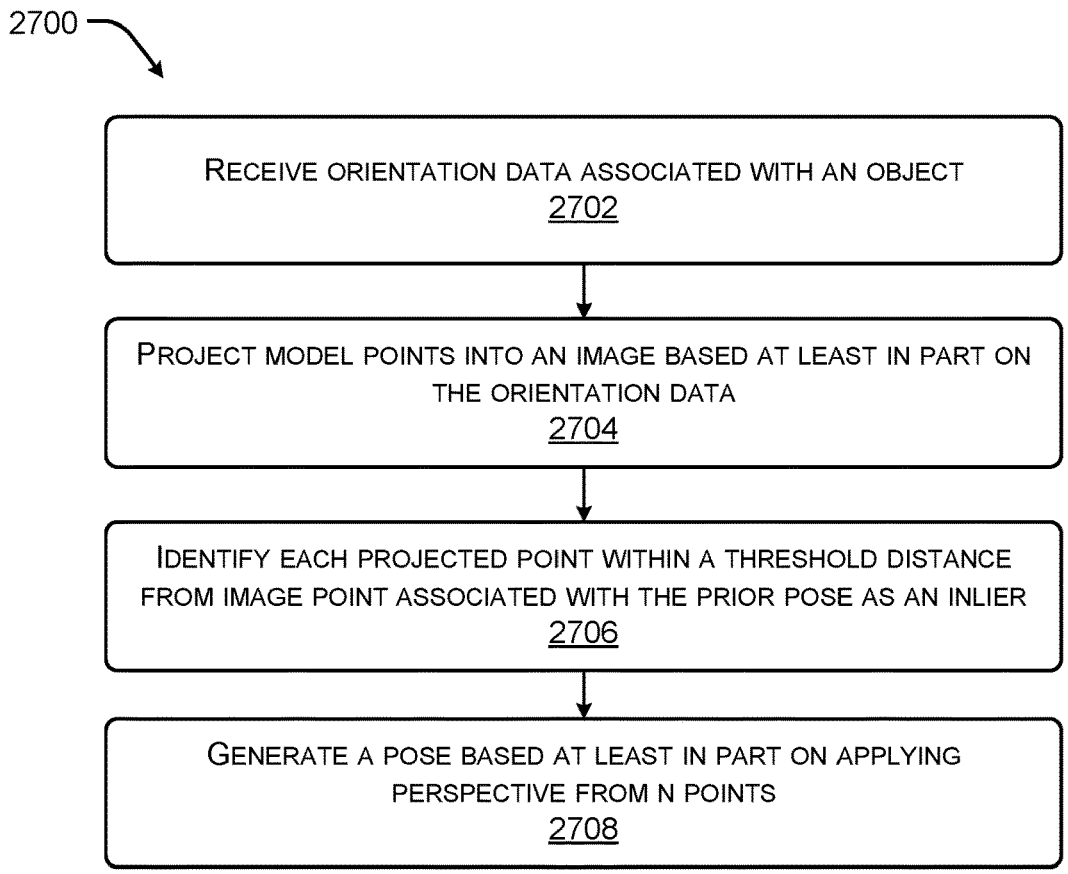
FIG. 27 is an example flow diagram showing an illustrative process for determining a pose of an object with a stored prior pose according to some implementations.

FIG. 27 is an example flow diagram showing an illustrative process 2700 for determining a 6DOF pose of an object with a stored prior 6DOF pose according to some implementations. In some cases, the image system may have a prior 6DOF pose of an object available, for instance, when the image system has been in the process of tracking the position of the object. In these cases, the image system may utilize the prior 6DOF pose information to assist in determining a current 6DOF pose of the object.

At 2702, the image system may receive orientation data from the object being tracked, such as the controller or headset device. For example, the object (e.g., the controller or headset device) may be equipped with measurement units, such as one or more IMUs, one or more accelerometers, one or more gyroscopes, one or more magnetometers, as well as other sensors.

At 2704, the image system may project the model points into the image based at least in part on the orientation data. For example, the orientation data may be used to generate one or more forward predictive 6DOF poses of the object. Each forward predictive 6DOF pose may then be projected by the image system such that the projected points may be compared to the image points.

At 2706, the image system may identify each projected point within a threshold distance from image point associated with the prior 6DOF pose as an inlier. For example, the toehold distance may be measured as a number of pixels. In some cases, multiple thresholds may be used (for example, within 4 pixels and within 6 pixels). In these cases, when multiple forward predictive 6DOF pose have the same number of inliers, the smaller of the thresholds may be used to eliminate one or more of the multiple forward predictive 6DOF pose.

At 2708, the image system may generate a 6DOF pose based at least in part on applying PnP on each of the inliers. For instance, after projecting the predicative 6DOF poses, the image system may apply a PnP technique to refine the 6DOF pose.

Figure 28:
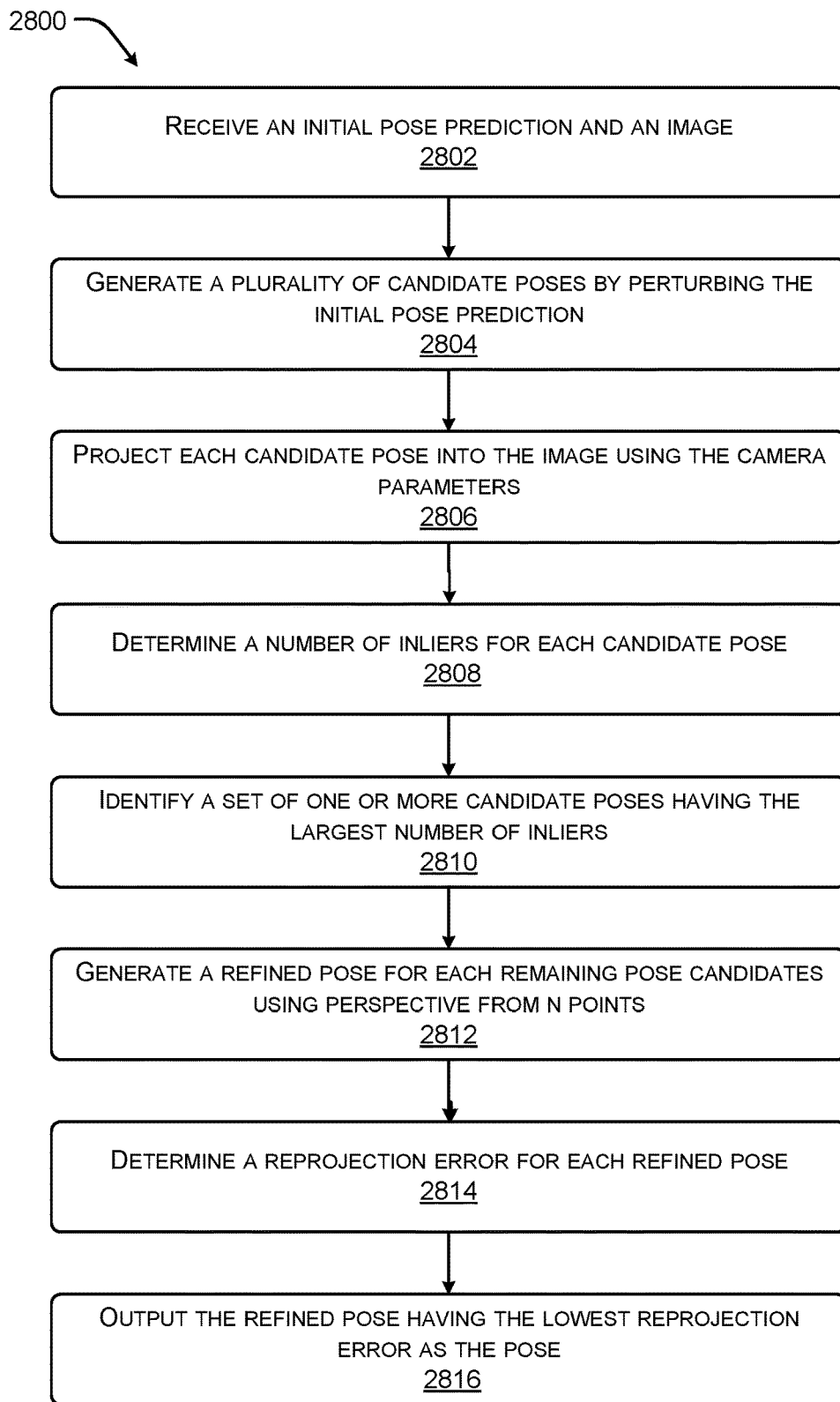
FIG. 28 is another example flow diagram showing an illustrative process for determining a pose of an object with a stored prior pose according to some implementations.

FIG. 28 is another example flow diagram showing an illustrative process 2800 for determining a 6DOF pose of an object with a stored prior 6DOF pose according to some implementations. Similar to FIG. 10 discussed above, the image system may have a prior 6DOF pose of an object available. For instance, the prior 6DOF pose may be available when the image system has been in the process of tracking the position of the object. In these cases, the image system may utilize the prior 6DOF pose information to assist in determining a current 6DOF pose of the object.

At 2802, the image system may an initial 6DOF pose prediction and an image. For example, the object (e.g., the controller or headset device) may be equipped with measurement units, such as one or more IMUs, one or more accelerometers, one or more gyroscopes, one or more magnetometers, as well as other sensors. In these examples, the image system may utilize the orientation data to generate a forward predictive 6DOF pose. In other cases, the prior 6DOF pose may be used as the initial 6DOF pose prediction.

At 2804, the image system may generate a plurality of candidate 6DOF poses by perturbing the initial 6DOF pose prediction. For example, the image system may perturb the initial 6DOF pose by applying various value combinations along the three angles and three translations.

At 2806, the image system may project each of the candidate 6DOF poses into the image using the camera parameters and, at 2808, the image system may determine number of inliers for each candidate 6DOF pose. For instance, the image system may project the candidate 6DOF pose into the image space and mark each model point or projected point that is less than a threshold distance from an image point as an inlier.

At 2810, the image system may determine a set of one or more candidate 6DOF poses having the largest number of inliers. For example, multiple candidate 6DOF poses may have the same number of projected points within the threshold distance of the image points within the image space.

At 2812, the image system may generate a refined 6DOF pose for each of the remaining 6DOF pose candidate using PnP. For example, the image system may apply a P3P technique to each of the remining candidate 6DOF poses in order to generate the refined 6DOF poses.

At 2814, the image system may determine a reprojection error for each refined 6DOF pose and, at 2816, the image system may output the refined 6DOF pose having the lowest reprojection error as the 6DOF pose of the object.

Figure 29:
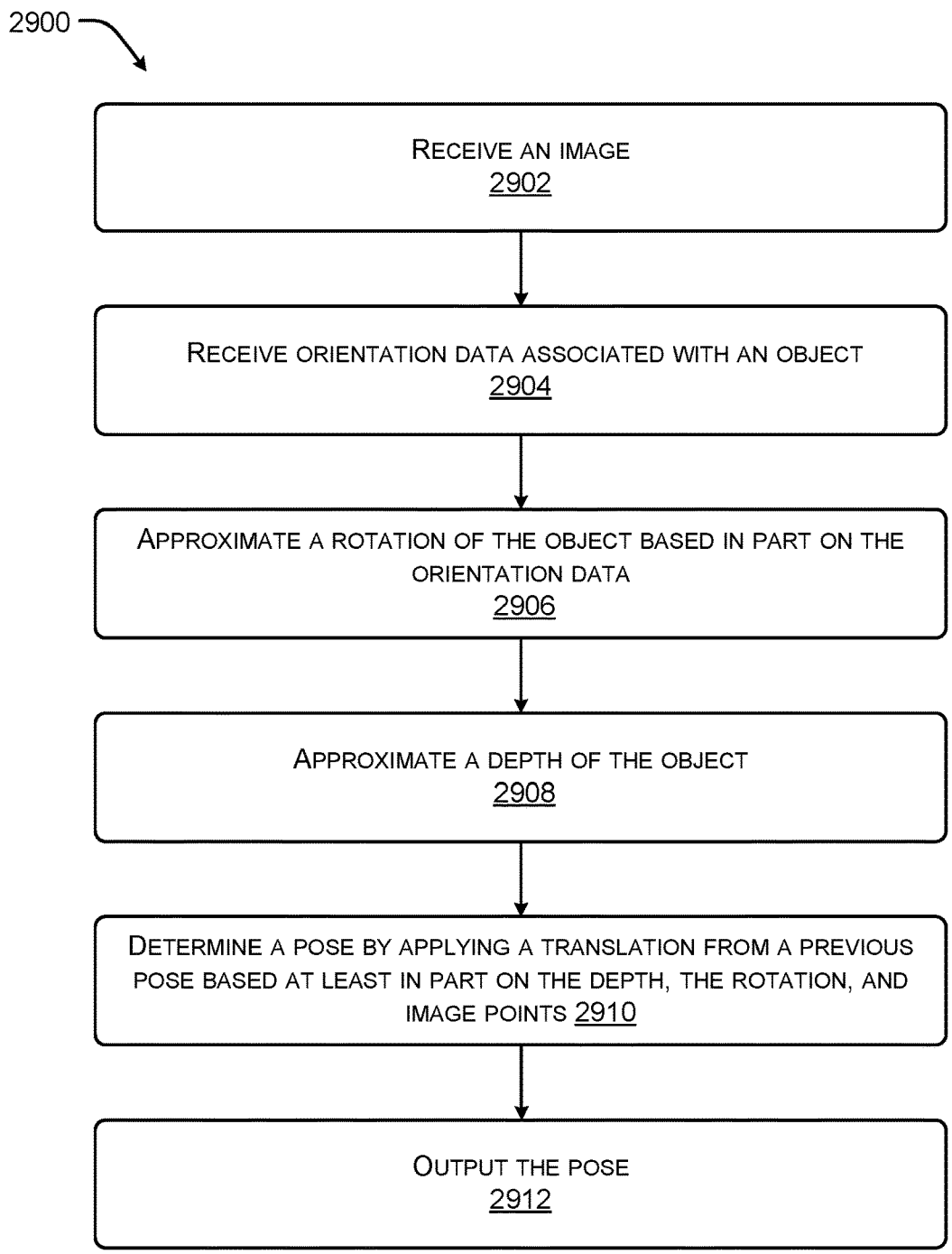
FIG. 29 is an example flow diagram showing an illustrative process for determining a pose of an object with less than four image points visible according to some implementations.

FIG. 29 is an example flow diagram showing an illustrative process 2900 for determining a 6DOF pose of an object with less than four image points visible according to some implementations. In some cases, less than a threshold number of image points may be visible in the image. For instance, only two or three image points may be visible.

At 2902, the image system may receive an image. For example, the image may be a monochrome image, as discussed above. In these examples, the image system is unable to utilize classifiers based on color.

At 2904, the image system may receive orientation data associated with the object and, at 2906, the image system may approximate a rotation of the object based at least in part on the orientation data. For example, the image system may determine a predicted rotation of the object based on the orientation data. The predicted rotation may then be used to provide three of the degrees of freedom of a six degree of freedom 6DOF pose.

At 2908, the image system may approximate a depth of the object. The depth may be used to provide a fourth degree of freedom for the six degrees of freedom 6DOF pose. For instance, the image system may utilize an estimate of the depth determined directly from the orientation data as true. In another instance, the image system may approximate the depth using weak perspective. In this instance, the perspective effects of the image device are assumed to be negligible with respect to the object. For example, the distance between the nearest point of the object and the farthest point of the object is small in comparison to the distance between the object and the headset device equipped with the image device. Due to the relative distance, the image system may determine a ratio of the distance in image space versus distance in model space. The ratio may be used to determine a scalar value that may be used to determine depth with respect to the newly captured image. In yet another instance, the image system may approximate the depth by using an edge lengths within the image and model. For instance, the image system may determine a plurality of ratios of image object to model object. The image system may then select the most common ratio as a scaler value that may be used to determine depth with respect to the image.

At 2910, the image system may determine a 6DOF pose by applying a translation from a previous 6DOF pose based at least in part on the depth, the rotation, and image points. For example, the image system may determine the remaining two degrees of freedom (e.g., the X and Y coordinates) by applying a translation from the previous 6DOF pose to the current 6DOF pose given the previous 6DOF pose and the estimated values of other four degrees of freedom.

At 2912, the image system may output the 6DOF pose. As discussed above, the 6DOF pose may then be used to select articles or items within the virtual scene, to manipulate articles within the virtual scene, or otherwise traverse the virtual scene.

Figure 30:
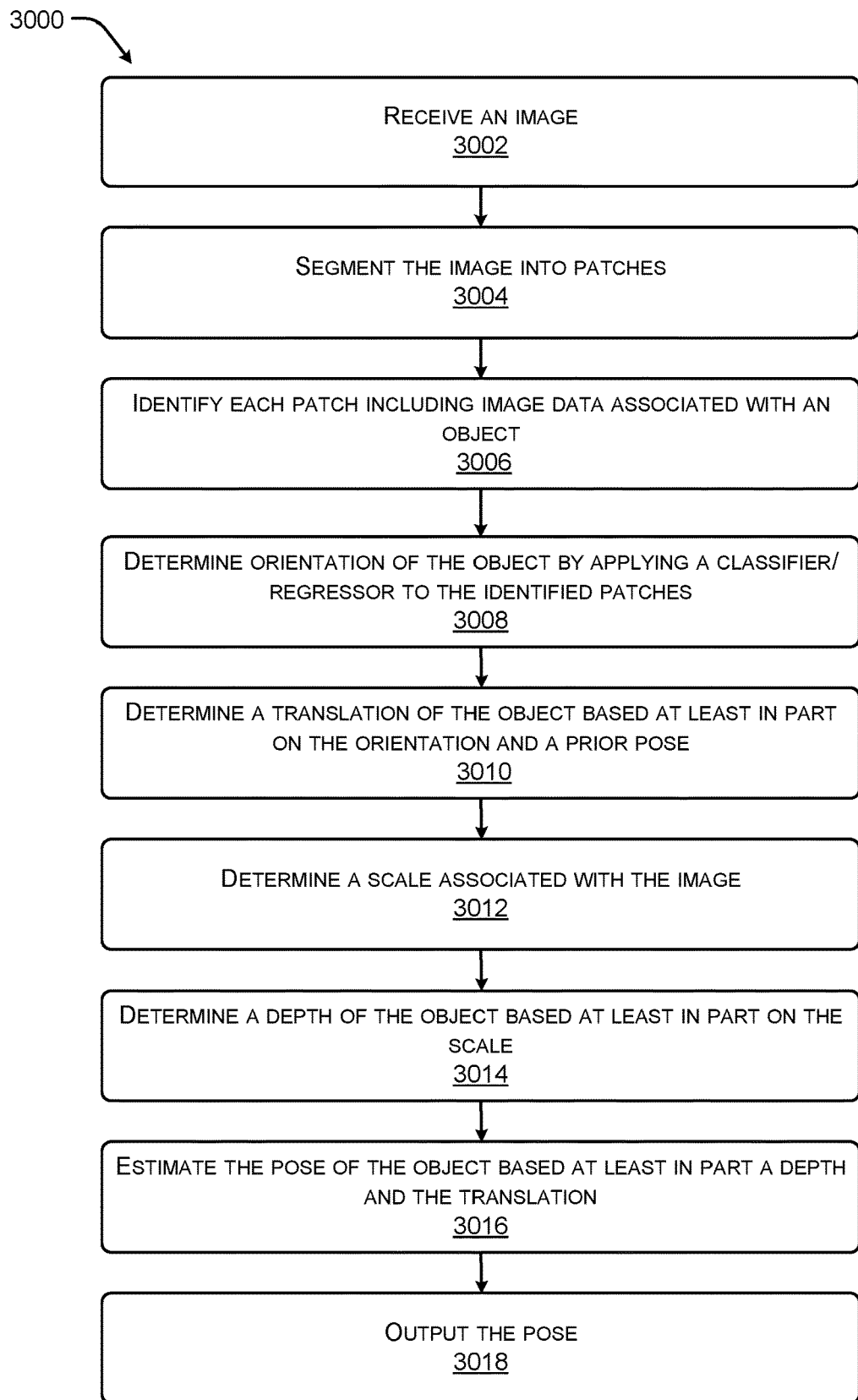
FIG. 30 is an example flow diagram showing an illustrative process for determining a pose of an object according to some implementations.

FIG. 30 is an example flow diagram showing an illustrative process 3000 for determining a 6DOF pose of an object according to some implementations. In some cases, image points may not be available on an object, such as a standard household object. In these cases, the image system may determine the 6DOF pose by processing the image of the object itself.

At 3002, the image system may receive an image. In this case, the image may include data representative of an object and the image may be void of an image point.

At 3004, the image system may segment the image into patches and, at 3006, the image system may identify each patch inducing image data associated with an object. For example, the image may be processed in patches to reduce the overall amount of image processing preformed, as the intensive processes may be applied only to patches having image data containing the object.

At 3008, the image system may determine orientation of the object by applying a classifier/regressor to the identified patches. For example, the image system may apply a random forest or convolutional neural net operations, or a multi-class SVM on the identified patches to determine the orientation of the object.

At 3010, the image system may determine a translation of the object based at least in part on the orientation and a prior 6DOF pose. For example, the image system may infer the translation of the object from the detected position constrained along corresponding pixel rays in image space.

At 3012, the image system may determine a scale associated with the image. For example, using the model of the object and the image of the object, the image system may determine a scale of the image compared with the model. In one specific example, the image system may compare an edge length of the model with one or more visible edges of the object within the image to determine the scale.

At 3014, the image system may determine a depth of the object based at least in part on the scale. For example, the image system may apply the scale and the camera parameters to a determine a distance (or depth) between the image device and the object.

At 3016, the image system may estimate the 6DOF pose of the object based at least in part on the depth and the translation. For example, the image system may determine the remaining two degrees of freedom (e.g., the X and Y coordinates) by applying a translation from the previous 6DOF pose to the current 6DOF pose given the previous 6DOF pose and the estimated values of other four degrees of freedom (e.g., the rotation and the depth).

At 3018, the image system may output the 6DOF pose. As discussed above, the 6DOF pose may then be used to select articles or items within the virtual scene, to manipulate articles within the virtual scene, or otherwise traverse the virtual scene.

Figure 31:
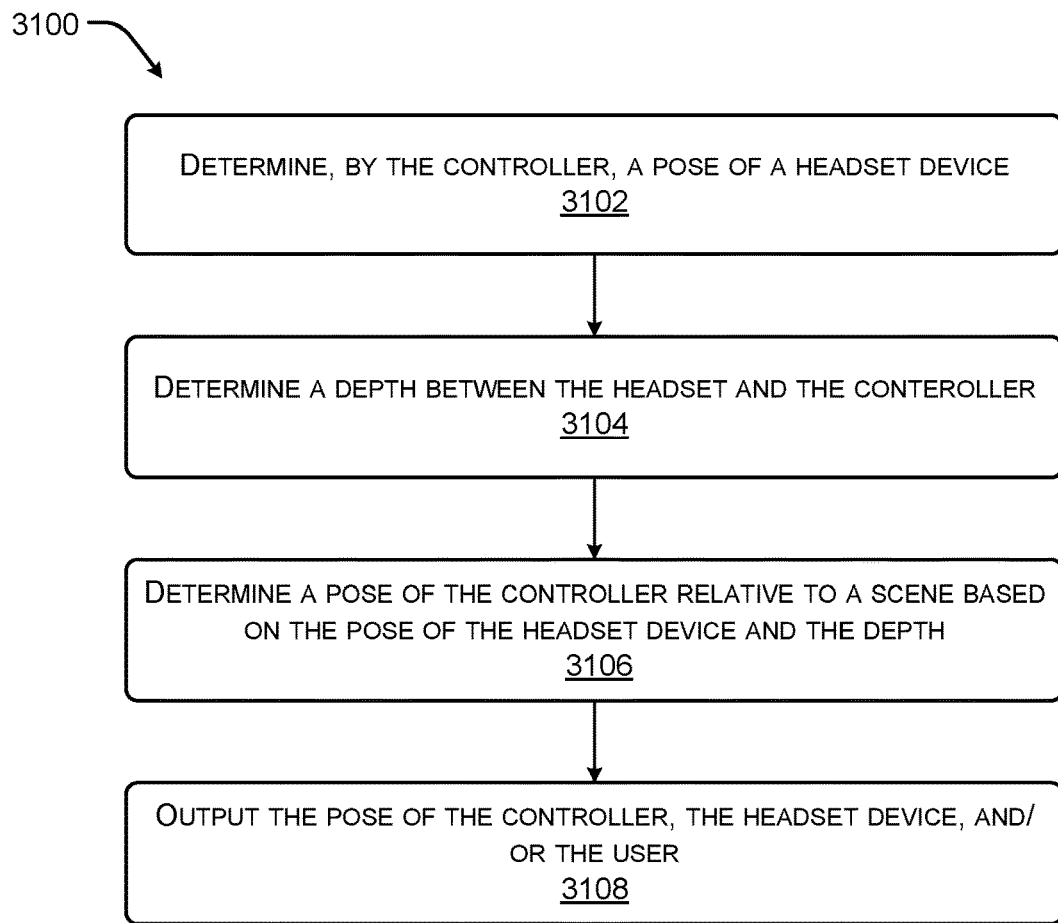
FIG. 31 is an example flow diagram showing an illustrative process for determining a pose of an object equipped with an image device according to some implementations.

FIG. 31 is an example flow diagram showing an illustrative process 3100 for determining a 6DOF pose of an object equipped with an image device according to some implementations. For instance, in some cases, the 6DOF pose tracking may be achieved by equipping the controller with an image device and the applying constellation points to the headset device. In this example, the headset device may be equipped with color constellation points or active constellation points, as the user is unable to see the headset device and, thus, is not distracted by the active component of the constellation points.

At 3104, the controller may determine a 6DOF pose of the headset device. For example, the controller may determine the 6DOF pose of the headset as discussed above. Alternatively, sine active components or color may be used, the controller may determine the 6DOF pose of the headset device using a classifier/regressor to determine the identity of one or more image point, generating candidate 6DOF poses based on the identity of the image points and the model, and then projecting the candidate 6DOF poses into the image space to determine inliers. In some cases, the controller may also determine the 6DOF pose of the user, a hand of the user, a leg of the user, the head of the user, etc. that may be used as an input to the image system.

At 3106, the controller may determine a depth between the headset and the controller. For example, the controller may determine the depth by using weak perspective or by using a ratio of the headset model to the image data. For example, the depth may be identified using a scaler determined by comparing edge length within the model to the edge length within the image.

At 3108, the controller may determine the 6DOF pose of the controller relative to the scene based on the 6DOF pose of the headset device and the depth. For example, the controller may maintain a map of the scene, for instance, by performing a SLAM technique and utilize the map of the scene to locate the 6DOF pose of the controller.

At 3110, the controller may output the 6DOF pose of the controller, the headset device, and/or the user. For instance, the 6DOF pose of the controller, the 6DOF pose of the headset device, and/or the 6DOF pose of the user may then be used to select articles or items within the virtual scene, to manipulate articles within the virtual scene, or otherwise traverse the virtual scene.

Figure 32:
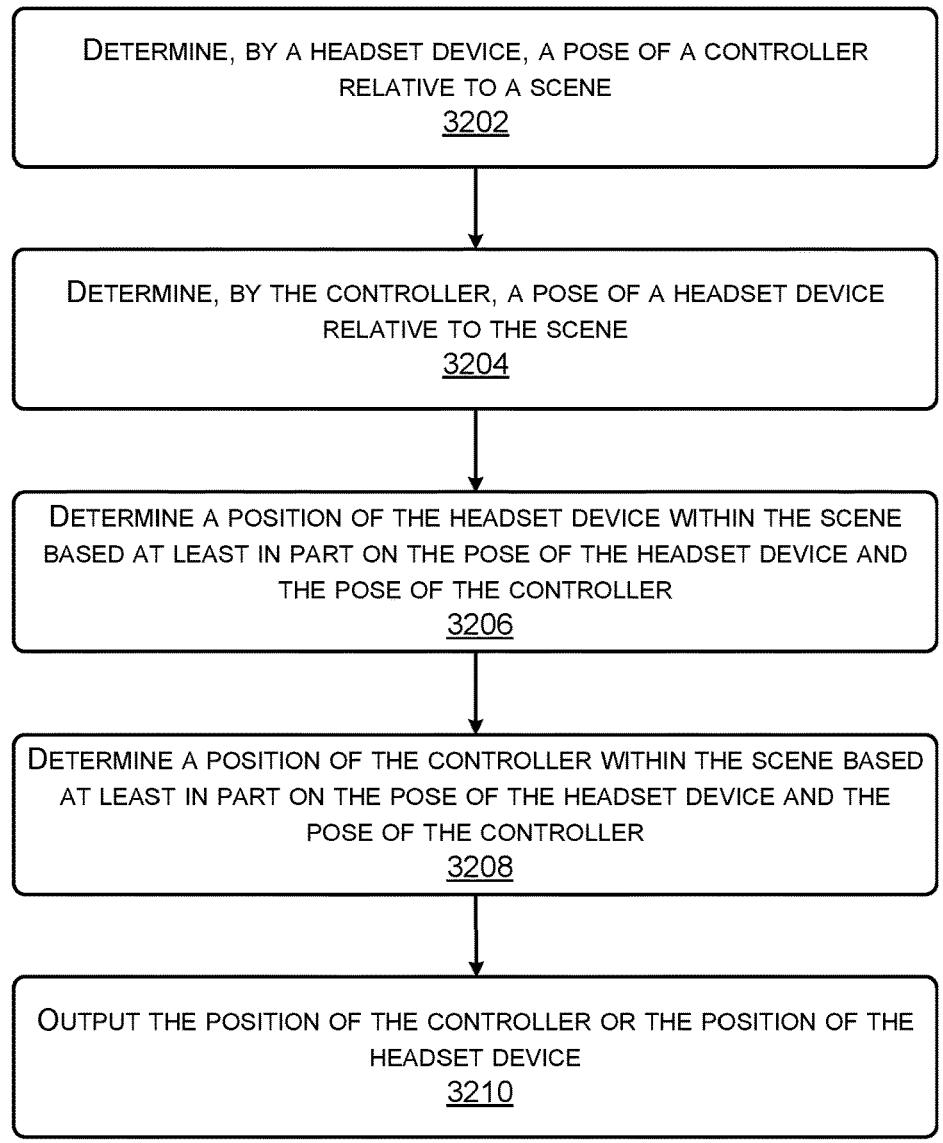
FIG. 32 is another example flow diagram showing an illustrative process for determining a pose of an object equipped with an image device according to some implementations.

FIG. 32 is another example flow diagram showing an illustrative process 3200 for determining a 6DOF pose of an object equipped with an image device according to some implementations. In some cases, both the headset device and the controller device may be equipped with image devices or components and configured to track the 6DOF pose of the other. In some cases, the headset device and the controller may maintain a shared map or scene of the physical environment.

At 3202, the headset device may determine a 6DOF pose of the controller relative to the scene. For example, the headset device may determine the 6DOF pose of the controller as discussed above.

At 3204, the controller may determine a 6DOF pose of the headset device relative to the scene. For example, the controller may determine the 6DOF pose of the headset as discussed above with respect to FIGS. 7-13. Alternatively, sine active components or color may be used, the controller may determine the 6DOF pose of the headset device using a classifier/regressor to determine the identity of one or more image point, generating candidate 6DOF poses based on the identity of the image points and the model, and then projecting the candidate 6DOF poses into the image space to determine inliers. In some cases, the controller may also determine the 6DOF pose of the user, a hand of the user, a leg of the user, the head of the user, etc. that may be used as an input to the image system.

At 3206, the image system (e.g., the headset device, the controller, or another device associated with the virtual system) may determine a position of the headset device within the scene based at least in part on the 6DOF pose of the headset device and the 6DOF pose of the controller. For example, the headset device and the controller may share a scene map or may substantially stimulatingly updated a shared scene, for instance, by implementing a SLAM technique. Thus, with known 6DOF pose of the headset device, 6DOF pose of the controller, and shared physical space via the shared scene the position of the headset device may be determined.

At 3208, the image system may determine a position of the controller within the scene based at least in part on the 6DOF pose of the headset device and the 6DOF pose of the controller. As discussed above, the headset device and the controller may share a scene map or may substantially stimulatingly updated a shared scene, for instance, by implementing a SLAM technique. Thus, with known 6DOF pose of the headset device, 6DOF pose of the controller, and shared physical space via the shared scene the position of the controller may be determined.

At 3210, the image system may output the position of the controller and/or the position of the headset device for use in locating the user within the environment or in receiving user input to the virtual scene, such as via a natural user input system.

In the current example, the headset device and/or controller may each determine a 6DOF pose of each other relative to themselves, a 6DOF pose of both themselves and each other relative to the physical environment depending on the field of view. In some implementations, some of the 6DOF pose data may be discarded. However, in other implementations, the additional 6DOF pose data may be used to further refine the shared scene map and/or the 6DOF pose of the headset device, the controller or both relative to the shared scene map.

Figure 33:
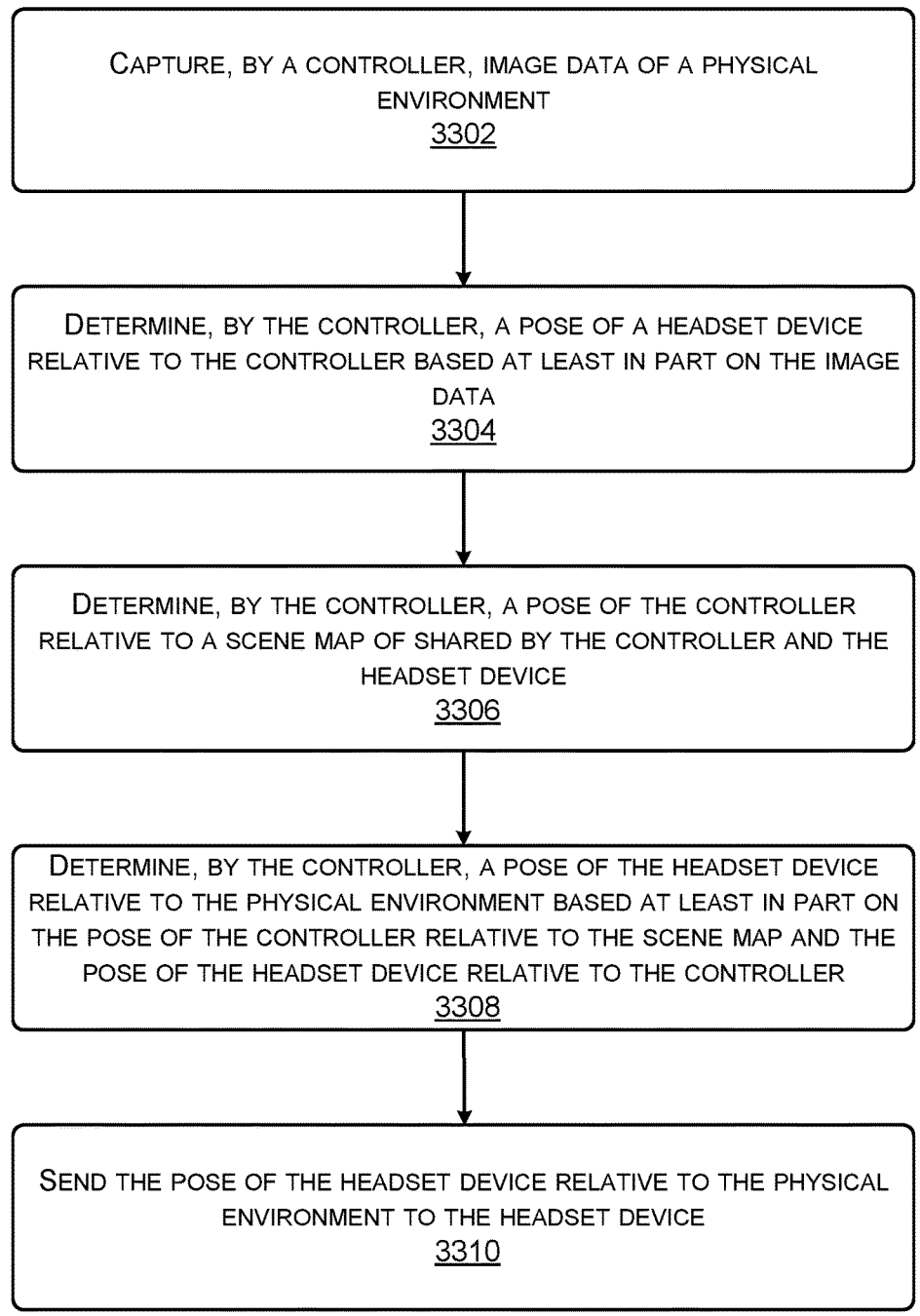
FIG. 33 is an example flow diagram showing an illustrative process for tracking an object via a scene map shared between a controller and a headset device according to some implementations.

FIG. 33 is an example flow diagram showing an illustrative process 3300 for tracking an object via a scene map shared between a controller and a headset device according to some implementations. For example, an image system may track the 6DOF pose of a controller, a headset device, a user, or a user's body part using cameras positioned both at the controller (e.g., in the hands of the user) and on the headset device to provide for a more robust user experience. For example, by including cameras on the controller, the position of the user's hands, head, legs, and torso may be tracked as each may be in view of the controller but not the headset device. The 6DOF pose of the user or the user's body parts may then be used to infer additional user inputs. Additionally, by having a shared scene map that is updated by both the controller and the headset device, the accuracy of the shared map is more complete and the 6DOF poses of the user, headset device, and controller relative to the environment may be more easily determined. For example, when a user is close to a wall, the image data captured by the headset device may be insufficient to determine the user's location without additional input data or utilizing a best guess based on a previous 6DOF pose. However, in the same situation the image data captured by the controller, for instance, in a position to view the room behind the user, may be more useful in determining the location. Additionally, in situations when the controller is no longer in view of the camera on the headset device, the 6DOF pose of the controller may still be determined and tracked, as discussed below.

At 3302, the controller may capture image data of a physical environment. For example, the controller may be equipped with one or more image device or cameras. In one specific example, the cameras may be arranged such that the controller may capture image data in a 360° view of the physical environment. In some cases, the image data captured may include image data of the user and/or the headset device the user is currently engaged with.

At 3304, the controller may determine a 6DOF pose of the headset device relative to the controller based at least in part on the image data. For example, the controller may apply one of the techniques discussed above to determine the 6DOF pose based on the constellation points visible as image points in the image data.

At 3306, the controller may determine a 6DOF pose of the controller relative of a scene map shared by the controller and the headset device. For example, the controller may utilize a known prior 6DOF pose of the controller, image data of the environment, and/or orientation data (such as collected by an IMU on the controller) to determine the 6DOF pose of the controller relative to the shared scene map. In one particular example, the controller may determine the 6DOF pose of the controller based on the image data and one or more tags in the physical environment detected within the image data of the physical environment.

At 3308, the controller may determine a 6DOF pose of the headset device relative to the physical environment or the shared scene map based at least in part on the pose of the controller relative to the shared scene map and the pose of the headset device relative to the controller. For instance, since the controller is aware of its 6DOF pose within the environment and the 6DOF pose of the headset device relative to the controller, the controller may extrapolate the 6DOF pose of the headset device relative the shared scene map.

At 3310, the controller may send the 6DOF pose of the headset device relative to the physical environment (or the shared scene map) to the headset device for use in tracking or as a user input. For instance, the headset device may utilize the 6DOF pose of the headset device to determine what image data to display to the user.

Figure 34:
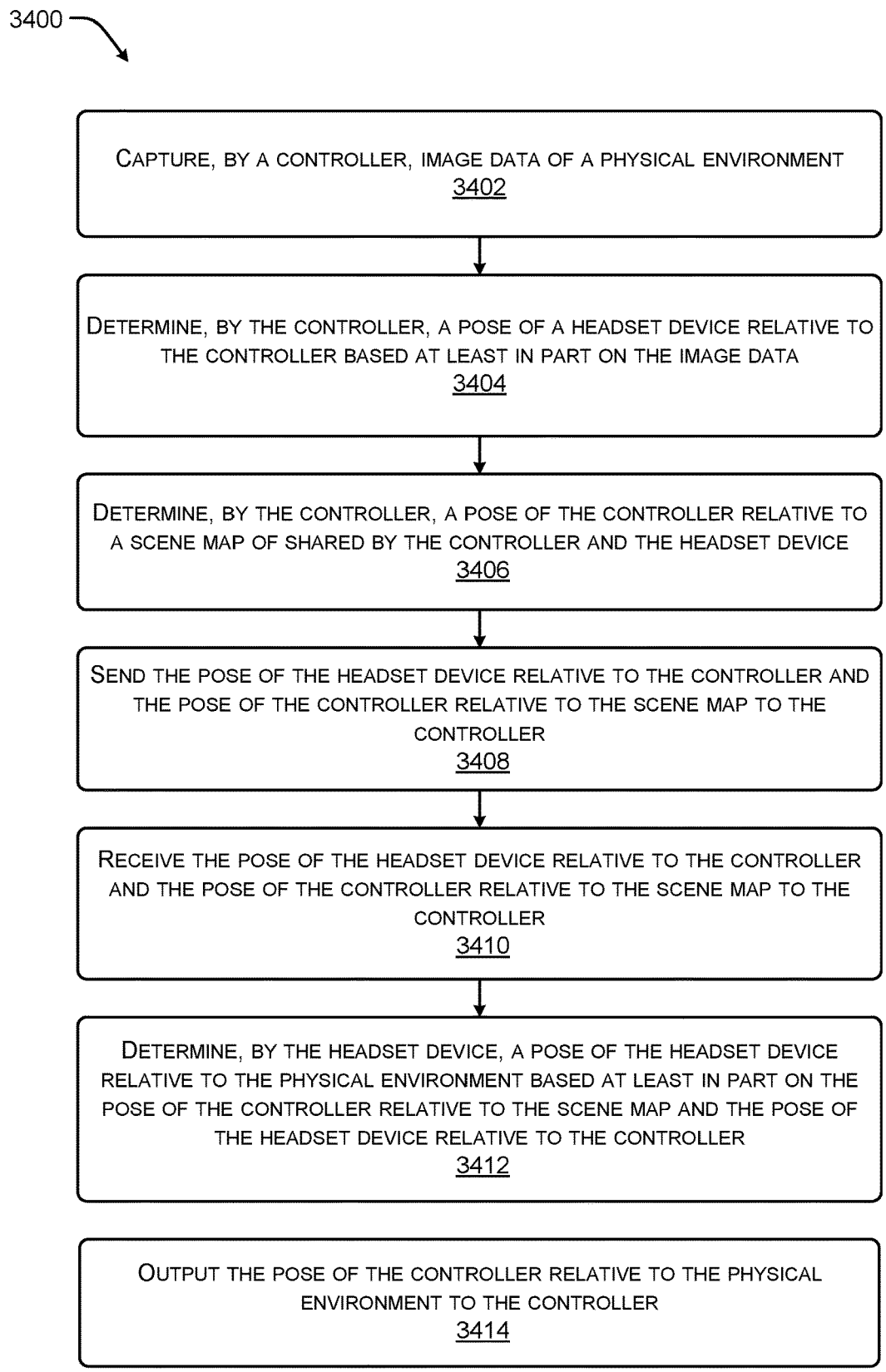
FIG. 34 is another example flow diagram showing an illustrative process for tracking an object via a scene map shared between a controller and a headset device according to some implementations.

FIG. 34 is another example flow diagram showing an illustrative process 3400 for tracking an object via a scene map shared between a controller and a headset device according to some implementations. For example, an image system may track the 6DOF pose of a controller, a headset device, a user, or a user's body part using cameras positioned both at the controller (e.g., in the hands of the user) and on the headset device to provide for a more robust user experience. For example, by including cameras on the controller, the position of the user's hands, head, legs, and torso may be tracked as each may be in view of the controller but not the headset device. The 6DOF pose of the user or the user's body parts may then be used to infer additional user inputs. Additionally, by having a shared scene map that is updated by image data and 6DOF pose data collected by both the controller and the headset device, the accuracy of the shared map is more complete. In the current example, the image data may be collected by the controller and the 6DOF poses sent to the headset device for further processing. In this manner, the process 3400 may reduce latency and improve throughput of the image processing system.

At 3402, the controller may capture image data of a physical environment. For example, the controller may be equipped with one or more image device or cameras. In one specific example, the cameras may be arranged such that the controller may capture image data in a 360° view of the physical environment. In some cases, the image data captured may include image data of the user and/or the headset device the user is currently engaged with.

At 3404, the controller may determine a 6DOF pose of the headset device relative to the controller based at least in part on the image data. For example, the controller may apply one of the techniques discussed above to determine the 6DOF pose based on the constellation points visible as image points in the image data.

At 3406, the controller may determine a 6DOF pose of the controller relative of a scene map shared by the controller and the headset device. For example, the controller may utilize a known prior 6DOF pose of the controller, image data of the environment, and/or orientation data (such as collected by an IMU on the controller) to determine the 6DOF pose of the controller relative to the shared scene map. In one particular example, the controller may determine the 6DOF pose of the controller based on the image data and one or more tags detected within the image data of the physical environment.

At 3408, the controller may send the 6DOF pose of the headset device relative to the controller and the 6DOF pose of the controller relative to the shared scene map to the headset device. Likewise, at 1710, the headset device receives the headset device relative to the controller and the 6DOF pose of the controller relative to the shared scene map to the headset device.

At 3412, the headset device may determine a 6DOF pose of the headset device relative to the physical environment or the shared scene map based at least in part on the pose of the controller relative to the shared scene map and the pose of the headset device relative to the controller. For instance, the headset device may be equipped with components that allow a faster processing than the components of the controller. At 3414, the headset device may output the pose of the headset device relative to the physical environment. For example, the pose of the headset device relative to the physical environment may be used to adjust a perspective of the virtual environment displayed to the user.

Figure 35:
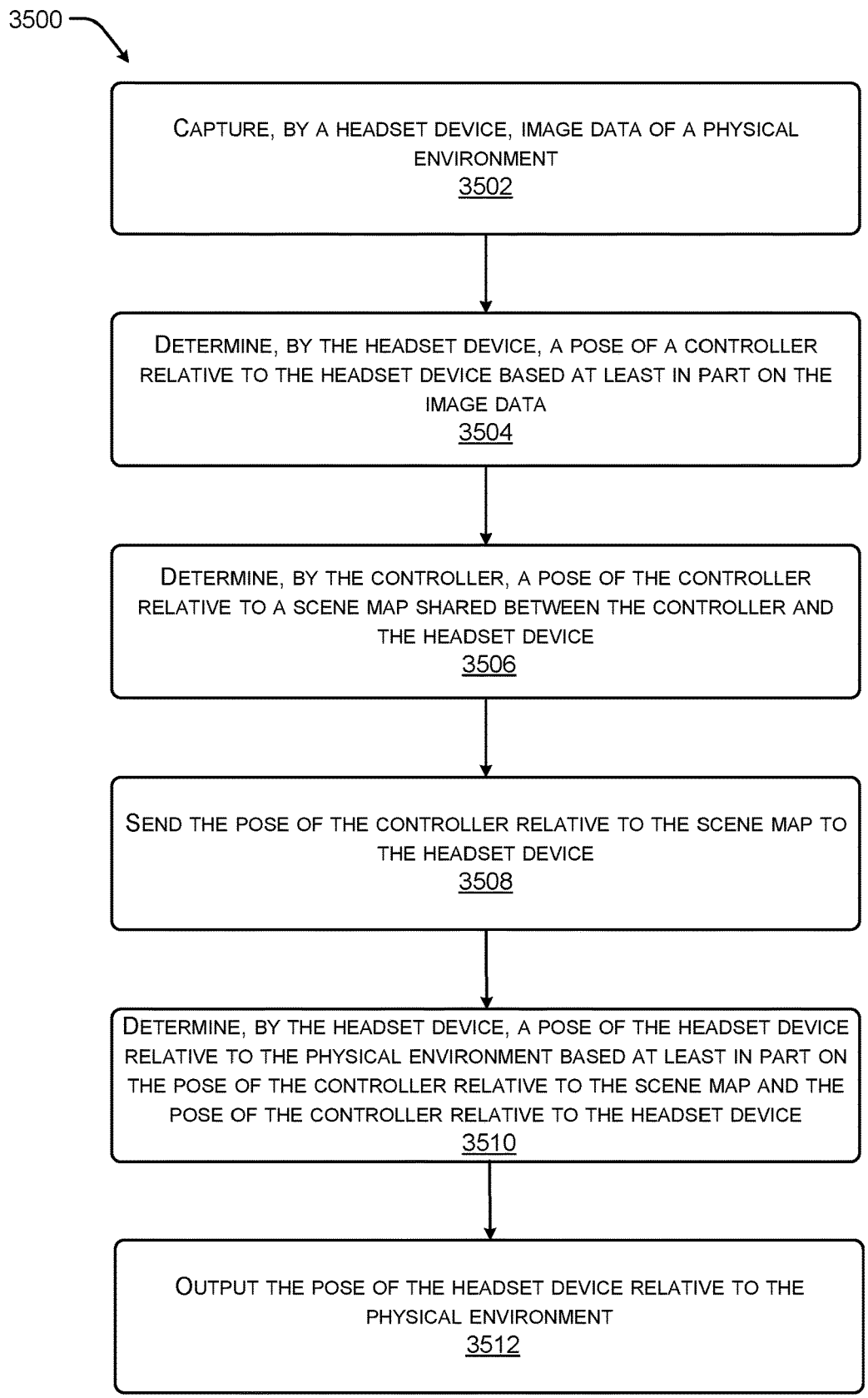
FIG. 35 is another example flow diagram showing an illustrative process for tracking an object via a scene map shared between a controller and a headset device according to some implementations.

FIG. 35 is another example flow diagram showing an illustrative process for tracking an object via a scene map shared between a controller and a headset device according to some implementations. As discussed above, an image system may track the 6DOF pose of a controller, a headset device, a user, or a user's body part using cameras positioned both at the controller (e.g., in the hands of the user) and on the headset device to provide for a more robust user experience. For example, in situations in which the headset device is unable to determine its 6DOF pose relative to the environment, the controller may assist with generating a shared scene map and to locate the 6DOF pose of the headset device relative to the environment. For instance, in the current example, the controller may be in the field of vision of the headset device but not the physical environment. However, in this instance, the physical environment in the view of the controller.

At 3502, the headset device may capture image data of a physical environment. In some cases, the image data may include data representative of at least a portion of the controller.

At 3504, the headset device may determine a 6DOF pose of the controller relative to the headset device based at least in part on the image data. For example, the headset device may perform operations discussed above to identify the 6DOF pose of the controller.

At 3506, the controller may determine a 6DOF pose of the controller relative to a scene map shared between the controller and the headset device. For example, in some instances, the headset device may lose track of the 6DOF pose of the headset device. In these instances, the headset device may utilize the 6DOF pose of the controller relative to the shared scene map to relocated.

At 3508, the controller may send the 6DOF pose of the controller relative to the shared scene to the headset device and, at 1810, the headset device may determine a 6DOF pose of the headset device relative to the physical environment based at least in part on the pose of the controller relative to the scene map and the pose of the controller relative to the headset device. For instance, since the headset is aware of the 6DOF pose of the controller relative to the shared scene map and the 6DOF pose of the controller relative to the headset device, the headset device may extrapolate the 6DOF pose of the headset device relative the shared scene map or the physical environment.

As such, unlike conventual systems, since the image system discussed herein utilizes a controller that may preform object and self-tracking relative to the shared scene map, the controller may maintain tracking when the tracking is lost by the headset device and the headset device may maintain tracking when the tracking is lost by the controller. Thus, unlike the conventional system, the system discussed herein may continue to operate in conditions at which conventional systems may fail or require re-initialization or re-location within the scene. Further, since relocation is a resource intensive operation, the system discussed herein improves the state of the virtual and mixed reality systems.

At 3512, the headset device may output the pose of the headset device relative to the physical environment. For example, the pose of the headset device relative to the physical environment may be used to adjust a perspective of the virtual environment displayed to the user.

Figure 36:
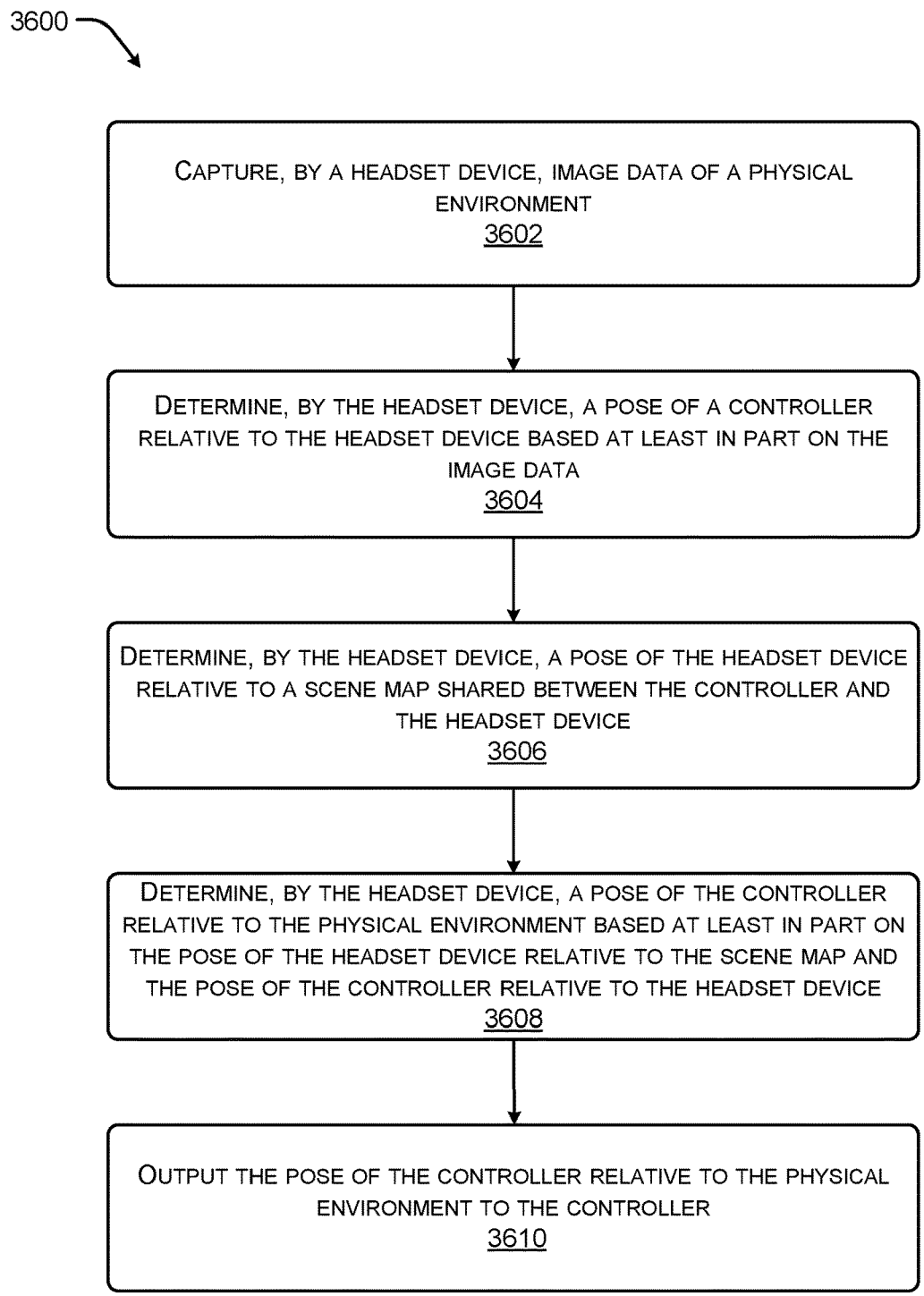
FIG. 36 is another example flow diagram showing an illustrative process for tracking an object via a scene map shared between a controller and a headset device according to some implementations.

FIG. 36 is another example flow diagram showing an illustrative process 3600 for tracking an object via a scene map shared between a controller and a headset device according to some implementations. As discussed above, an image system may track the 6DOF pose of a controller, a headset device, a user, or a user's body part using cameras positioned both at the controller (e.g., in the hands of the user) and on the headset device to provide for a more robust user experience. For example, in situations in which the controller is unable to determine its 6DOF pose relative to the environment, the headset device may assist with generating a shared scene map and to locate the 6DOF pose of the controller relative to the environment.

At 3602, the headset device may capture image data of a physical environment. In some cases, the image data may include data representative of at least a portion of the controller.

At 3604, the headset device may determine a 6DOF pose of the controller relative to the headset device based at least in part on the image data. For example, the headset device may perform operations discussed above to identify the 6DOF pose of the controller.

At 3606, the headset device may determine a 6DOF pose of the headset device relative to a scene map shared between the controller and the headset device. For example, in some instances, the controller may lose track of the 6DOF pose of the controller. In these instances, the headset device may utilize the 6DOF pose of the headset device relative to the shared scene map and the 6DOF pose of the controller relative to the headset device to relocated the controller.

At 3608, the headset device may determine a 6DOF pose of the controller relative to the physical environment based at least in part on the 6DOF pose of the headset device relative to the scene map and the pose of the controller relative to the headset device. For instance, since the headset is aware of the 6DOF pose of itself relative to the shared scene map and the 6DOF pose of the controller relative to the headset device, the headset device may extrapolate the 6DOF pose of the controller relative the shared scene map or the physical environment.

At 3610, the headset device may output the pose of the controller relative to the physical environment to the controller. The controller may then utilize the receive 6DOF pose to localize and update tracking. Thus, unlike the conventional system, the system discussed herein may continue to operate in conditions at which conventional systems may fail or require re-initialization or re-location within the scene. Further, since relocation is a resource intensive operation, the system discussed herein improves the state of the virtual and mixed reality systems.

In FIGS. 24-36 various steps are discussed as performed by the headset device and/or the controller. It should be understood that the processes 2400-3600 of FIGS. 24-36 are examples and that various steps such as determining 6DOF poses may be performed by either of the controller, the headset device, or a central system (not shown) regardless of which devices collects the data. For example, the orientation data and image data collected by the controller may be sent to the headset device, which may then determine the 6DOF pose of the controller relative to the shared scene map, the 6DOF pose of the headset device relative to controller. In some specific examples, the orientation data and/or image data collected by the controller may also be streamed or substantially continuously sent to the headset device and the headset device may be configured to the determine the 6DOF poses, as discussed above with respect to FIGS. 24-36.

In some cases, the image system of FIGS. 24-36 may also be configured to transition between the process 2400 and 3600 based on one or more characteristics of the physical environment, pose of the user, pose of the controller, pose of the headset device. Further, it should be understood that in some implementations, the image system may utilize two or more of the processes 2400-3600 to determine a 6DOF pose. For example, the system may combine the 6DOF pose of the headset device relative to the shared scene map determined by process 2400 and 3600 to more accurately locate the user within the virtual environment.

Figure 37:
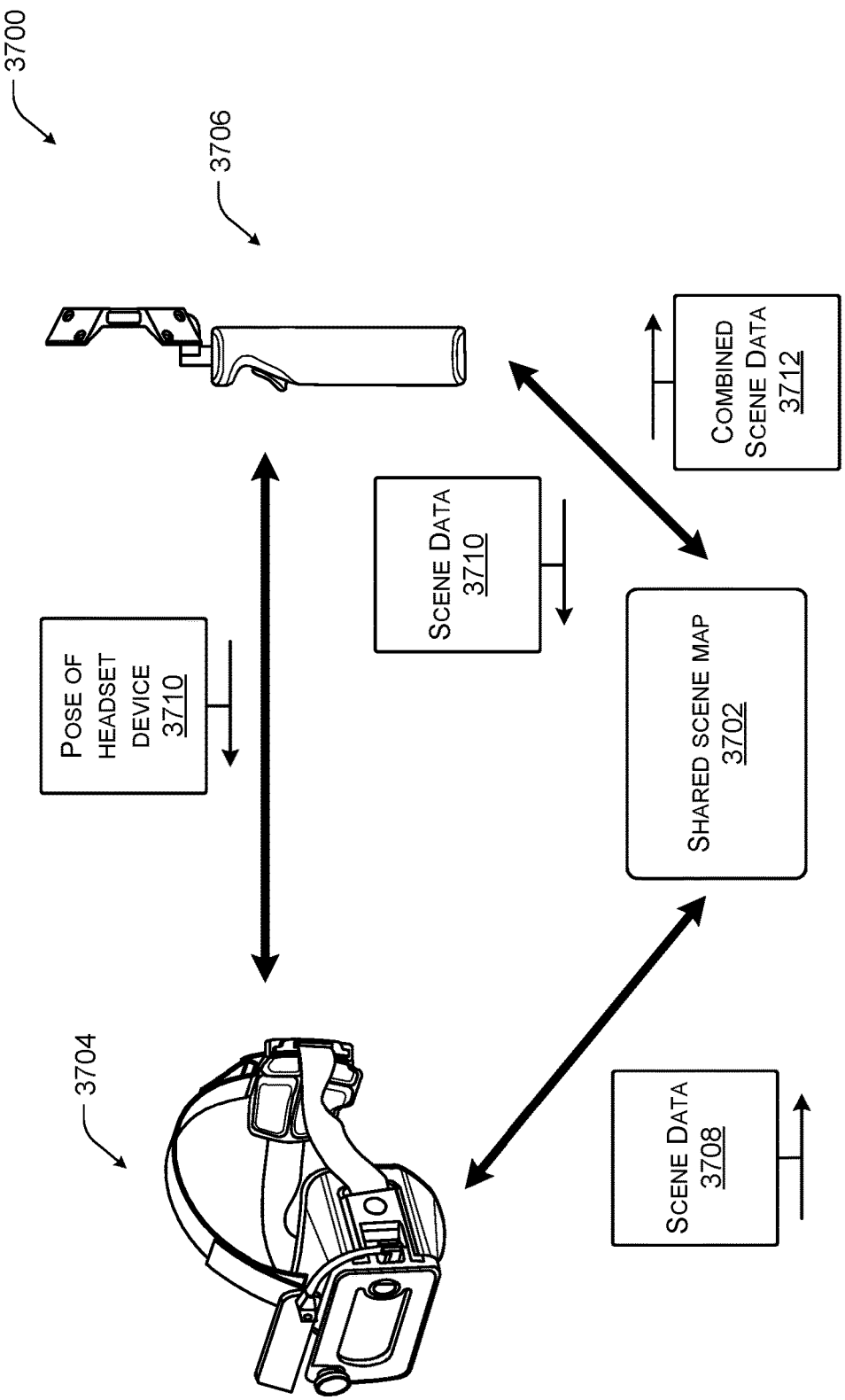
FIG. 37 is an example block diagram of an image system utilizing a shared scene map according to some implementations.

FIG. 37 is an example block diagram of an image system 3700 utilizing a shared scene map 3702 according to some implementations. In this example, the headset device 23704 and the controller 3706 are each equipped with an image device, processor, and computer-readable medium for tracking the 6DOF pose of the other with respect to the shared scene map 3702. It should be understood that the shared scene map 3702 may be stored on either of the headset device 3704 or the controller 3706 as well as on a third device, such as a base station.

In one example, the headset device 3704 may track and determine the 6DOF pose of the controller 3706 relative to the headset device 3704 and the controller 3706 may track and determine the 6DOF pose of the headset device 3704 relative to the controller 3706. Each of the headset device 37004 and the controller 3706 may also substantially simultaneously update the shared scene map 3702. For instance, the headset device 3704 may provide scene data 3708 and the controller 3706 may provide scene data 3710. Each of the controller 3706 and the headset device 3704 may also track their own 6DOF pose relative to the shared scene map 3702. It should be understood that by having each of the headset device 3704 and controller 3706 performing racking, such as a SLAM technique, the scene map that is generated is more robust and complete than with only the headset device performing the tracking. For instance, more image data is captured from more perspectives which allows for a more detailed scene map within a given period of time. With the availability of a more detailed scene map, localization or re-localization (such as is performed when initializing the system) may be completed with fewer processing resources and in less time, thereby resulting in an improved mixed reality or virtual reality system.

In the current example, the controller may capture image data of a physical environment include image data of the user and/or the headset device the user is currently engaged with. The controller may then determine a 6DOF pose of the headset device relative to the controller based at least in part on the image data. For example, the controller may apply one of the techniques discussed above to identify image points associated with a constellation on the headset device and determine the 6DOF pose based on the detected image points.

Once the 6DOF pose of the headset device is determined relative to the controller, the controller may determine a 6DOF pose of the controller relative of the shared scene map 3702 using the combined scene data 3712. For example, the controller may utilize a known prior 6DOF pose of the controller, image data of the environment, and/or orientation data (such as collected by an IMU on the controller) to determine the 6DOF pose of the controller relative to the shared scene map 3702.

In one particular example, the controller may determine the 6DOF pose of the controller based on the image data and one or more tags within the physical environment detected within the image data of the physical environment. For example, the controller may track the pose of each of the tracking enhancement tags of the physical environment using a SLAM technique or other position tracking technique when a tag is in view of the camera on the controller. The poses of the tags may then be used to, for instance, assist in determining the 6DOF pose of the controller relative to the shared scene map.

Next, the controller may determine a 6DOF pose of the headset device relative to the shared scene map 3702 based at least in part on the 6DOF pose of the controller relative to the shared scene map and the pose of the headset device relative to the controller. For instance, since the controller 3706 is aware of its 6DOF pose within the environment and the 6DOF pose of the headset device relative to the controller, the controller 3704 may extrapolate the 6DOF pose of the headset device relative the shared scene map.

In the current example, the controller 3704 may send the 6DOF pose of the headset device relative to the shared scene map 3702 to the headset device 3704 for use in tracking or as a user input. For instance, the headset device 3704 may utilize the 6DOF pose of the headset device 3704 to determine what image data to display to the user.

Figure 38:
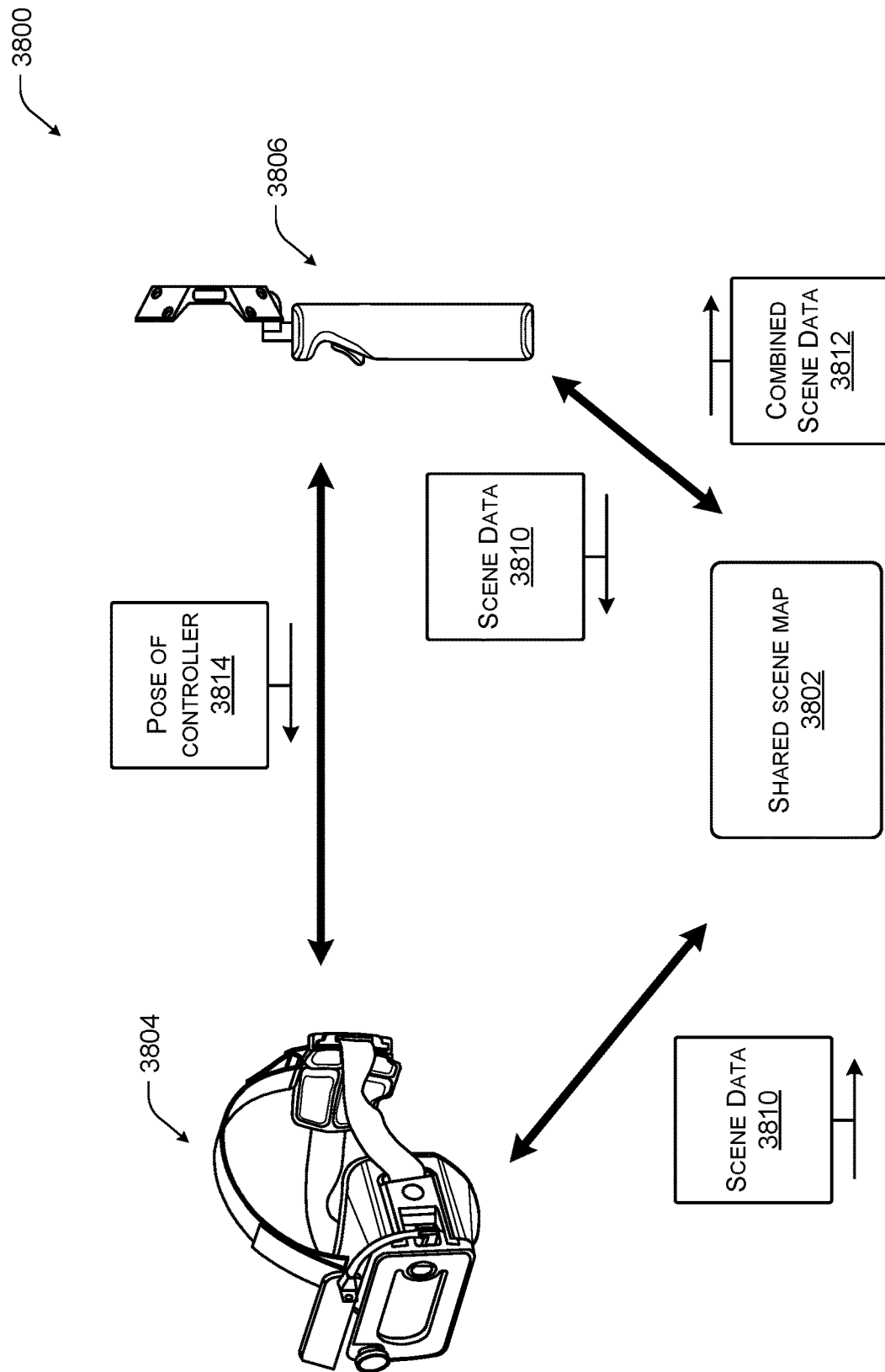
FIG. 38 is another example block diagram of an image system utilizing a shared scene map according to some implementations.

FIG. 38 is another example block diagram of an image system 3800 utilizing a shared scene map 3802 according to some implementations. In this example, the headset device 3804 and the controller 3806 are again each equipped with an image device, processor, and computer-readable medium for tracking the 6DOF pose of the other with respect to the shared scene map 3802.

Each of the headset device 3804 and the controller 3806 may also substantially simultaneously update the shared scene map 3802. For instance, the headset device 3804 may provide scene data 3808 and the controller 3806 may provide scene data 3810. Each of the controller 3806. It should be understood that by having each of the headset device 3804 and controller 3806 performing racking, such as a SLAM technique, the scene map that is generated is more robust and complete than with only the headset device performing the tracking. For instance, more image data is captured from more perspectives which allows for a more detailed scene map within a given period of time. With the availability of a more detailed scene map, localization or re-localization (such as is performed when initializing the system) may be completed with fewer processing resources and in less time, thereby resulting in an improved mixed reality or virtual reality system.

In the current example, the headset device may be unable to determine its 6DOF pose relative to the shared scene map 3802. For instance, the headset device 3804 may capture image data of a physical environment. In some cases, the image data may include data representative of at least a portion of the controller 3806. The headset device 3804 may determine a 6DOF pose of the controller relative to the headset device based at least in part on the image data, as discussed above. However, the headset device 3804 may be unable to determine the 6DOF pose of the headset device relative to the shared scene map 3802. In this situation, the controller 3806 may determine a 6DOF pose of the controller relative to the shared scene map 3814 based at least in part on the combined scene data 3812. The controller 3806 may send the 6DOF pose of the controller relative to the shared scene 3814 to the headset device 3804.

The headset device 3804 may then determine a 6DOF pose of the headset device relative to the shared scene map based at least in part on the 6DOF pose of the controller relative to the scene map 3814 and the pose of the controller relative to the headset device. For instance, since the headset is aware of the 6DOF pose of the controller relative to the shared scene map and the 6DOF pose of the controller relative to the headset device, the headset device may extrapolate the 6DOF pose of the headset device relative the shared scene map or the physical environment.

Figure 39:
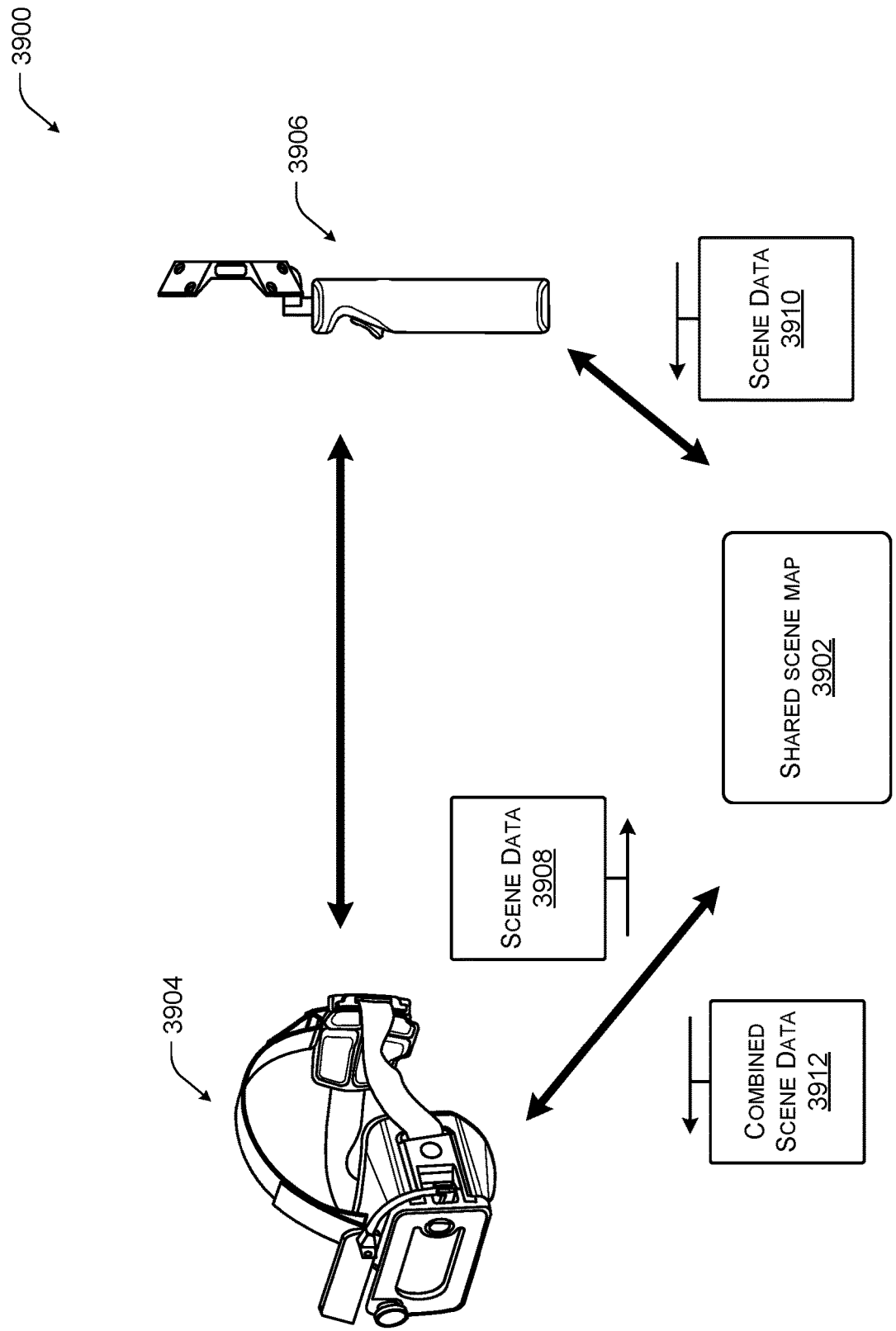
FIG. 39 is another example block diagram of an image system utilizing a shared scene map according to some implementations.

FIG. 39 is another example block diagram of an image system 3900 utilizing a shared scene map 3902 according to some implementations. In this example, the controller 3906 may be unable to determine its 6DOF pose relative to the shared scene map 3902. In this situation, since both the headset device 3904 and the controller 23906 perform tracking, the headset device 3904 may assist with determining the pose of the controller relative to the shared scene map.

Each of the headset device 3904 and the controller 3906 may also substantially simultaneously update the shared scene map 3902. For instance, the headset device 3904 may provide scene data 3908 and the controller 3906 may provide scene data 3910. Each of the controller 3906. It should be understood that by having each of the headset device 3904 and controller 3906 performing racking, such as a SLAM technique, the scene map that is generated is more robust and complete than with only the headset device performing the tracking. For instance, more image data is captured from more perspectives which allows for a more detailed scene map within a given period of time. With the availability of a more detailed scene map, localization or re-localization (such as is performed when initializing the system) may be completed with fewer processing resources and in less time, thereby resulting in an improved mixed reality or virtual reality system.

In one case, the headset device 3904 may capture image data of a physical environment. In some cases, the image data may include data representative of at least a portion of the controller 3906. The headset device 3904 may determine a 6DOF pose of the controller relative to the headset device based at least in part on the image data, as discussed above.

The headset device 3904 may also be able to determine a 6DOF pose of the headset device relative to the shared scene map share based in part on the combined scene data 3912. The headset device may then determine a 6DOF pose of the controller relative to the shared scene map 3902 based at least in part on the 6DOF pose of the headset device relative to the shared scene map and the 6DOF pose of the controller relative to the headset device. For instance, since the headset is aware of the 6DOF pose of itself relative to the shared scene map and the 6DOF pose of the controller relative to the headset device, the headset device may extrapolate the 6DOF pose of the controller relative the shared scene map. In the illustrated example, the headset device 3904 may provide or send the 6DOF pose of the controller relative to the shared scene map 3902 to the controller 3906. For instance, the controller 3906 may utilize the pose of the controller relative to the shared scene map 3902 to assist with self-tracking.

Figure 40:
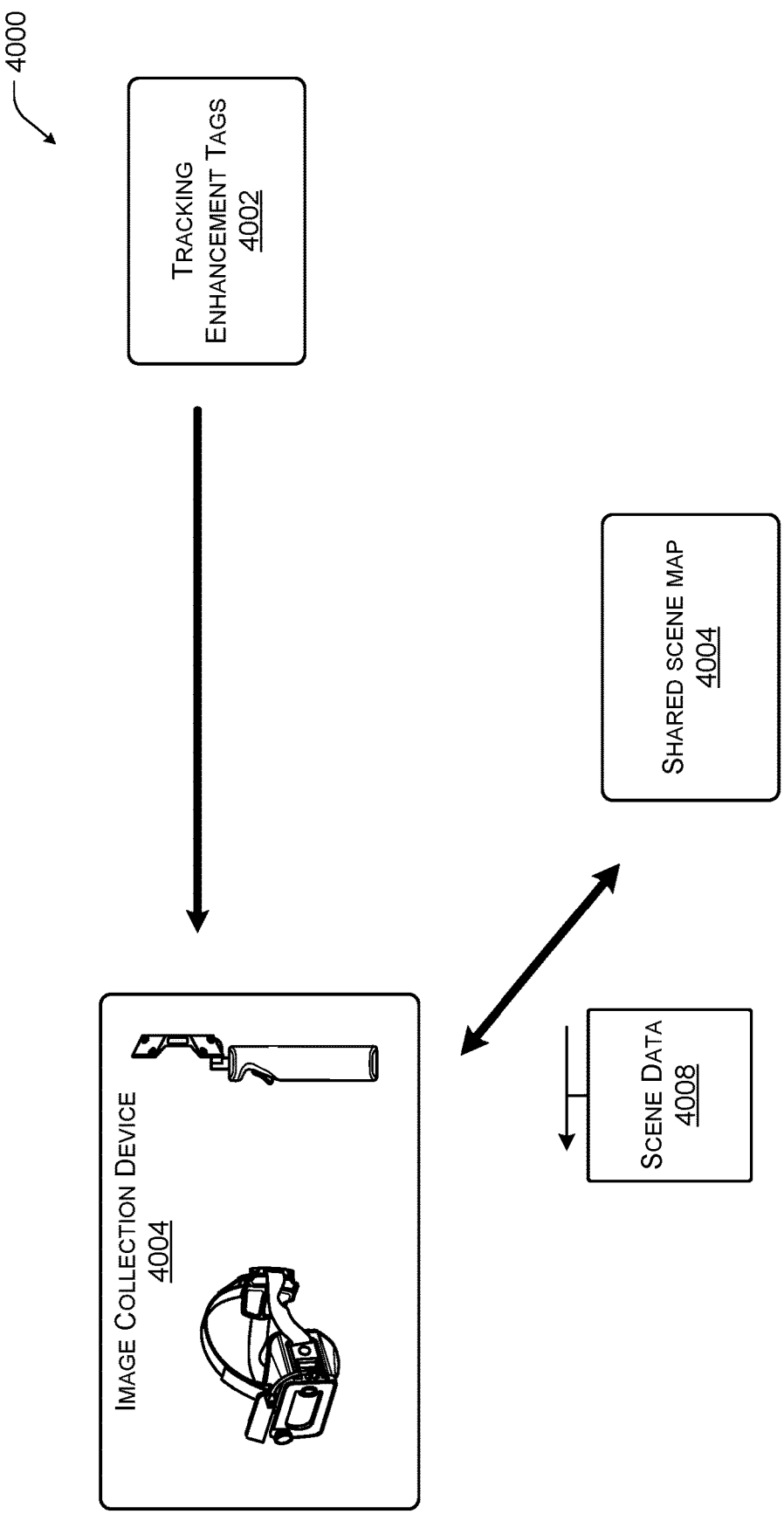
FIG. 40 is another example block diagram of an image system utilizing a tracking enhancement tags according to some implementations.

FIG. 40 is another example block diagram of an image system 4000 utilizing a tracking enhancement tags 4002 according to some implementations. For example, tracking enhancement tags or stickers 4002 may be placed or adhered to various surfaces and objects within a physical environment for assisting the image system 4000 in tracking a 6DOF pose of a headset device and/or the user within a virtual representation of the physical environment. In some cases, the tracking enhancement tags 4002 may have a shape or marking that allows an orientation of the tracking enhancement tags 4002 relative to the scene map to be determined. In some cases, the tracking enhancement tags 4002 may be infrared or clear in the visible spectrum such that an image collection device 4004 may detect them but otherwise the tags 4002 do not subtract from a visual appeal of a physical environment. The tags 4002 may also be retroreflective. For example, the image collection device 4004 may be configured with a light source that may cause the retroreflective tags 4002 to be detectable in the image data collected even in the dark. Thus, the image system 4000 may use the retroreflective tags 4002 to determine 6DOF poses or generate seed scene maps even in poor lighting conditions. As an alternative or addition to retroreflective materials, the tags 4002 may be equipped with a light emitting element, such as an LED.

In some examples, the tags 4002 may also be encoded or marked with a unique identifier that may be used to assists with tracking the tags 4002. In some cases, the unique identifier may be per physical environment, while in other cases the unique identifier may be globally unique and maintained via a remote cloud based server, such that a second image system entering the physical environment may utilize the tags 4002 as a seed scene map regardless of ever visiting the physical environment previously.

In the current example, an image collection device 4004, such as a headset device or controller, may capture image data including one or more of the tracking enhancement tags 4002. In this example, the image collection device 4004 may determine a 6DOF pose of the image collection device 4004 using a SLAM or CV technique.

The image data collected may also include data associated with the tracking enhancement tags 4002 as discussed above. The image collection device 4004 may then determine a position or 6DOF pose using a SLAM technique, CV technique, or object tracking technique. For example, the image collection device 4004 may utilize its own 6DOF pose to assist in determining the 6DOF pose of the enhancement tag 4002 relative to a shared scene map 4004.

Once the 6DOF pose of each tracking enhancement tag 4002 is known relative to the scene map 4004, the image collection device 4004 may track its own 6DOF pose based at least in part on the 6DOF pose of the tracking enhancement tags 4002 within the image data being collected. For example, the image collection device 4004 may compose the 6DOF pose of the image collection device 4004 relative to a visible tag 4002 with the 6DOF pose of the visible tag 4002 relative to the scene map.

In some cases, the tracking enhancement tags 4002 may also be equipped with one or more frequency encodings. For example, a high frequency encoding may be used to encode the identity of the tag, while a low frequency encoding may be used to provide orientation and/or location information.

Figure 41:
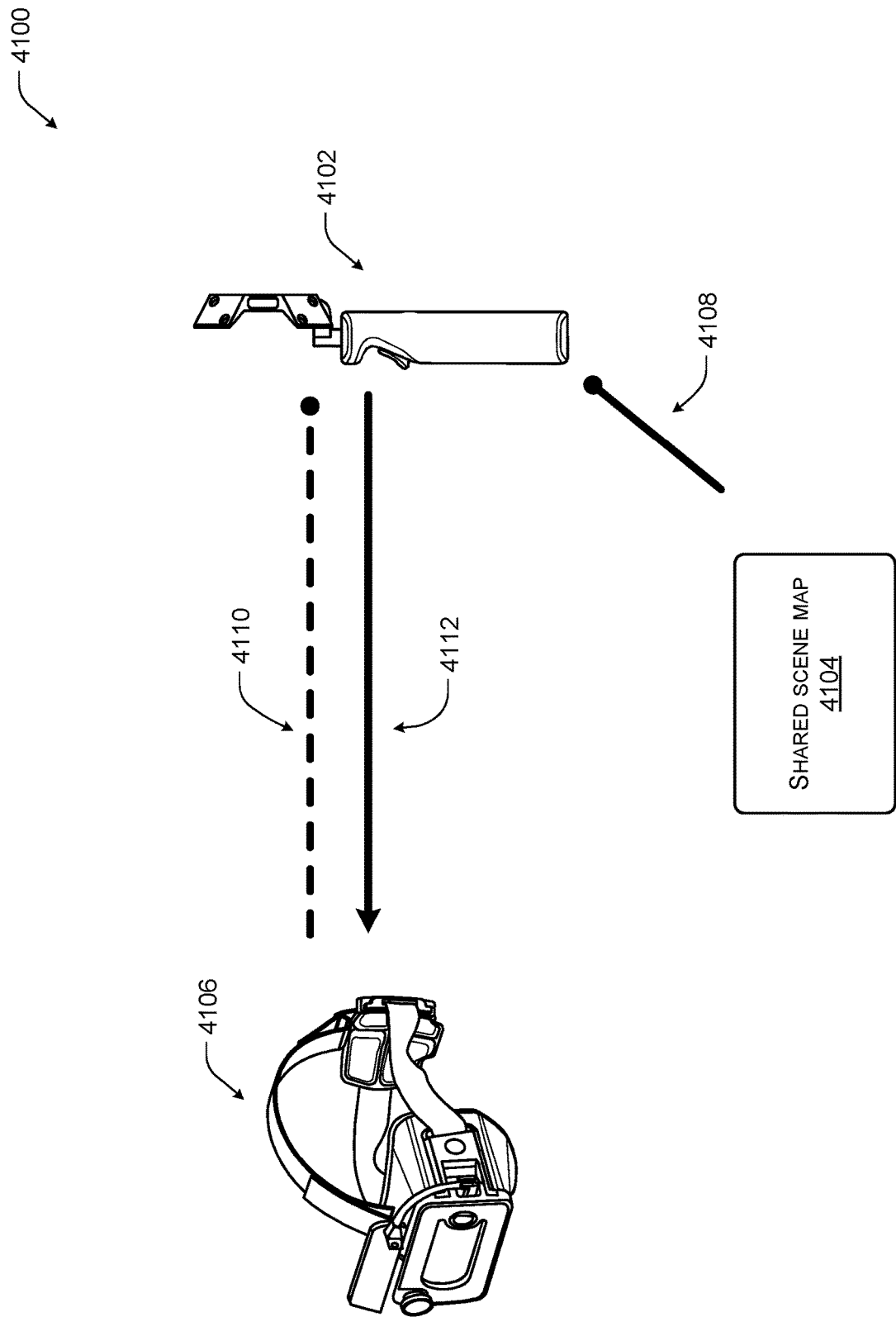
FIG. 41 is an example diagram of various tracking techniques of an image system having a controller equipped with an image device according to some implementations.

FIG. 41 is an example diagram of various tracking techniques of an image system 4100 having a controller 4102 equipped with an image device according to some implementations. In the current example, the controller 4102 is configured to have access to a shared scene map 4104 to compute the 6DOF pose of the controller 4102 relative to the shared scene map 4104, generally indicated by line 4108. In this example, the shared scene map 4104 is accessible and editable by both the controller 4102 and a headset device 4106 (e.g., a display device).

In the current example, the headset device 4106 is visible to the image device associated with the controller 4102. Using the captured image data captured by the image device on the controller 4102, the controller 4102 is able to determine a position of the headset device 4106 relative to the controller 4102, generally indicated by lien 4110. Using the position of the headset device 4106 relative to the controller 4102 and the 6DOF pose of the controller 4102 relative to the shared scene map 4104, the controller 4102 may determine a 6DOF pose of the headset device 4106 relative to the shared scene map 4104.

The controller 4102 may then send the 6DOF pose of the headset device 4106 relative to the shared scene map 4104 to the headset device 4106, generally indicated by line 4112. In an alternative example, the controller 4102 may send the position of the headset device 4106 relative to the controller 4102 and the 6DOF pose of the controller 4102 relative to the shared scene map 4104 to the headset device 4106. In this alternative, the headset device 4106 may determine the 6DOF pose of the headset device 4106 relative to the shared scene map 4104.

Figure 42:
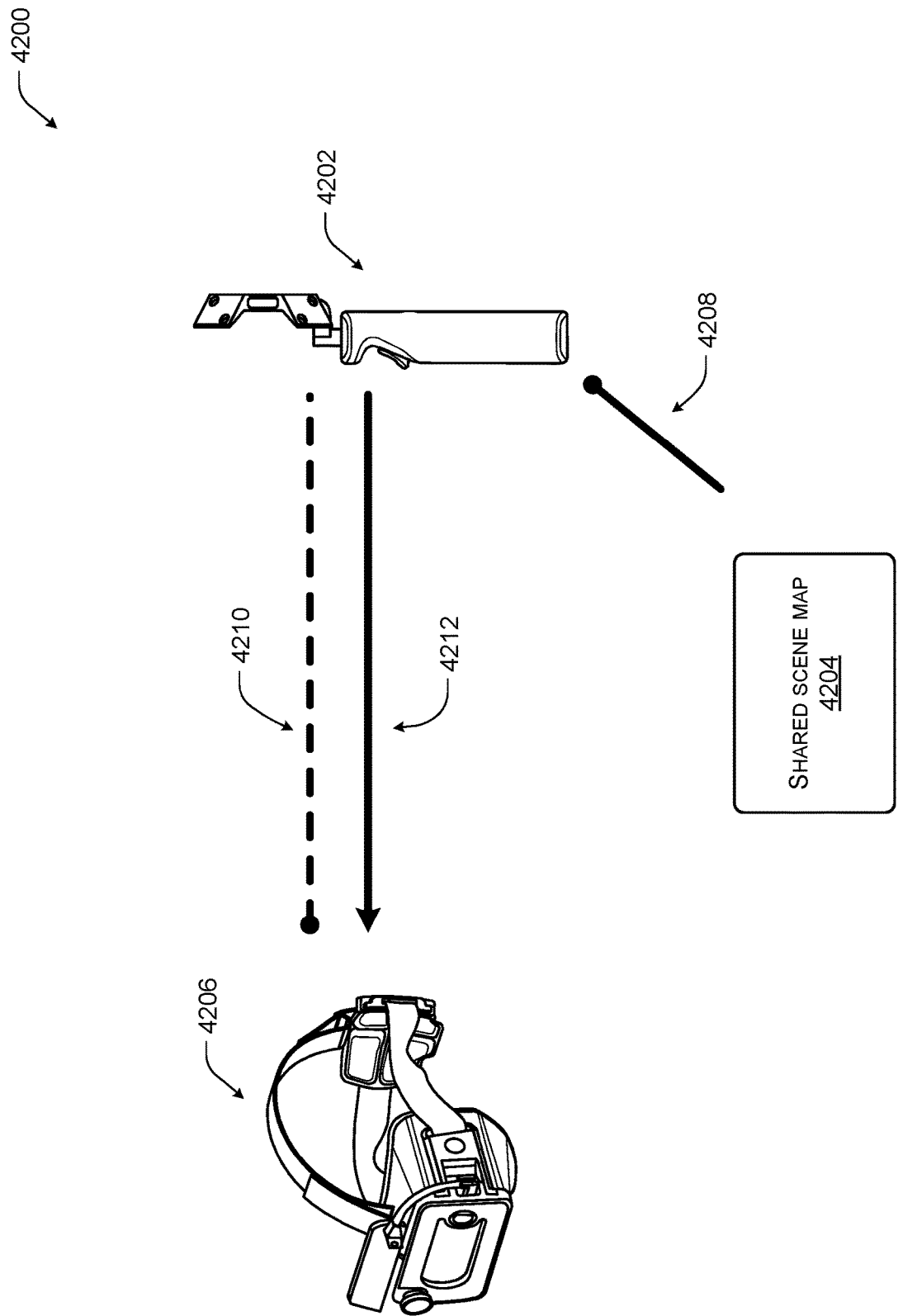
FIG. 42 is an example diagram of various tracking techniques of an image system that utilizes tracking enhancement tags according to some implementations.

FIG. 42 is an example diagram of various tracking techniques of an image system 41200 having a controller 4202 equipped with an image device according to some implementations. In the current example, the controller 4202 is configured to have access to a shared scene map 4204 to compute the 6DOF pose of the controller 4202 relative to the shared scene map 4204, generally indicated by line 4208. In this example, the shared scene map 4204 is accessible and editable by both the controller 4202 and a headset device 4206 (e.g., a display device).

In the current example, the controller 4202 is visible to an image device associated with the headset device 4206. Using the captured image data captured by the image device on the headset device 4206, the headset device 4206 is able to determine a position of the controller 4202 relative to the headset device 4206, generally indicated by lien 4210. The controller 4202 may send the 6DOF pose of the controller 4202 relative to the shared scene map 4204 to the headset device 4206.

Using the position of the controller 4202 relative to the headset device 4206 and the 6DOF pose of the controller 4202 relative to the shared scene map 4204, the headset device 4206 may determine a 6DOF pose of the headset device 4206 relative to the shared scene map 4204.

Figure 43:
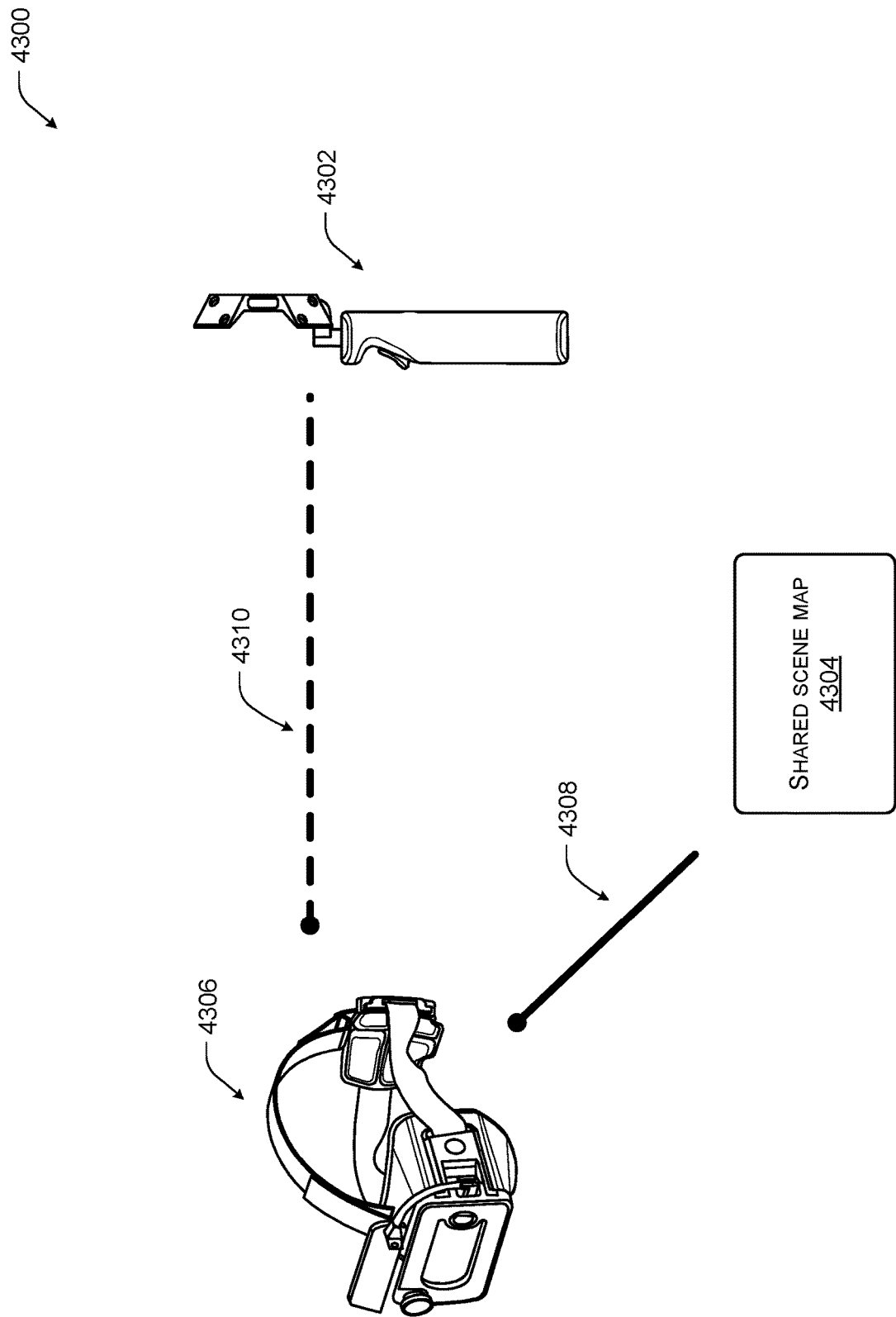
FIG. 43 is an example diagram of various tracking techniques of an image system having a controller equipped with an image device according to some implementations

FIG. 43 is an example diagram of various tracking techniques of an image system 4300 having a controller 4302 equipped with an image device according to some implementations. In the current example, a headset device 4306 shares a scene map 4304 with the controller 4302. The headset device 4306 is able to determine a 6DOF pose of the headset device 4306 relative to the shared scene map 4304 using, for instance, a SLAM technique discussed above and generally indicated by 4308.

In this example, the controller 4302 is visible in image data captured by the headset device 4306. The headset device 4306 is, thus, able to determine a position of the controller 4302 relative to the headset device 4306, generally indicated by 4310. The headset device 4306 may then determine a 6DOF pose of the controller 4302 based in part on the position of the controller 4302 relative to the headset device 4306 and the 6DOF pose of the headset device 4306.

Figure 44:
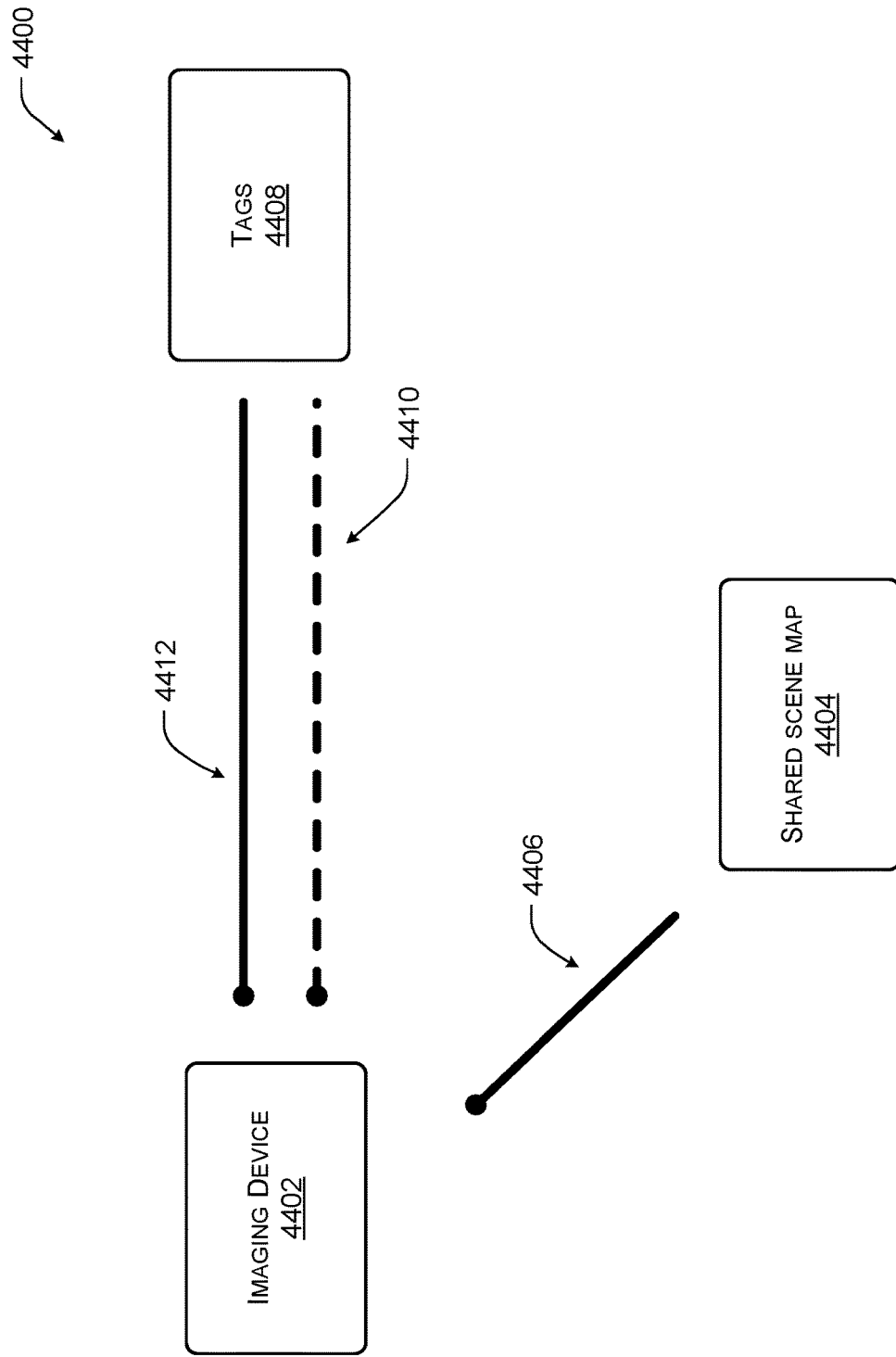
FIG. 44 is an example diagram of various tracking techniques of an image system that utilizes tracking enhancement tags according to some implementations.

FIG. 44 is an example diagram of various tracking techniques of an image system 4400 that utilizes tracking enhancement tags according to some implementations. In the illustrated example, the imaging device 4402 is able to access a scene map 4404 and to determine the 6DOF pose of the imaging device 4402 (e.g., the device capturing the image data) relative to the scene map 4404, generally indicated by line 4406.

In the current example, the imaging device 4402 is able to capture image data of one or more tracking enhancement tags 4408. Using the image data, the imaging device 4402 determines the position of the tag 4408 relative to the imaging device 4402 using object tracking, generally indicated by line 4410. Next, the imaging device 4402 may compose the position of the tag 4408 relative to the imaging device 4402 using the 6DOF pose of the imaging device 4402, generally indicated by line 4412.

The imaging device 4402 may then determine a world position of the imaging device 4402 by tracking the tag 4408 using an object tracking technique and composing the position of the imaging device 4402 with the position of the tag 4408. In some cases, the tag 4408 may include visible features that can be tracked using SLAM or other object tracking methods. The tag 4408 may also be encoded with a unique identifier that can be read by the imaging device 4402 (for instance, a identifier or orientation data of the tag 4408 may be encoded). In one specific example, the tag 4408 may be encoded with different frequency data, such as high and low, to allow the tag 4408 to encode different types of data (such as identity and orientation data). In some case, the tag 4408 may be a visible marker, a retro-reflective marker, a light emitting marker or other active marker, among others.

While FIGS. 1-44 are shown as different implementations, it should be understood that the features of FIGS. 1-44 may be applicable to any of the implementations illustrated. For example, the processes of FIGS. 1-44 may be each be used by a single image system to determine 6DOF poses of objects in different situations.

Thus, in the above description of FIGS. 1-44, include various implementations discussed below.

In one case, a system having a display for presenting a virtual environment to a user, one or more image components for capturing monochromic image data associated with a physical environment surrounding the user, one or more processors; and at least one non-transitory computer-readable media. In some case, the computer-readable media may store computer-executable instructions, which when executed by the one or more processors cause the one or more processors to receive a monochromic image from the one or more image components, the monochromic image including data representatives of an object in the physical environment, identify image points within the monochromic image, generate a plurality of image point sets, each image point set including four or more image points, generate a candidate 6DOF pose for each of the image point sets, project each candidate 6DOF pose into the monochromic image, determine a number of inliers for each candidate 6DOF pose, and output the candidate 6DOF pose having the largest number of inliers as the 6DOF pose of the object.

In some examples, the instructions may also cause the processors to segment the monochromic image into a plurality of patches, identify using a low-resolution search a set of patches containing an image point; and determine a location of the image point within each patch by applying a weighted average via a sliding window at a high resolution. In other examples, the instructions may also cause the processors to determine for each candidate 6DOF pose a feasibility metric, and discard each candidate 6DOF pose having a feasibility metric below a threshold, prior to projecting the candidate 6DOF poses. In one example, the instructions may also cause the processors to manipulate a second object in the virtual environment based at least in part on the 6DOF pose of the first object. In still other examples, the processor may determine a reproduction error associated with each candidate 6DOF pose and select the candidate 6DOF pose having the largest number of inliers and a lowest reproduction error is output as the 6DOF pose of the object.

In some examples, the number of inliers for each candidate 6DOF pose includes determining a number of projected points of the candidate 6DOF pose that are within a threshold distance of an image point of the image points.

In another case, a system may include a display for presenting a virtual environment to a user; one or more image components for capturing monochromic image data associated with a physical environment surrounding the user, one or more wireless communication interfaces for receiving data, one or more processors, and at least one non-transitory computer-readable media. In this case, the computer-readable media may store computer-executable instructions, which when executed by the one or more processors cause the one or more processors to receive a monochromic image from the one or more image components, the monochromic image including data representatives of an object in the physical environment; determine an initial 6DOF pose prediction of the object based; generate a plurality of candidate 6DOF poses based at least in part on the initial 6DOF pose prediction; project each candidate 6DOF pose of the plurality of candidate 6DOF poses into the monochromic image; determine a number of inliers for each candidate 6DOF pose; and output the candidate 6DOF pose having the largest number of inliers as the 6DOF pose of the object.

In the case above, the initial 6DOF pose prediction is based at least in part on orientation data of the object received from the object via the one or more wireless communication interfaces and the initial 6DOF pose prediction is based at least in part on a known prior 6DOF pose of the object. Additionally, generating the plurality of candidate 6DOF poses may include perturbing the initial 6DOF pose along three angles and three translations. In the case above, determine the number of inliers for each candidate 6DOF pose includes determining a number of projected points of the candidate 6DOF pose that are within a threshold distance of an image point of the image points.

The instructions may also cause the processor to manipulate a second object in the virtual environment based at least in part on the 6DOF pose of the first object or generating a refined 6DOF pose for each of the plurality of candidate 6DOF poses by applying a perspective from n points operation to the candidate 6DOF pose. In yet another case, a system may include a display for presenting a virtual environment to a user, one or more image components for capturing monochromic image data associated with a physical environment surrounding the user, one or more wireless communication interfaces for receiving data, one or more processors, and at least one non-transitory computer-readable media. The computer-readable media may store computer-executable instructions, which when executed by the one or more processors cause the one or more processors to receive a monochromic image from the one or more image components, the monochromic image including data representatives of an object in the physical environment, receiving orientation data from the object via the one or more wireless communication interfaces, approximating a rotation of the object based at least in part on the orientation data, approximating a depth of the object based at least in part on the monochromic image and a stored model of the object, determining a translation of the object based at least in part on a prior 6DOF pose, the rotation, and the depth, determine 6DOF pose of the object based at least in part on the translation, the rotation, and the depth, and output the 6DOF pose of the object.

In the case above, approximating the depth may be based at least in part on the orientation data or on a weak perspective using the stored model and a length of the object within the monochromic image. In one example, in the case above, approximating the depth is based at least in part on an edge length of the stored model and an edge length of the object within the monochromic image.

In another implementation discussed above, a process may include determining, by a controller associate with a mixed reality image system, a six-degree of freedom (6DOF) pose of a headset device associate with the mixed reality image system based at least in part on image data of a physical environment, the 6DOF pose of the headset device relative to the controller; determining, by the controller, a 6DOF pose of the controller relative to a scene map shared between the controller and the headset device; determining a 6DOF pose of the headset device relative to the scene map based at least in part on the 6DOF pose of the headset device relative to the controller and the 6DOF pose of the controller relative to the scene map; and determining an input to the mixed reality image system based at least in part on the 6DOF pose of the headset device relative to the scene map.

In some examples associated with the case above, the process may include capturing, by the controller, the image data of the physical environment, the physical environment in proximity to the controller and the headset device while the 6DOF pose of headset device relative to the scene map is determined. The process may also include sending the 6DOF pose of the headset device relative to the controller and the 6DOF pose of the controller relative to the scene map to the headset device. The process may also include updating, by the controller, the scene map based on image data captured by the controller; and updating, by the headset device, the scene map based on image data captured by the headset device. The process may also include re-localizing, by the headset device, within the scene map based at least in part on the 6DOF pose of the headset device relative to the scene map. In some cases, the 6DOF pose of the headset device relative to the scene map is determined by the headset device. In other examples, the 6DOF pose of the headset device relative to the scene map is determined by the controller. In some examples, the controller and the headset device are performing self-tracking and localization within the scene.

In another implementation discussed above, a process may include determining, by a headset device associate with a mixed reality image system, a six-degree of freedom (6DOF) pose of a controller associate with the mixed reality image system based at least in part on image data of a physical environment, the 6DOF pose of the controller relative to the headset device; determining, by the controller, a 6DOF pose of the controller relative to a scene map shared between the controller and the headset device; sending the 6DOF pose of the controller relative to the scene map from the controller to the headset device; determining a 6DOF pose of the headset device relative to the scene map based at least in part on the 6DOF pose of the controller relative to the headset device and the 6DOF pose of the controller relative to the scene map; and determining an input to the mixed reality image system based at least in part on the 6DOF pose of the headset device relative to the scene map.

In the implementation above, the process may also include capturing, by the headset device, the image data of the physical environment, the physical environment in proximity to the controller and the headset device while the 6DOF pose of headset device relative to the scene map is determined. The process may also include updating, by the controller, the scene map based on image data captured by the controller and updating, by the headset device, the scene map based on image data captured by the headset device. In some cases, the process may also include outputting the 6DOF pose of the headset device relative to the scene map and/or re-localizing, by the headset device, within the scene map based at least in part on the 6DOF pose of the headset device relative to the scene map.

In another implementation discussed above, a process may include determining, by a headset device associate with a mixed reality image system, a six-degree of freedom (6DOF) pose of a controller associate with the mixed reality image system based at least in part on image data of a physical environment, the 6DOF pose of the controller relative to the headset device; determining, by the headset device, a 6DOF pose of the headset device relative to a scene map shared between the controller and the headset device; determining a 6DOF pose of the controller relative to the scene map based at least in part on the 6DOF pose of the controller relative to the headset device and the 6DOF pose of the headset device relative to the scene map; and outputting the 6DOF pose of the controller relative to the scene map.

In some examples, the outputting the 6DOF pose of the controller relative to the scene map includes determining a user input to the mixed reality image system based at least in part on the 6DOF pose of the controller relative to the scene map. In some cases, outputting the 6DOF pose of the controller relative to the scene map includes sending the 6DOF pose of the controller relative to the scene from the headset device to the controller; and re-localizing, by the controller, within the scene map based at least in part on the 6DOF pose of the controller relative to the scene map.

In another implementation discussed above, a process may include performing SLAM using cameras and IMU on a headset to build a scene map and computing a 6-dof position for the headset relative to the scene map; locating a tracking enhancement tags that were placed by the user within the scene and computing the 6-dof position of the tags relative to the headset using object tracking; computing a position for the tracking enhancement tag relative to the scene map by composing the headset 6-dof position relative to the scene map with the tracking enhancement tag 6-dof position relative to the headset; using the 6-dof position of a tracking enhancement tag relative to the scene map, computing a 6-dof position of the headset relative to the scene map by locating the tracking enhancement tag relative to the headset using object tracking and then composing this 6-dof position with the 6-dof position of the tracking enhancement tag relative to the scene map.

In some cases, the tracking enhancement tag can optionally encode a unique identifier that can be computed or read by the headset; encode orientation information so that its orientation can be determined uniquely once detected; have information encoded at both high frequency (e.g. a unique identifier) and low frequency (e.g. orientation); and be configured to provide more standard visual features such as corners for SLAM.

In one example, a process may include generating a virtual scene map representative of a physical environment based at least in part on image data captured by an image device of a headset device and orientation data captured by a inertial measurement unit (IMU) of the headset device; determining a six-degree of freedom (6DOF) pose of the headset device relative to the virtual scene map based at least in part on the orientation data and the image data; determining a 6DOF pose of a tracking enhancement tag relative to the headset device based at least in part on the image data, the tracking enhancement tag within the physical environment; determining a 6DOF pose of the tracking enhancement tag relative to the virtual scene map based at least in part on the 6DOF pose of the headset device relative to the virtual scene map and the 6DOF pose of the tracking enhancement tag relative to the headset device; locating the tracking enhancement tag within the virtual scene map based at least in part on the 6DOF pose of the tracking enhancement tag relative to the virtual scene map.

In some examples, the virtual scene map is generated and the 6DOF pose of the headset device relative to the virtual scene map is determined using a simultaneous location and mapping (SLAM) technique. In one instance, the 6DOF pose of the tracking enhancement tag relative to the headset device relative is determined using object tracking. In other instances, the 6DOF pose of the tracking enhancement tag relative to the virtual scene map is determined by composing the 6DOF pose of the headset device relative to the virtual scene map with the 6DOF pose of the tracking enhancement tag relative to the headset device.

In one instance, of the above case, the process may include re-initializing the virtual scene map on the headset device; capturing, by the image device, second image data of the physical environment, the second image data including data representative of the tracking enhancement tag; and determining a second 6DOF pose of the headset device relative to the scene map based at least in part on second image data and the 6DOF pose of the tracking enchantment tag relative to the virtual scene. In another instance, the second 6DOF pose of the headset device relative to the scene map is determined by: determining a 6DOF pose of the tracking enhancement tag relative to the headset device using object tracking; and composing the OF pose of the tracking enhancement tag relative to the headset device with the 6DOF pose of the tracking enchantment tag relative to the virtual scene map.

In some cases, the tracking enhancement tag includes at least one of: a retroflected element; an infrared coded element; a frequency encoded element; a patterned element; or a light emitting element. In some implementations, the tracking enhancement tag is at least one of encoded with a unique identifier detectable by the headset device, encoded with orientation data detectable by the headset device, encoded with information encoded at a high frequency and a low frequency, encoded at a high frequency with information that includes a unique identifier detectable by the headset device and at the low frequency with information that includes orientation data detectable by the headset device. In another example, the information encoded at a high frequency includes orientation data detectable by the headset device and the information encoded at the low frequency includes a unique identifier detectable by the headset device.

In some cases, the tracking enhancement tag includes visual features usable by the headset device in performing a SLAM technique. For instance, the tracking enhancement tags may include corners. The tracking enhancement tag may also include an adhesive layer for applying to a surface in the physical environment and/or a visual indication of an upright position to assist a user in placing within the physical environment.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    determining, by a controller associate with a mixed reality image system, a six-degree of freedom (6DOF) pose of a headset device relative to the controller based at least in part on image data of a physical environment captured by the controller, the headset device associate with the mixed reality image system;
    determining, by the controller, a 6DOF pose of the controller relative to a scene map shared between the controller and the headset device; and
    determining a 6DOF pose of the headset device relative to the scene map based at least in part on the 6DOF pose of the headset device relative to the controller and the 6DOF pose of the controller relative to the scene map.

2. The method as recited in claim 1, further comprising determining an input to the mixed reality image system based at least in part on the 6DOF pose of the headset device relative to the scene map.

3. The method as recited in claim 2, wherein determining the input to the mixed reality image system is also based at least in part on the 6DOF pose of the controller relative to the scene map.

4. The method as recited in claim 1, wherein the 6DOF pose of the headset device relative to the scene map is determined by the controller.

5. The method as recited in claim 1, further comprising:
    sending the 6DOF pose of the headset device relative to the controller and the 6DOF pose of the controller relative to the scene map to the headset device; and
    wherein the 6DOF pose of the headset device relative to the scene map is determined by the headset device.

6. The method as recited in claim 1, further comprising updating, by the controller, the scene map based on image data captured by the controller; and
    updating, by the headset device, the scene map based on image data captured by the headset device.

7. The method as recited in claim 1, wherein the controller and the headset device are performing self-tracking and localization within the scene.

8. The method as recited in claim 1, further comprising:
    updating the scene map, by the controller, based on image data captured by the controller; and
    updating the scene map, by the headset device, based on image data captured by the headset device.

9. The method as recited in claim 1, wherein determining the 6DOF pose of the headset device relative to the scene map based at least in part on the 6DOF pose of the headset device relative to the controller and the 6DOF pose of the controller relative to the scene map includes composing the 6DOF pose of the headset device relative to the controller and the 6DOF pose of the controller relative.

10. A method comprising:
    determining, by a headset device associated with a mixed reality image system, a six-degree of freedom (6DOF) pose of a controller associated with the mixed reality image system based at least in part on image data of a physical environment, the 6DOF pose of the controller relative to the headset device;
    determining, by the controller, a 6DOF pose of the controller relative to a scene map shared between the controller and the headset device;
    sending the 6DOF pose of the controller relative to the scene map from the controller to the headset device;
    determining a 6DOF pose of the headset device relative to the scene map based at least in part on the 6DOF pose of the controller relative to the headset device and the 6DOF pose of the controller relative to the scene map; and
    determining an input to the mixed reality image system based at least in part on the 6DOF pose of the headset device relative to the scene map.

11. The method as recited in claim 10, further comprising outputting the 6DOF pose of the headset device relative to the scene map.

12. The method as recited in claim 10, further comprising updating, by the controller, the scene map based on image data captured by the controller; and
    updating, by the headset device, the scene map based on image data captured by the headset device.

13. The method as recited in claim 10, further comprising setting a perspective for image data associated with the mixed reality image system displayed to a user based at least in part on the 6DOF pose of the headset device relative to the scene map.

14. The method as recited in claim 10, further comprising re-localizing, by the headset device, within the scene map based at least in part on the 6DOF pose of the headset device relative to the scene map.

15. A method comprising:
    determining, by a headset device associate with a mixed reality image system, a six-degree of freedom (6DOF) pose of a controller associate with the mixed reality image system based at least in part on image data of a physical environment, the 6DOF pose of the controller relative to the headset device;
    determining, by the headset device, a 6DOF pose of the headset device relative to a scene map shared between the controller and the headset device;
    determining a 6DOF pose of the controller relative to the scene map based at least in part on the 6DOF pose of the controller relative to the headset device and the 6DOF pose of the headset device relative to the scene map; and
    outputting the 6DOF pose of the controller relative to the scene map.

16. The method as recited in claim 14, wherein outputting the 6DOF pose of the controller relative to the scene map includes determining a user input to the mixed reality image system based at least in part on the 6DOF pose of the controller relative to the scene map.

17. The method as recited in claim 15, further comprising:
wherein outputting the 6DOF pose of the controller relative to the scene map includes sending the 6DOF pose of the controller relative to the scene from the headset device to the controller; and
re-localizing, by the controller, within the scene map based at least in part on the 6DOF pose of the controller relative to the scene map.

18. The method as recited in claim 15, further comprising capturing, by the headset device, the image data of the physical environment, the physical environment in proximity to the controller and the headset device while the 6DOF pose of headset device relative to the scene map is determined.

19. The method as recited in claim 15, further comprising capturing, by the headset device, orientation data associated with the headset device.

20. The method as recited in claim 15, further comprising substantially simultaneously updating the scene map by the controller based on image data captured by the controller and by the headset device based on image data captured by the headset device.

* * * * *